(12) United States Patent
Liu et al.

(10) Patent No.: US 12,041,637 B2
(45) Date of Patent: Jul. 16, 2024

(54) SEMI-PERSISTENT SCHEDULING FOR BROADCAST OR MULTICAST COMMUNICATION

(71) Applicant: QUALCOMM Incorporated, San Diego, CA (US)

(72) Inventors: Le Liu, Fremont, CA (US); Kazuki Takeda, Tokyo (JP); Wanshi Chen, San Diego, CA (US); Alberto Rico Alvarino, San Diego, CA (US); Peter Gaal, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/183,111

(22) Filed: Feb. 23, 2021

(65) Prior Publication Data

US 2021/0282114 A1 Sep. 9, 2021

Related U.S. Application Data

(60) Provisional application No. 62/985,710, filed on Mar. 5, 2020, provisional application No. 62/985,670, filed on
(Continued)

(51) Int. Cl.
*H04W 72/30* (2023.01)
*H04B 7/06* (2006.01)
(Continued)

(52) U.S. Cl.
CPC .......... *H04W 72/30* (2023.01); *H04B 7/0695* (2013.01); *H04L 1/1614* (2013.01);
(Continued)

(58) Field of Classification Search
CPC ............. H04W 72/005; H04W 72/046; H04W 72/1257; H04W 72/1289; H04W 76/27;
(Continued)

(56) References Cited

U.S. PATENT DOCUMENTS

2017/0332358 A1 11/2017 Park et al.
2018/0045521 A1 2/2018 Wege et al.
(Continued)

FOREIGN PATENT DOCUMENTS

EP 2945312 A1 11/2015

OTHER PUBLICATIONS

Partial International Search Report—PCT/US2021/019496—ISA/EPO—dated Jun. 22, 2021.

*Primary Examiner* — Yaotang Wang
(74) *Attorney, Agent, or Firm* — QUALCOMM Incorporated

(57) ABSTRACT

In an aspect of the disclosure, a method, a computer-readable medium, and an apparatus are provided. The apparatus may be a UE or a component thereof configured to receive, from a base station, SPS configuration information for broadcast and/or multicast indicating a set of resources configured for feedback, with each transmit (TX) beam of a set of TX beams corresponding to a respective subset of the set of resources. The apparatus may be further configured to receive SPS signaling from the base station via one or more TX beams of the set of TX beams over each of a set of SPS occasions. The apparatus may be further configured to transmit feedback to the base station on one or more subsets of the set of resources respectively corresponding to the one or more TX beams based on the SPS signaling, the feedback indicating one of acknowledgement (ACK) or non-acknowledgement (NACK).

66 Claims, 20 Drawing Sheets

Related U.S. Application Data on Mar. 5, 2020, provisional application No. 62/985,732, filed on Mar. 5, 2020.

(51) Int. Cl.
*H04L 1/1607* (2023.01)
*H04L 1/1825* (2023.01)
*H04L 1/1867* (2023.01)
*H04L 5/00* (2006.01)
*H04W 72/044* (2023.01)
*H04W 72/23* (2023.01)
*H04W 72/50* (2023.01)
*H04W 76/27* (2018.01)
*H04W 72/20* (2023.01)

(52) U.S. Cl.
CPC .......... *H04L 1/1825* (2013.01); *H04L 1/1896* (2013.01); *H04L 5/0025* (2013.01); *H04L 5/0055* (2013.01); *H04L 5/0094* (2013.01); *H04W 72/046* (2013.01); *H04W 72/23* (2023.01); *H04W 72/535* (2023.01); *H04W 76/27* (2018.02); *H04W 72/20* (2023.01)

(58) Field of Classification Search
CPC ............. H04W 72/0406; H04B 7/0695; H04L 1/1614; H04L 1/1825; H04L 1/1896; H04L 5/0025; H04L 5/0055; H04L 5/0094

See application file for complete search history.

(56) References Cited

U.S. PATENT DOCUMENTS

| | | | |
|---|---|---|---|
| 2018/0152274 A1* | 5/2018 | Li | H04L 5/0055 |
| 2018/0279274 A1* | 9/2018 | Sun | H04W 72/042 |
| 2018/0310283 A1 | 10/2018 | Deenoo et al. | |
| 2019/0356455 A1 | 11/2019 | Yang et al. | |
| 2020/0022067 A1* | 1/2020 | Pan | H04W 48/10 |
| 2021/0036822 A1* | 2/2021 | Lyu | H04L 5/006 |
| 2021/0235453 A1* | 7/2021 | Matsumura | H04W 72/042 |

\* cited by examiner

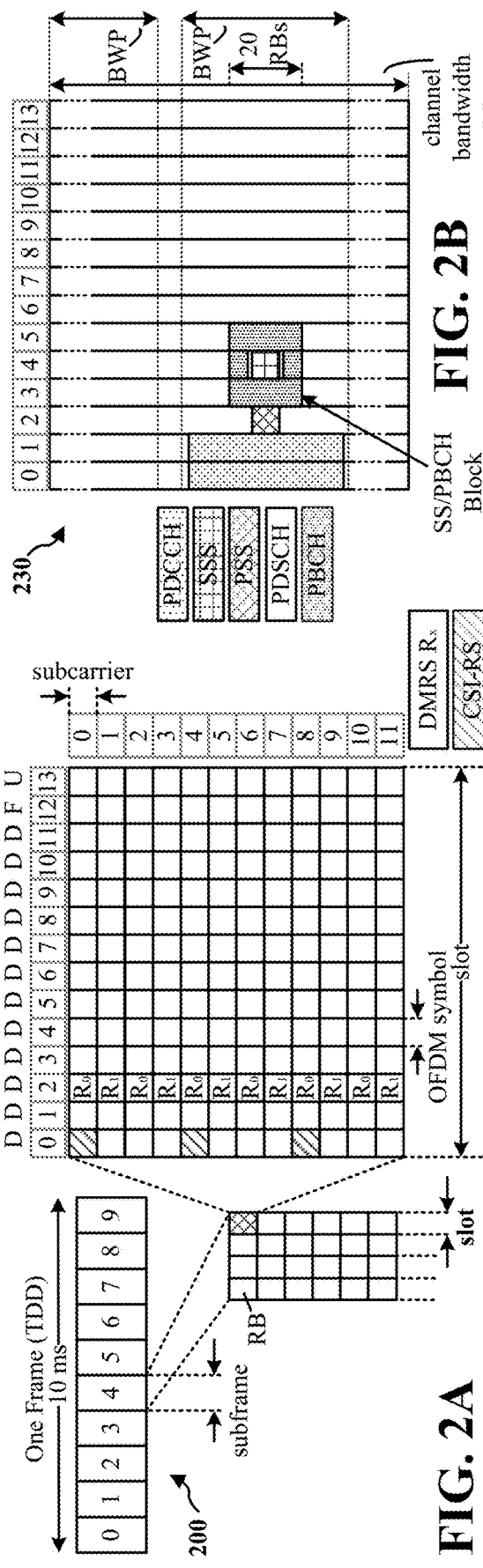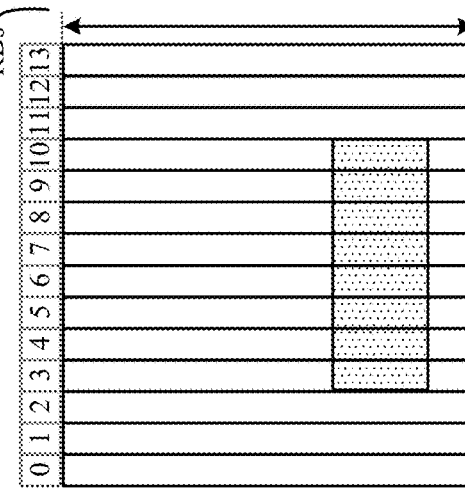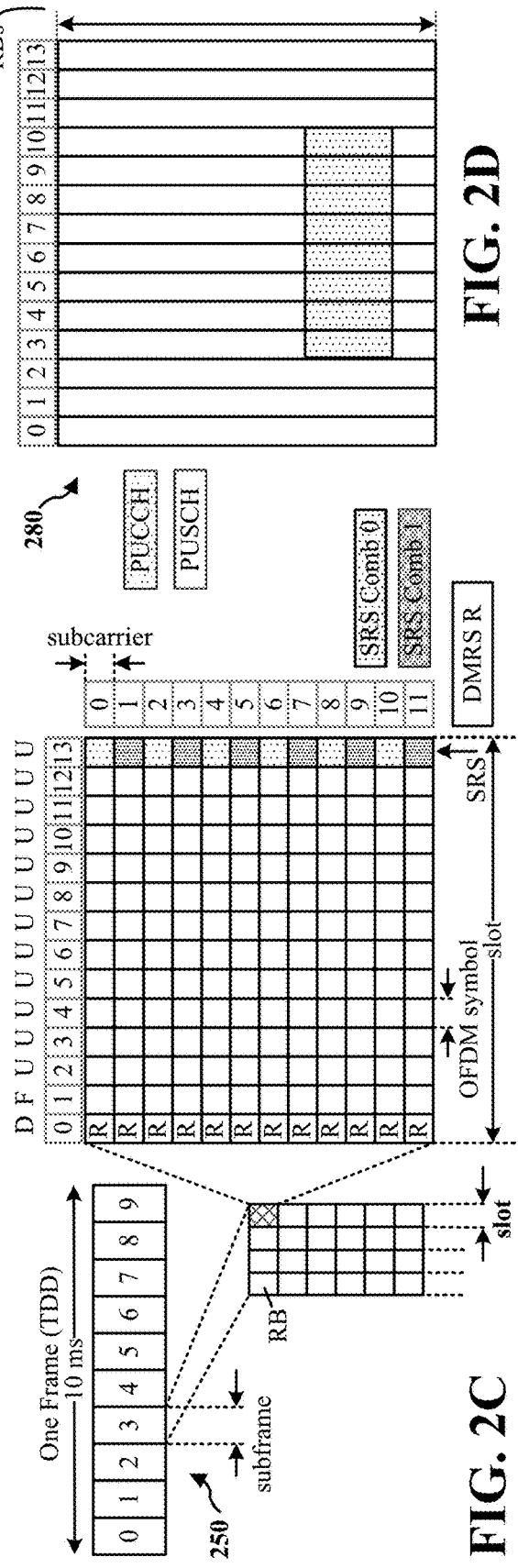
FIG. 2A  FIG. 2B  FIG. 2C  FIG. 2D

SEMI-PERSISTENT SCHEDULING FOR BROADCAST OR MULTICAST COMMUNICATION

CROSS REFERENCE TO RELATED APPLICATION(S)

This application claims the benefit of U.S. Provisional Application Ser. No. 62/985,670, entitled "SYSTEM AND METHOD FOR SEMI-PERSISTENT SCHEDULING FOR BROADCAST OR MULTICAST COMMUNICATION" and filed on Mar. 5, 2020, and the benefit of U.S. Provisional Application Ser. No. 62/985,710, entitled "SYSTEM AND METHOD FOR SEMI-PERSISTENT SCHEDULING FOR BROADCAST OR MULTICAST COMMUNICATION" and filed on Mar. 5, 2020, and the benefit of U.S. Provisional Application Ser. No. 62/985,732, entitled "SYSTEM AND METHOD FOR SEMI-PERSISTENT SCHEDULING FOR BROADCAST OR MULTICAST COMMUNICATION" and filed on Mar. 5, 2020. The disclosures of these provisional applications are expressly incorporated by reference herein in their entireties.

BACKGROUND

Technical Field

The present disclosure generally relates to communication systems, and more particularly, to a base station and user equipment (UE) configured for at least one of broadcast or multicast communication with semi-persistent scheduling.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station may configure a user equipment (UE) with semi-persistent scheduling (SPS), according to which the base station may periodically (or semi-periodically) transmit data to the UE over multiple subframes. According to various aspects of the present disclosure, the base station may configure two or more UEs with SPS so that the base station may broadcast or multicast data to the two or more UEs.

Some network entities and/or some wireless or radio access technologies may not be designed for, or may lack the capability to, simultaneously transmit some (or any) signaling that is common to multiple recipients, such as scheduling information that is common to multiple UEs or other control information, which may be UE-specific in some networks. For example, some base stations may be unable to configure and communicate SPS transmissions with more than one UE using the same signaling. For example, some base stations may be unable to configure broadcast or multicast communication using SPS; rather, such base stations may rely upon unicast to individually configure each UE with a respective.

The present disclosure describes various techniques and approaches to SPS configurations for broadcast or multicast, as SPS may be beneficial in broadcast or multicast scenarios. Specifically, configuring a broadcast or multicast group of UEs with SPS may reduce signaling overhead, such as when multiple UEs are scheduled to receive traffic that is not UE-specific and is relatively stable over a fixed time period without UE-specific link adaptation. For SPS broadcast or multicast transmission, a base station may adjust a modulation and coding scheme (MCS), code rate, transmission mode, and the like so that the broadcast or multicast transmission may be received by the group of UEs with a target block error rate (BLER), even at the cell edge.

A broadcast or multicast transmission should be able to reach a large number of UEs in a large coverage area. To that end, beam sweeping is important to extend the coverage area of the base station, especially in frequency range 2 (FR2) of 5G New Radio (NR). However, if the base station transmits a broadcast or multicast transmission via a beam covering an area in which no UE is able to receive, the resources on which the transmission is carried may be wasted and further, unnecessary interference may be generated. Accordingly, the present disclosure further describes techniques and approaches to the efficient allocation of resources for SPS broadcast/multicast transmission.

In an aspect of the disclosure, a method, a computer-readable medium, and an apparatus are provided. The apparatus may be a UE or a component thereof. The apparatus may be configured to receive, from a base station, SPS configuration information for broadcast and/or multicast indicating a set of resources configured for feedback, with each transmit (TX) beam of a set of TX beams of the base station corresponding to a respective subset of the set of resources. The apparatus may be further configured to receive SPS signaling from the base station via one or more TX beams of the set of TX beams over each of a set of SPS occasions. The apparatus may be further configured to transmit feedback to the base station on one or more subsets of the set of resources respectively corresponding to the one or more TX beams based on the SPS signaling, the feedback indicating one of acknowledgement (ACK) or non-acknowledgement (NACK).

In a second aspect of the disclosure, a second method, a second computer-readable medium, and a second apparatus are provided. The second apparatus may be a UE or a component thereof. The second apparatus may be configured to determine whether at least one of downlink data on a downlink data channel over at least one multicast SPS occasion or downlink control information (DCI) associated with SPS activation or release is unsuccessfully received from a base station. The second apparatus may be further configured to receive a retransmission of the at least one of the downlink data or the DCI when the at least one of the downlink data or the DCI is determined to be unsuccessfully received.

In a third aspect of the disclosure, a third method, a third computer-readable medium, and a third apparatus are provided. The third apparatus may be a base station or a component thereof. The third apparatus may be configured to configure a set of resources to carry feedback, each TX beam of a set of TX beams corresponding to a respective subset of the set of resources. The third apparatus may be further configured to transmit configuration information indicating the set of resources to a set of UE, the configuration information being associated with SPS. The third apparatus may be further configured to transmit SPS signaling to the set of UE via the set of TX beams over each of a set of SPS occasions. The third apparatus may be further configured to receive feedback from the set of UE on one or more subsets of the set of resources based on the SPS signaling, with the feedback indicating one of ACK or NACK associated with the SPS signaling.

In a fourth aspects of the disclosure, a fourth method, a fourth computer-readable medium, and a fourth apparatus are provided. The fourth apparatus may be a base station or a component thereof. The fourth apparatus may be configured to transmit downlink data to a set of UE configured with SPS on a downlink data channel over a set of SPS occasions. The fourth apparatus may be further configured to determine whether to retransmit at least one of the downlink data or DCI associated with SPS activation or release. The fourth apparatus may be further configured to retransmit the at least one of the downlink data or the DCI upon determination that the at least one of the downlink data or the DCI is to be retransmitted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
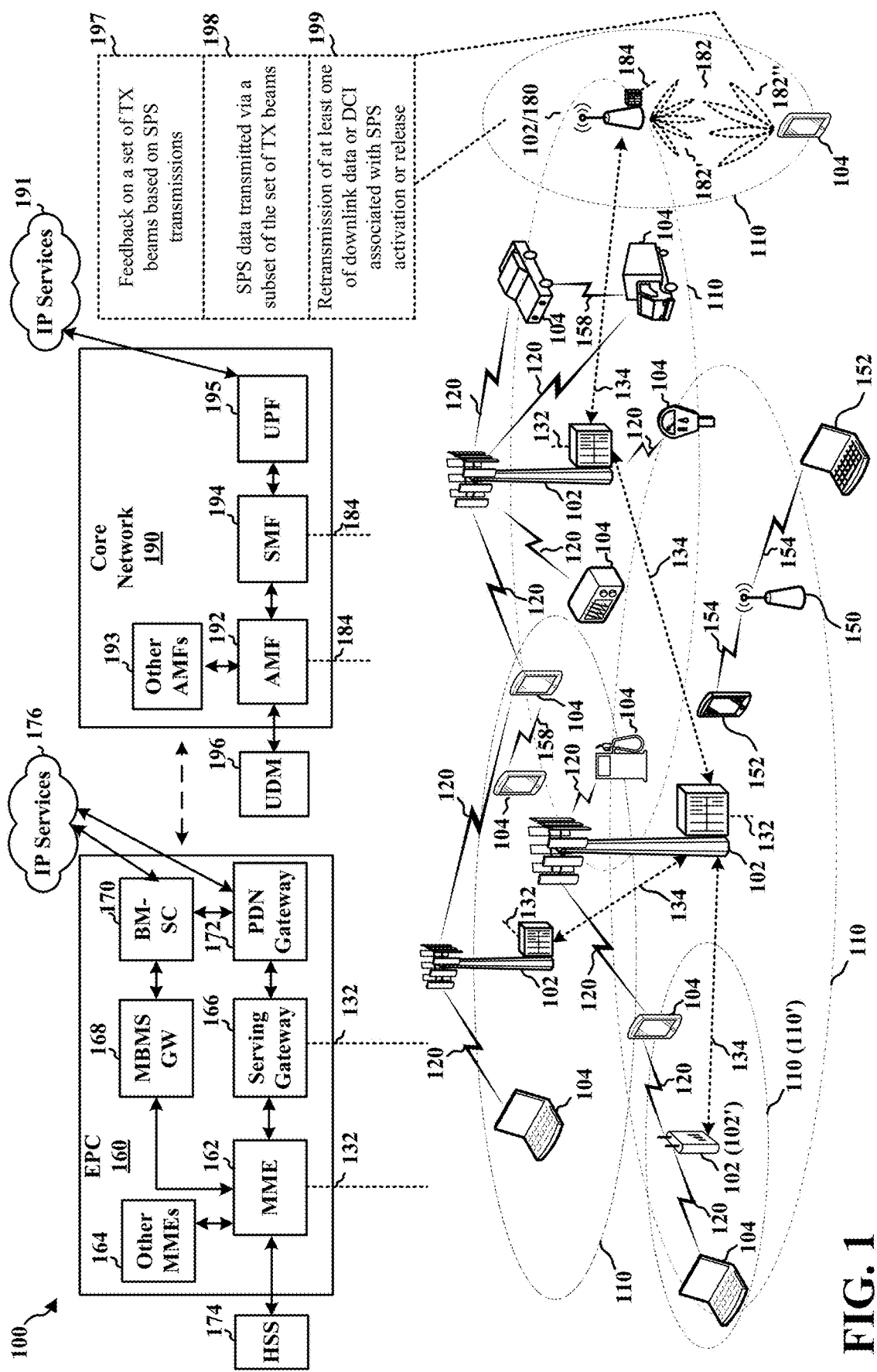
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some access networks and/or wireless communications networks, base stations may include downlink routing or delivery schemes that allow a base station to control the destination and/or scope of downlink information when transmitting. As mobile connectivity is nearly ubiquitous in many locales, a cell or coverage area of a base station may often include an appreciable quantity of user equipment (UE) therein. Although even where a cell includes only two UEs, it may be preferable for the base station to control which of the UEs receives a given downlink transmission.

To that end, a base station may configure transmissions to UEs as unicast, multicast, or broadcast. Broadly, unicast is point-to-point communication, and therefore in the context of downlink communication, unicast is base station-to-UE transmission. In other words, the scope of a unicast transmission from the base station is one UE, to the exclusion of each other UE that otherwise may be able to receive the transmission signal, e.g., if the transmission identified a respective other UE and/or was non-unicast.

However, unicast may have some drawbacks in some instances, such as those in which some UE-invariant or common information is to be delivered to multiple UEs. For example, emergency alert information or other information that is generally relevant to all UEs in a cell may arrive at or may be generated by the base station. As the volume of UEs operating in any given cell increases, the overhead (e.g., latency, resource consumption, etc.) commensurate with repeated unicast transmissions of the same information over all base station-to-UE links may proportionally increase. Consequently, unicast may be inefficient, if not entirely impractical in some instances.

Functionally the opposite of unicast, broadcast provides an alternative with one-to-all communication. In the context of downlink communication, broadcast may include base station-to-all UEs connected through the base station cell (e.g., although not necessarily in a connected state with the base station). In some aspects, the base station may simultaneously transmit information to every UE within range (and able to camp or not barred). For example, a broadcast address may be reserved in the base station cell or access network, and the base station may address information to the broadcast address in order to broadcast the information and/or the base station may transmit the information on a specific broadcast channel, potentially without encryption. Correspondingly, UEs connected through the base station cell may receive the information addressed to the broadcast address in the cell, and so may ascertain the broadcast nature of the information from the broadcast address and/or broadcast channel on which the information is carried.

A third destination scheme—multicast—may provide some balance between unicast and broadcast communication. Multicast includes one-to-many communication, which translates to base station-to-a specified set of UEs of all the UEs connected through the base station cell. In other words, the base station is able to simultaneously transmit information to a greater amount of UEs relative to unicast, without indiscriminately transmitting to every potential receiving UE within range of the base station. In some aspects, the base station may do so by transmitting information that is common to a group of UEs using addressing information that commonly identifies all UEs of the group, such as a group network identifier (ID), logical ID, or another group addressing technique. For example, the base station may schedule some control information that is common to all UEs of a multicast group, and each of the UEs may receive and decode the same control information on the scheduled resources, such as by descrambling the payload carried on the scheduled resources using a group ID shared by each of the group of UEs or other common information.

In some instances, a base station may periodically transmit data to a UE over multiple occasions, which may occur over multiple slots and/or subframes. Some example scenarios in which such periodic data transmission has been or could be applied include mobile gaming, video conferencing or other video calling applications, streaming video, voice-over-Internet protocol (VoIP), or other application in which packets are transmitted to a UE at short and regular intervals (e.g., where the UE or application thereof is tolerant of periodic packet bursts). Based on the predictable schedule of data transmissions, the base station may use semi-persistent scheduling (SPS) to allocate the commensurate resources all at once, e.g., rather than allocating resources for each periodic data transmission.

For downlink unicast communication, a base station may configure a UE with SPS for a downlink data channel, which may be configured per bandwidth part (BWP). Such a configuration may configure acknowledgement (ACK) and/or non- or negative-acknowledgement (NACK) feedback so that the UE may acknowledge whether the UE successfully received each unicast transmission. In particular, the base station may configure feedback on an uplink control channel on a specific resource, which may be tied to an ID.

The base station may communicate with the UE according to the SPS configuration through activation (or "triggering") of the SPS configuration. That is, the base station may transmit downlink data to the UE and receive corresponding ACK and/or NACK feedback from the UE while the SPS configuration is activated. In order to activate the SPS configuration, the base station may set a corresponding bit in downlink control information (DCI), which may include a cyclic redundancy check (CRC) that is scrambled with a configured scheduling (CS) radio network temporary identifier (RNTI) (CS-RNTI) or a cell-RNTI (C-RNTI). The base station may similarly release the SPS configuration—that is, by setting a corresponding bit in DCI scrambled with the CS-RNTI or C-RNTI.

While a base station may be able to configure a UE with SPS for downlink unicast transmission, mechanisms to configure UEs with SPS for broadcast or multicast may be absent from some access networks or other wireless networks. The present disclosure describes various techniques and approaches to SPS configurations for broadcast or multicast, as SPS may be beneficial in broadcast or multicast scenarios. Specifically, configuring a broadcast or multicast group of UEs with SPS may reduce signaling overhead, such as when multiple UEs are scheduled to receive traffic that is not UE-specific and is relatively stable or predictable over a fixed time period, e.g., without UE-specific link adaptation. For SPS broadcast or multicast transmission, a base station may adjust a modulation and coding scheme (MCS), code rate, transmission mode, and the like so that the broadcast or multicast transmission may be received by the group of UEs with a target block error rate (BLER), even at the cell edge.

In configuring SPS broadcast or multicast, fixed resource allocation may be avoided, which may be inefficient with respect to spectrum usage with a relatively large number of UEs. In particular, an SPS configuration may be activated by DCI, and the activation DCI may dynamically update a resource allocation of the SPS broadcast or multicast transmission on a downlink data channel. Effectively, the activation DCI may dynamically schedule resources as does a conventional DCI and, therefore, a fixed resource allocation for broadcast or multicast transmission may be avoided.

Prior to SPS configuration, however, a UE may acquire downlink system information from a base station. In millimeter wave (mmW) systems (or near-mmW systems), the UE may acquire system information from at least one system information block (SIB) via beam sweeping. For example, the UE may use a respective synchronization signal block (SSB) and/or channel state information (CSI) reference signal (RS) (CSI-RS), received via each of a subset of a total set of beams of the base station, for beam association with the base station. With beam association, the base station may transmit via some beams (e.g., "active" beams) of the total set of beams, but refrain from transmitting via some other beams of the total set of beams (e.g., "inactive" beams). Specifically, the base station may transmit multiple repetitions of a SIB via "active" beams of the total set of beams, which may include the subset of the total set of beams identified by one UE through beam association.

In order to inform a UE of the active beams of the total set of beams via which the UE may receive repetitions of a SIB, the base station may transmit a bitmap to the UE by unicast radio resource control (RRC) signaling. The base station may transmit the bitmap to the UE on a downlink control channel with a system information RNTI (SI-RNTI). If capable, the UE may accordingly receive multiple repetitions of the SIB on multiple active beams in order to construct the SIB via beam combining. SIB transmission by the base station may be broadcast, and therefore lack feedback, and so combining multiple repetitions of the SIB received by the UE may improve reliability and increase the probability of successful reception by the UE.

In relation to SPS, broadcast or multicast transmission should be able to reach a large number of UEs in a large coverage area. To that end, beam sweeping is important to extend the coverage area of the base station, especially in frequency range 2 (FR2) of 5G New Radio (NR). However, if the base station transmits a broadcast or multicast transmission via a beam covering an area in which no receiving UE is present, those associated resources may be wasted and, further, unnecessary interference may be generated. Accordingly, the present disclosure further describes techniques and approaches to the efficient allocation of resources for SPS broadcast or multicast transmission.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages.

The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of an radio link control (RLC) layer. Illustratively, some of the base stations 102 configured for IAB may communicate through a respective CU with a DU of a parent and, further, may communicate through a respective DU with child IAB nodes (e.g., other base stations) and/or one or more of the UEs 104. One or more of the base stations 102 configured for JAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz, or x component carriers (CCs), used for transmission in each direction. The carriers may or may not be adjacent to each other. Allocation of carriers may be asymmetric with respect to downlink and uplink (e.g., more or fewer carriers may be allocated for downlink than for uplink). The CCs may include a primary CC and one or more secondary CCs. A primary CC may be referred to as a primary cell (PCell) and a secondary CC may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 191. The IP Services 191 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may configure a set of resources to carry feedback, with each transmit (TX) beam of a set of TX beams corresponding to a respective subset of the set of resources. The base station 102/180 may be further configured to transmit configuration information indicating the set of resources to a set of UE configured with multicast SPS, including a first UE 104. The base station 102/180 may be further configured to transmit SPS signaling to the set of UE, including the UE 104, via the set of TX beams over each of a set of SPS occasions. The base station 102/180 may be further configured to receive feedback 197 from the set of UE, including the UE 104, on one or more subsets of the set of resources based on the SPS signaling, with the feedback 197 indicating one of ACK or NACK associated with the SPS signaling over a subset of the set of SPS occasions.

Correspondingly, the UE 104 may be configured to receive, from the base station 102/180, the SPS configuration information for broadcast and/or multicast indicating a set of resources configured for feedback, with each TX beam of a set of TX beams of the base station 102/180 corresponding to a respective subset of the set of resources. The UE 104 may be further configured to receive SPS signaling from the base station 102/180 via one or more TX beams of the set of TX beams over each of a set of SPS occasions. The UE 104 may be further configured to transmit feedback 197 to the base station 102/180 on one or more subsets of the set of resources respectively corresponding to the one or more TX beams based on the SPS signaling, with the feedback 197 indicating one of ACK or NACK associated with the SPS signaling.

In certain further aspects, the base station 102/180 may be configured to transmit a set of first signals on a downlink data channel via the set of TX beams to the set of UE, including the UE 104. The base station 102/180 may be further configured to determine a subset of TX beams from the set of TX beams based on a set of response signals received from the set of UE, including the UE 104, on the one or more subsets of the set of resources on an uplink channel, with each of the set of response signals indicating a TX beam of the subset of TX beams. The base station 102/180 may be further configured to transmit data 198 via the subset of TX beams to the set of UE, including the UE 104, on the downlink data channel. For example, the base station 102/180 may configure transmission of the data 198 according to SPS, e.g., such that the data 198 is transmitted over each of a set of SPS occasions. In some aspects, data configured to be transmitted according to SPS may be referred to as "SPS data."

Correspondingly, the UE 104 may be configured to receive a set of first signals from the base station 102/180 on a downlink data channel via the set of TX beams of the base station 102/180. The UE 104 may be further configured to determine a subset of TX beams from the set of TX beams based on the set of first signals received via the one or more TX beams. The UE 104 may be further configured to transmit a set of response signals indicating the subset of TX beams on the uplink channel. The UE 104 may be further configured to receive SPS data 198 from the base station 102/180 on the downlink data channel via the subset of TX beams.

In certain further aspects, the base station 102/180 may be configured to transmit downlink data to a set of UE configured with SPS, including the UE 104, on a downlink data channel over a set of SPS occasions. The base station 102/180 may be further configured to determine whether to retransmit at least one of the downlink data or DCI associated with SPS activation or release. The base station 102/180 may be further configured for retransmission 199 of the at least one of the downlink data or the DCI upon determination that the at least one of the downlink data or the DCI is to be retransmitted.

Correspondingly, the UE 104 may be configured to determine whether at least one of downlink data on a downlink data channel over at least one multicast SPS occasion or SPS activation or release for the multicast group indicated by DCI associated with SPS activation or release is unsuccessfully received from a base station 102/180. The UE 104 may be further configured to receive the retransmission 199 of the at least one of the downlink data or the DCI when the at least one of the downlink data or the DCI is determined to be unsuccessfully received.

Various other aspects related to SPS broadcast or multicast configuration and communication with UEs by a base station. The present disclosure describes some concepts and various aspects in the context of a base station and a multicast group of UEs, which may be configured with SPS. However, it should be appreciated that the contextual examples of present disclosure are intended to be illustrative and non-limiting. The present disclosure describes these concepts and various aspects in a way that is sufficiently enabling for application in other related areas, such as in an IAB network and IAB communication configured for SPS and/or multicast and/or broadcast. In an example of an IAB network implementing some of the concepts described herein, some of child base stations configured for IAB may communicate through a respective CU with a DU of a parent or IAB donor node. Such child base stations may implement some of the multicast and/or SPS concepts and aspects described with respect to UEs (e.g., through a CU function), e.g., as further described in FIGS. 4A through 18. Correspondingly, a parent and/or IAB donor may implement some of the multicast and/or SPS concepts and aspects described with respect to base stations (e.g., through a DU function), e.g., as further described in FIGS. 4A through 18.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A through 2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different BWPs (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or RS for the UE. In some configurations, an RS may include at least one demodulation RS (DM-RS) (indicated as $R_x$ for one particular configuration, where 100× is the port number, but other DM-RS configurations are possible) and/or at least one CSI-RS for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SSB). The MIB provides a number of RBs in the system bandwidth and a system frame number (SFN). The physical downlink shared channel (PDSCH) carries user data, broadcast system information not transmitted through the PBCH such as SIBs, and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
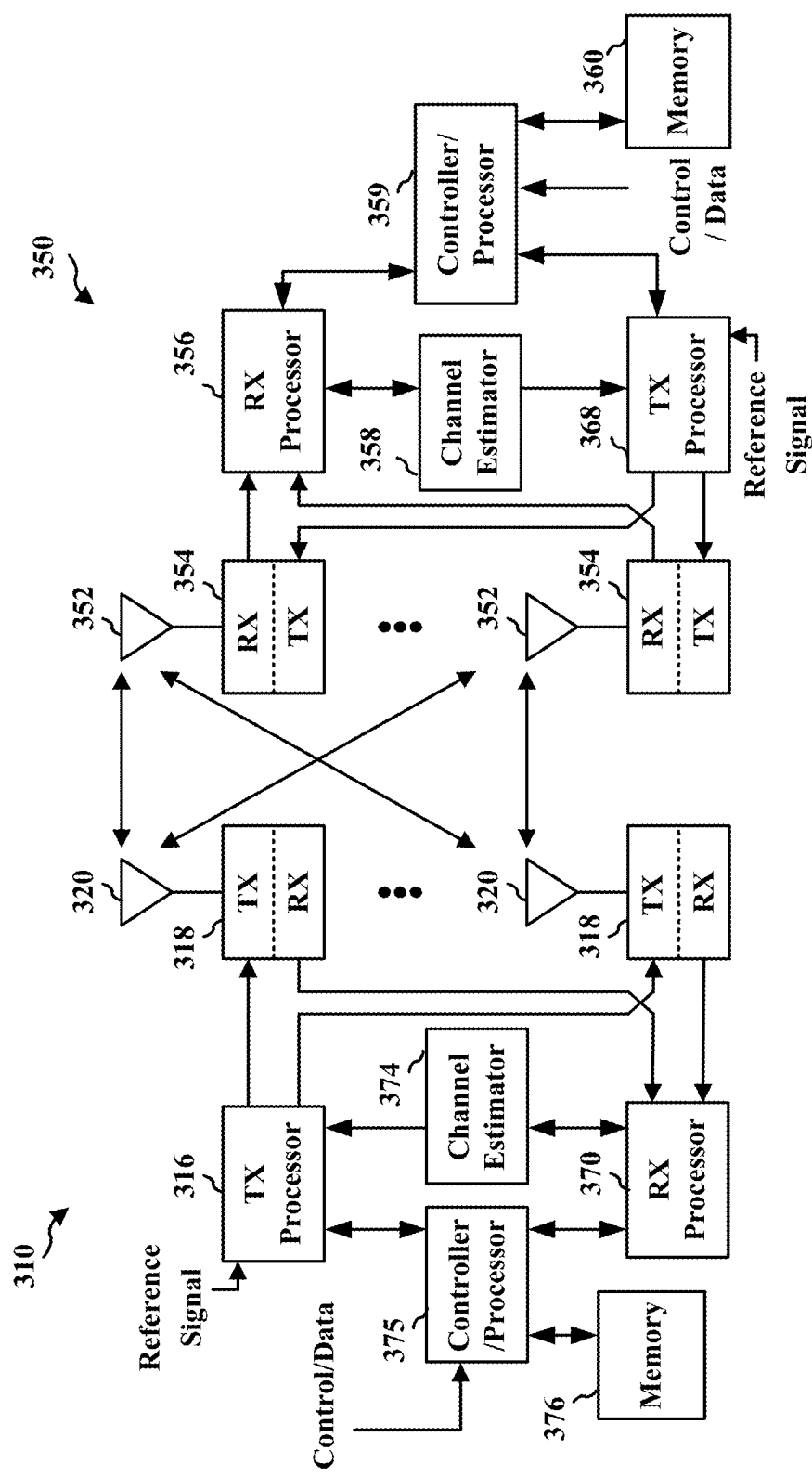
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with at least one of the feedback 197, SPS data 198, and/or retransmission 199 illustrated by FIG. 1.

In some other aspects, at least one of the TX processor 316, the RX processor 370, and the controller/processor 375 may be configured to perform aspects in connection with feedback 197, SPS data 198, and/or retransmission 199 illustrated by FIG. 1.

Figure 4A:
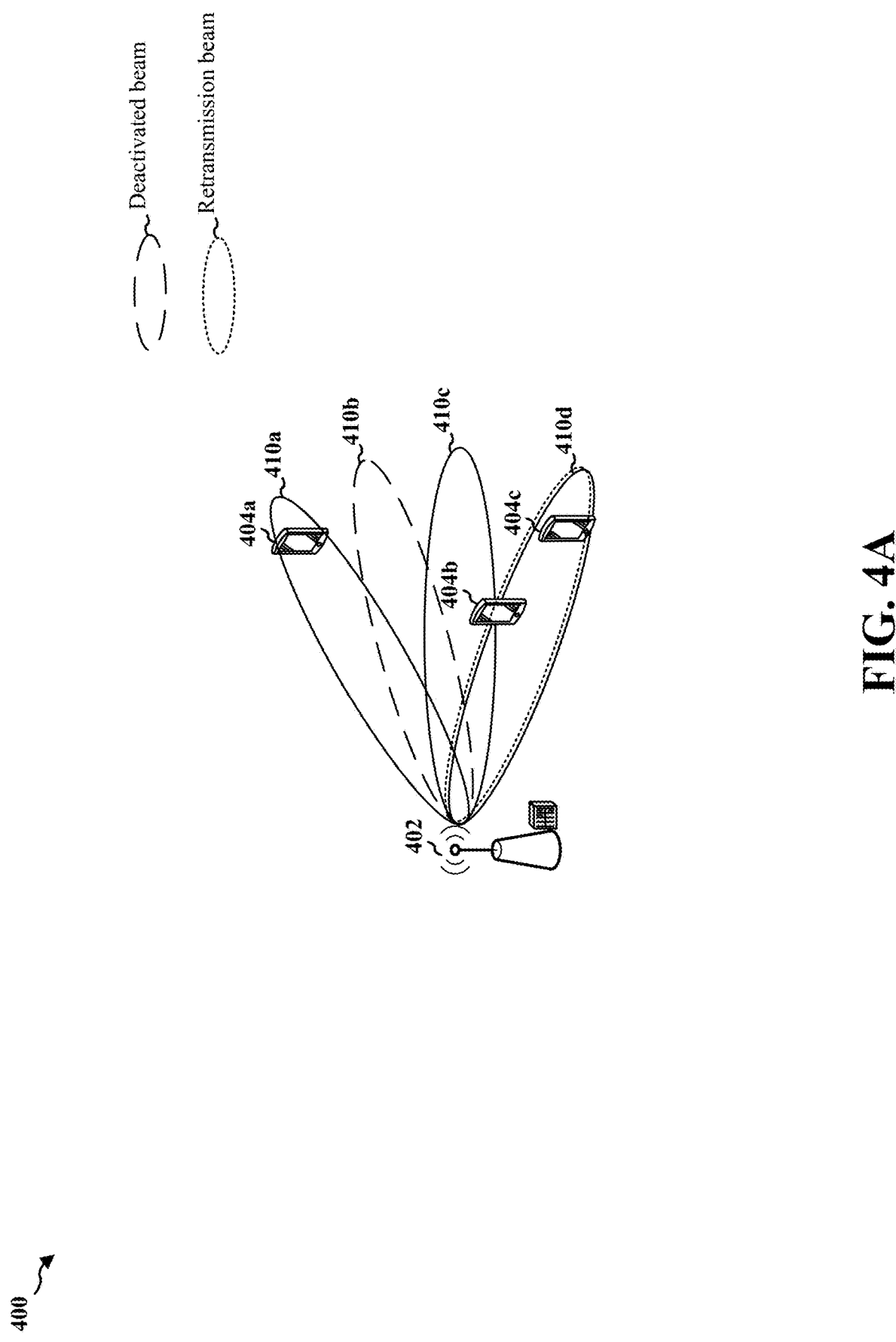
FIG. 4A is a diagram illustrating an example of a wireless communications system.
Figure 4B:
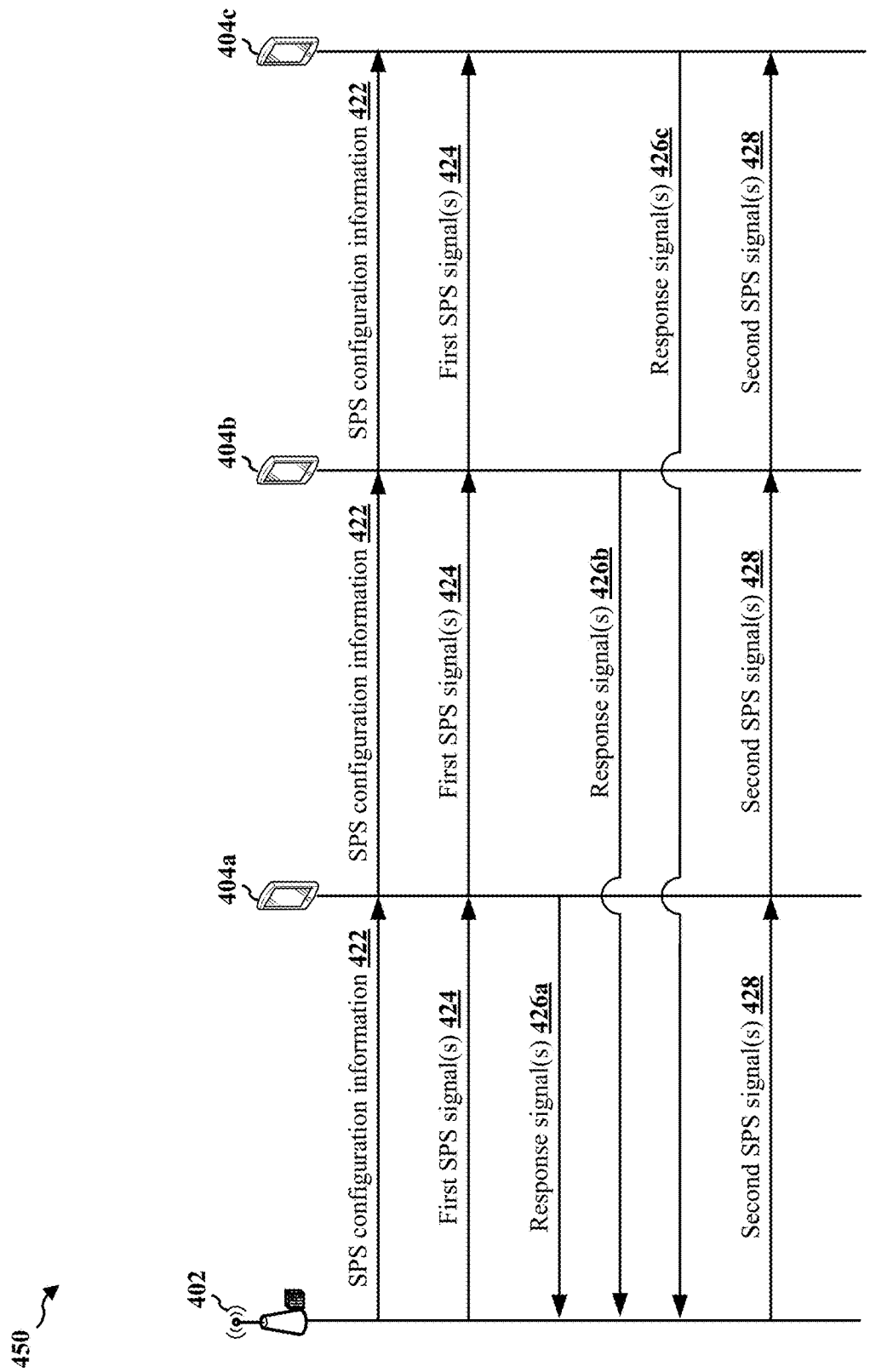
FIG. 4B is a call flow diagram illustrating example operations in the wireless communications system of FIG. 4A.

FIGS. 4A and 4B illustrate an example wireless communications system 400 that includes a base station 402 and a set of UEs 404a-c, and example operations 450 by the base station 402 and the set of UEs 404a-c in the example wireless communications system 400. According to various aspects, the UEs 404a-c may function as and/or may be treated as a group, such as a multicast group configured to receive some common signaling or common information. For example, the UEs 404a-c may each be configured to monitor the same resources on the PDCCH, such as the same CORESET on the PDCCH, and further, the UEs 404a-c may receive and decode the same DCI (e.g., as shown in FIG. 2B). The DCI that is common to all UEs 404a-c of the group may include multicast DCI that indicates an SPS activation or release associated with a set of SPS occasions or associated with other SPS scheduling common to the group of UEs 404a-c.

The group of UEs 404a-c may formed or may be configured. For example, the base station 402 may configure the set of UEs 404a-c as a group for broadcast and/or multicast (hereinafter, "broadcast or multicast"). In addition, the base station 402 may configure the set of UEs 404a-c with SPS. Accordingly, the base station 402 and the UEs 404a-c may communicate broadcast or multicast SPS transmissions, which may be triggered and/or released by the base station 402 using DCI.

To configure the UEs 404a-c with SPS, the base station 402 may transmit SPS configuration information 422 to the UEs 404a-c. In some aspects, the SPS configuration information 422 may be for broadcast and/or multicast, such as SPS configuration information addressed to the UE 404a-c of one multicast group. For example, the SPS configuration information 422 may be based on common resources for a multicast group of the UEs 404a-c. Common resources may include resources that are allocated to all of the multicast group of the UEs 404a-c. In the downlink, for example, common resources may include resources on which multicast transmissions are scheduled or may otherwise be found. Each UE of the multicast group of the UEs 404a-c may receive and decode the information carried on such downlink common resources. In the uplink, for example, common resources may include resources allocated to any or all UEs of the multicast group of the UEs 404a-c. Accordingly, such resources may not be UE-specific; however, such resources may be beam-specific.

In some aspects, the SPS configuration information 422 may include at least one message that implements a mechanism for group addressing that may be leveraged by the base station 402 for multicast. In some configurations, the base station 402 may address the at least one message of the SPS configuration information 422 to at least one address that collectively identifies a group including the UEs 404a-c, which may or may not (implicitly) identify each of the individual UEs 404a-c. For example, each of the UEs 404a-c of the group may be associated with one radio network ID or one RNTI via which the UEs 404a-c included in one group can be addressed—e.g., a group radio network ID or a group-RNTI (G-RNTI) In some other configurations, however, another approach to group addressing may be employed, e.g., group members may be addressed in a multicast message by individually identifying each member of a multicast group using a respective unique ID corresponding to each of the group each of the UEs 404a-c, group members may be divided into subgroups that each is addressed through a respective subgroup address either alone or in combination with a more comprehensive group address.

Illustratively, a mechanism for group addressing may include some portion of a message that is dedicated to or configurable as a group addressing field or other message portion at which multicast group members are able to identify group addressing information for the multicast group that includes the reader. in which the base station 402 may include a multicast group address, such as a field or subfield of a header or sub-header, a MAC CE, or another packetized structure (e.g., a PDU or SDU). The SPS configuration information 422 may be separated over a set of messages. For example, the base station 402 may transmit a portion of the SPS configuration information 422 in at least one of a SIB (broadcast RRC), and/or at least one other unicast RRC that may be carried on a downlink data channel (e.g., PDSCH) and/or at least one DCI message that may be carried on a downlink control channel (PDCCH). In some aspects, a portion of the SPS configuration information 422 may be transmitted on a multicast control channel (MCCH), which may be a logical channel for multicast control information and may be carried on resources of a downlink data channel (e.g., PDSCH).

Potentially, the SPS configuration information 422 may activate the broadcast or multicast SPS transmission, which may indicate to the UEs 404a-c that an SPS transmission is forthcoming according to the resources configured for SPS. For example, the SIB may include the SPS configuration of MCCH and an activation/release DCI with CRC scrambled by a RNTI for SPS MCCH could be used to trigger on/off the SPS transmission of MCCH on PDSCH. The MCCH may include the SPS configuration of a multicast traffic channel (MTCH) and an activation/release DCI with CRC scrambled by a RNTI for SPS MTCH could be used to trigger on/off the SPS transmission of MTCH on PDSCH.

The SPS configuration information 422 may indicate a resource allocation for broadcast or multicast SPS transmissions. The SPS configuration information 422 may indicate a resource allocation in the frequency domain, such as a channel and/or BWP in which the SPS transmissions may be transmitted. In addition, the SPS configuration information 422 may indicate a resource allocation in the time domain, such as periodicity at which an SPS occasion including an SPS transmission may occur. For example, an SPS occasion may include one or more of an SFN, a subframe, and/or a slot in which an SPS transmission may be transmitted by the base station 402, and the SPS occasion may be indicated as a number, index, and/or offset corresponding to an SFN, subframe, and/or slot.

Broadcast or multicast transmissions by the base station 402 may be subject to some QoS parameters (e.g., QoS parameters established according to 5G NR). In order to meet those QoS parameters, ACK/NACK feedback may be configured by the base station 402 for SPS transmissions. Accordingly, the SPS configuration information 422 may further configure a set of feedback resources on which the UEs 404a-c may transmit ACK/NACK feedback to the base station 402. The set of feedback resources may be configured on an uplink channel, such as an uplink control channel (e.g., PUCCH).

The base station 402 and the UEs 404a-c may communicate via beamforming. As broadcast or multicast transmission potentially may need to reach a large number of UEs, some of which may be proximate to the cell edge of the base station 402, the base station 402 may perform beam sweeping in order to extend the coverage area of the base station 402. The base station 402 may sweep through an available set of beams 410a-d to cover the UEs 404a-c. The UEs 404a-c may identify at least a portion of the available set of beams 410a-d of the base station 402 through beam association, as respective SSBs and/or CSI-RSs may be quasi-collocated with SPS transmissions. Using beam sweeping, the SPS transmission of MCCH and/or MTCH may be repeated in multiple beams and the number of beams and beam directions for MCCH and MTCH may be different.

Downlink transmission by the base station 402 may consume resources, and potentially may introduce interference to other systems and devices (e.g., neighboring base stations, UEs near a cell edge, and the like). Therefore, the base station 402 may be configured to transmit broadcast or multicast SPS transmissions via an active set of beams, which may be a subset of the available set of beams 410a-d, but refrain from transmission via an inactive set of beams, which may be a subset of the available set of beams 410a-d that includes those beams excluded from the active set of beams.

The base station 402 may determine the active set of beams so that the base station 402 may efficiently allocate resources, additionally, so that the base station 402 may mitigate interference caused to proximate systems and devices. However, the base station 402 may rely on measurement reporting and/or feedback provided by the UEs 404a-c in order to identify which of the available set of beams 410a-d should be included in the active set of beams. To that end, the base station 402 may transmit a set of first SPS signals 424 to the UEs 404a-c via the available set of beams 410a-d.

In some aspects, the set of first SPS signals 424 may include data and/or control information, which may be carried in a downlink data channel (e.g., PDSCH). In some other aspects, the set of first SPS signals 424 may include SSBs, CSI-RSs, and/or other reference signals upon which the UEs 404a-c may perform measurements. In still further aspects, a portion of the set of first SPS signals 424 may be transmitted via RRC signaling.

Each of the UEs 404a-c may receive a respective subset of the set of first SPS signals 424 transmitted via a respective subset of the available set of beams 410a-d covering the area in which each of the UEs 404a-c is located. For example, the first UE 404a may receive a respective subset of the set of first SPS signals 424 via the first beam 410a and, similarly, the third UE 404c may receive a respective subset of the set of first SPS signals 424 via the fourth beam 410d. The second UE 404b may be covered by two beams 410c-d, which may allow the second UE 404b to receive transmissions on both beams 410c-d, e.g., so that the second UE 404b may perform beam combining in order to increase the signal quality and/or reliability.

Each of the UEs 404a-c may determine a first subset of the available set of beams 410a-d based on the set of first SPS signals 424. Thus, each of the UEs 404a-c may select one or more of the beams 410a-d covering each of the UEs 404a-c. For example, the first UE 404a may determine the first subset of the available set of beams 410a-d by selecting the first beam 410a, the second UE 404b may determine the first subset by selecting the third and fourth beams 410c-d, and the third UE 404c may determine the first subset by selecting the fourth beam 410d.

Each of the UEs 404a-c may be configured to transmit a respective one of the response signals 426a-c indicating a respective first subset of the available set of beams 410a-d to the base station 402 on an uplink channel. According to a first aspect, beam selection by the UEs 404*a-c* may be non-transparent to the base station 402. In such an aspect, the base station 402 may track beam monitoring for all of the UEs 404*a-c* configured in the broadcast or multicast group. The base station 402 may configure each of the UEs 404*a-c* with at least one UE-specific feedback resource on an uplink channel (e.g., an uplink control channel, such as a PUCCH).

Further to the first aspect, each of the UEs 404*a-c* may receive configuration information indicating a UE-specific feedback resource on the uplink channel from the base station 402. Each of the UEs 404*a-c* may thus be able to transmit information indicating the respective first subset of beams selected by each of the UEs 404*a-c* on a respectively configured UE-specific feedback resource. Potentially, each of the UEs 404*a-c* may perform measurements on those of the first SPS signals 424 received by each of the UEs 404*a-c*, such as measurements of a reference signal received power (RSRP), a reference signal received quality (RSRQ), a signal-to-noise ratio (SNR), a reference signal strength indicator (RSSI), and/or other measurement. For example, the first UE 404*a* may perform measurements on those of the first SPS signals 424 received via the first beam 410*a*. Each of the UEs 404*a-c* may then transmit, to the base station on the respectively configured UE-specific feedback resource on the uplink channel, measurement information associated with the respective first subset of the available set of beams 410*a-d* selected by each of the UEs 404*a-c*.

The base station 402 may receive the response signals 426*a-c* from the UEs 404*a-c* on the UE-specific feedback resources configured on the uplink channel, and each of the response signals 426*a-c* may indicate at least one beam. The base station 402 may then determine an active set of beams of the available set of beams 410*a-d* based on the response signals 426*a-c*. For example, the base station 402 may determine the active set of beams based on the measurements reported by the UEs 404*a-c* for each of the first beam 410*a*, third beam 410*c*, and fourth beam 410*d* via which the UEs 404*a-c* received at least one of the first SPS signals 424. According to the response signals 426*a-c*, the base station 402 may determine the active set of beams to include the first beam 410*a*, third beam 410*c*, and fourth beam 410*d*, but to exclude the second beam 410*b*.

According to a second aspect, the beam selection by the UEs 404*a-c* may be transparent to the base station 402. In order to determine the active set of beams, the base station 402 does not necessarily need to know which of the UEs 404*a-c* is covered by which of the available beams 410*a-d*; rather, the base station 402 may determine the active set of beams as long as the base station 402 is informed that at least one of the UEs 404*a-c* is covered by one of the available beams 410*a-d* to be included in the active set of beams. In such an aspect, the base station 402 may configure each of a set of beam-specific feedback resources on the uplink channel for a respective one of the available set of beams 410*a-d*.

Illustratively, the base station 402 may configure a first feedback resource on the uplink channel for the first beam 410*a*, a second feedback resource on the uplink channel for the second beam 410*b*, a third feedback resource on the uplink channel for the third beam 410*c*, and a fourth feedback resource on the uplink channel for the fourth beam 410*d*. In other words, the base station 402 may configure shared resources on the uplink channel to be used by the UEs 404*a-c* to transmit response signals 426*a-c* indicating feedback for those of the available beams 410*a-d* to be included in the active set of beams.

Further to the second aspect, each of the UEs 404*a-c* may receive configuration information indicating the set of beam-specific feedback resources on the uplink channel for a respective beam of the available set of beams 410*a-d*. Each of the UEs 404*a-c* may then transmit one of the response signals 426*a-c* on the beam-specific feedback resource corresponding to one of the available beams 410*a-d* via which each of the UEs 404*a-c* received one of the first SPS signals 424. For example, the second UE 404*b* may transmit two of the response signals 426*a-c* on the third and fourth beam-specific feedback resources corresponding to the third and fourth beams 410*c-d* via which the second UE 404*b* received the first SPS signals 424.

In one option of the second aspect, at least one of the UEs 404*a-c* may transmit a respective one of the response signals 426*a-c* on a beam-specific feedback resource if the at least one of the UEs 404*a-c* detects a reference signal (e.g., SSB, CSI-RS, and/or DM-RS) received via the corresponding beam of the available beams 410*a-d*. For example, the first UE 404*a* may determine a respective energy (or received power) corresponding to each of the first SPS signals 424 received via one or more of the available beams 410*a-d*.

The first UE 404*a* may compare each of the respective energies to an energy-detection threshold. If an energy corresponding to one of the first SPS signals 424 received via one of the available beams 410*a-d* satisfies (e.g., meets or exceeds) the energy-detection threshold, then the first UE 404*a* may transmit a response signal 426*a* on the beam-specific resource corresponding to the one of the available beams 410*a-d* via which the one of the first SPS signals 424 from which the respective energy satisfying the energy-detection threshold was detected.

In a second option of the second aspect, the first SPS signals 424 may include at least a control signal on an MCCH carried in the downlink data channel (e.g., PDSCH); however, the base station 402 may refrain from transmitting any data on a multicast traffic channel (MTCH) in the downlink data channel, e.g., when the base station 402 transmits the first SPS signals 424 for a beam selection procedure that is transparent to the base station 402. The control signal may include any control information that each of the UEs 404*a-c* is able to successfully receive and decode.

Each of the UEs 404*a-c* may detect for a control signal carried on the MCCH via one of the available set of beams 410*a-d*. When each of the UEs 404*a-c* successfully detects a control signal on the MCCH in the downlink data channel via one of the available beams 410*a-d*, each of the UEs 404*a-c* may generate a respective ACK signal corresponding to the respective control signal received via a respective one of the available beams 410*a-d*. Each of the UEs 404*a-c* may then transmit a respective one of the response signals 426*a-c*, which indicates the ACK signal, on the beam-specific feedback resource corresponding to the respective one of the beams 410*a-d* via which the control signal was received.

Illustratively, the second UE 404*b* may successfully receive a first control signal on the MCCH in the downlink data channel via the third beam 410*c* and, further, may successfully receive a second control signal on the MCCH in the downlink data channel via the fourth beam 410*d*. Based on successfully receiving the first and second control signals via the third and fourth beams 410*c-d*, respectively, the second UE 404*b* may transmit response signals 426*b* indicating ACK signals on the beam-specific feedback resources corresponding to the third and fourth beams 410*c-d*.

Similarly, the first UE 404a may transmit a response signal 426a indicating an ACK signal on the beam-specific feedback resource corresponding to the first beam 410a. The base station 402 may receive the response signals 426a-b from the first and second UEs 404a-b, and may determine that the first, third, and fourth beams 410a, 410c-d should be included in the active set of beams, because there are UEs within the coverage area of those beams that are able to successfully receive downlink transmissions, as indicating by the ACK signals.

However, if the UEs 404a-c fail to receive a control signal via one of the available beams 410a-d, then the UEs 404a-c may refrain from transmitting any response signals to the base station 402. Specifically, each of the UEs 404a-c may refrain from transmitting NACK feedback, e.g., in response to receiving a control signal via one of the available beams 410a-d that is unsuccessfully decoded and/or is received with a substantial amount of interfering signals.

When the base station 402 fails to receive any response signals indicating ACK signals on a beam-specific feedback resource corresponding to one of the available beams 410a-d, then the base station 402 may determine that no UEs are within the coverage area of that one of the available beams 410a-d, and therefore, the base station 402 may exclude that one of the available beams 410a-d from the active set of beams. For example, the base station 402 may exclude the second beam 410b from the active set of beams because the base station 402 may fail to receive any response signals indicating ACK signals on the beam-specific feedback resource configured for the second beam 410b.

In some aspects, the aforementioned first and second options of the second aspect may be configurable and/or may be implemented together. For example, the energy-detection threshold may be configurable. In another example, the type of reference signal and/or control signal based upon which the UEs 404a-c determine whether to transmit response signals 426a-c on beam-specific feedback resources may be configurable. That is, the base station 402 may configure the UEs 404a-c to use CSI-RSs or DM-RSs as the reference signals, and/or may configure the UEs 404a-c to use transmissions on a specific set of resources in the MCCH as the control signals.

The base station 402 may dynamically configure beam activation and deactivation (e.g., deactivation may include inactivation) for broadcast or multicast SPS communication. The base station 402 may transmit information associated with the available beams 410a-d to the UEs 404a-c, e.g., so that the UEs 404a-c are able to provide measurements and/or other reporting associated with the available beams 410a-d to the base station 402. Thus, the base station 402 may activate and/or deactivate beams of the available beams 410a-d based on UE-specific measurement reporting and/or other feedback. In particular, the base station 402 may deactivate beams of the available beams 410a-d via which no UEs will receive broadcast or multicast data, e.g., as no UEs within the group configured for the broadcast or multicast SPS may be within the coverage area of such beams.

In a first aspect of beam activation or deactivation, the beam activation or deactivation configured by the base station 402 may be non-transparent to the UEs 404a-c. In such an aspect, the base station 402 may include some signaling to indicate which of the available beams 410a-d are activated, as well some signaling to indicate which of the available beams 410a-d are deactivated, in the SPS configuration information 422. The base station 402 may transmit the signaling to indicate which of the available beams 410a-d is activated and/or deactivated via RRC signaling, via a SIB, and/or via the MCCH in the downlink data channel (e.g., PDSCH).

In some aspects, the signaling to indicate which of the available beams 410a-d is activated and/or deactivated may include a bitmap. The size of the bitmap is equal to the total number of available beams, where the total number of available beams may be predefined/configured by RRC for MCCH and then by MCCH for MTCH, or alternatively predefined/configured by RRC for both MCCH and MTCH. The base station 402 may generate the bitmap to include a respective bit that corresponds to each of the available beams 410a-d and/or corresponds to a respective transmission configuration indicator (TCI) state that may be associated with each of the available beams 410a-d and/or corresponds to respective quasi-colocation (QCL) information. The base station 402 may insert a "1" in each bit corresponding to an activated one of the available beams 410a-d (e.g., those of the available beams 410a-d included in the active set of beams), but may insert a "0" in each bit corresponding to a deactivated one of the available beams 410a-d. A special case is that each beam for multicast is associated with an SSB. Therefore, the bitmap of SSB may be used to implicitly indicate the beam activation or deactivation of control and/or data of the broadcast or multicast transmission. In some aspects, the bitmap of SSB may be indicated by unicast RRC signaling, while in other aspects, the bitmap of SSB may be indicated by broadcast or multicast signaling.

Illustratively, the first, third, and fourth beams 410a, 410c-d may be activated and included in the active set of beams, e.g., as at least one of the UEs 404a-c is within the coverage area of each of those beams; however, the second beam 410b may be deactivated and excluded from the active set of beams, e.g., as none of the UEs 404a-c are within the coverage area of the second beam 410b. Accordingly, the base station 402 may generate a bitmap in which a first bit at a first position corresponds to the first beam 410a and/or associated first TCI state and/or associated first QCL information, a second bit at a second position (e.g., next consecutive position) corresponds to the second beam 410b and/or associated second TCI state and/or associated second QCL information, a third bit at a third position (e.g., position consecutively following the second position) corresponds to the third beam 410c and/or associated third TCI state and/or associated third QCL information, and a fourth bit at a fourth position (e.g., position consecutively following the third position) corresponds to the fourth beam 410d and/or associated fourth TCI state and/or associated fourth QCL information. Thus, the base station 402 may generate a bitmap indicating "1011" to indicate the first, third and fourth beams 410a, 410c-d are included in the active set of beams but the second beam 410b is excluded from the active set of beams.

Each of the UEs 404a-c may receive the bitmap from the base station 402. One or more of the UEs 404a-c may use the bitmap information indicating the active set of beams in order to determine (e.g., calculate) a respective feedback resource on an uplink channel (e.g., PUCCH) on which each of the UEs 404a-c is to transmit a respective one of the response signals 426a-c. Each of the UEs 404a-c may perform measurements and/or determine other feedback (e.g., ACK/NACK feedback) based on the first SPS signals 424 received by each of the UEs 404a-c on a respective subset of the available beams 410a-c. The first SPS signals 424 may include, for example, at least one SPS transmission over at least one SPS occasion, such as SPS data and/or control information on an MTCH and/or MCCH, respectively, and which may include one or more reference signals. Each of the UEs 404a-c may include the respective measurements, feedback, and/or other reporting in a respective one of response signals 426a-c. Each of the UEs 404a-c may then transmit the respective one of response signals 426a-c to the base station 402 on a respective feedback resource.

The base station 402 may receive the response signals 426 on the feedback resources, and the base station 402 may dynamically determine which of the available beams 410a-d to include in the active set of beams and/or which of the available beams 410a-d to deactivate based on the response signals 426. The base station 402 may transmit second SPS signals 428 via each of the active set of beams to the UEs 404a-c on the downlink data channel, e.g., over one SPS occasion of a set of SPS occasions. The second SPS signals 428 may include broadcast or multicast data and/or control information—e.g., data may be carried on an MTCH in the downlink data channel and control information may be carried on an MCCH in the downlink data channel.

Correspondingly, the UEs 404a-c may receive the second SPS signals 428 on the downlink data channel via at least one of the active set of beams, e.g., over the one SPS occasion of the set of SPS occasions. Potentially, one or more of the UEs 404a-c (e.g., the second UE 404b) may use the bitmap to receive multiple repetitions of the second SPS signals 428 on multiple active beams in order to construct the SPS transmission via beam combining. For example, the second UE 404b may be informed through the bitmap of the activation of the third and fourth beams 410c-d, both of which at least partially cover the second UE 404b. The second UE 404b may combine multiple repetitions of the second SPS signals 428 received by the second UE 404b on the third and fourth beams 410c-d to reconstruct the second SPS signals 428, which may improve reliability and increase the probability of successful reception by the second UE 404b.

In a second aspect of beam activation or deactivation, the beam activation or deactivation configured by the base station 402 may be transparent to the UEs 404a-c. In such an aspect, the base station 402 may refrain from informing the UEs 404a-c of which of the available beams 410a-d are included in the active set of beams and which of the available beams 410a-d are excluded from the active set of beams. However, the base station 402 may transmit information indicating the total number of the available beams 410a-d to the UEs 404a-c, e.g., in the SPS configuration information 422. The base station 402 may transmit the signaling to indicate the total number of available beams 410a-d via unicast RRC signaling, via a SIB for MCCH and/or MTCH, and/or via the MCCH in the downlink data channel (e.g., PDSCH) for MTCH. Alternatively, the total number of available beams may be predefined for MCCH and/or MTCH.

Illustratively, the base station 402 may inform the UEs 404a-c that the base station 402 is configured with four total available beams 410a-d (and/or TCI states and/or QCL information). However, the base station 402 may refrain from informing the UEs 404a-c that the base station 402 is configured with the first, third, and fourth beams 410a, 410c-d as activated (and included in the active set of beams), and is configured with the second beam 410b as deactivated (and excluded from the active set of beams).

The UEs 404a-c may receive information indicating the total number of the available beams 410a-d from the base station 402. Each of the UEs 404a-c may determine a respective feedback resource allocation on the uplink channel based on the total number of available beams 410a-d, e.g., using a predefined resource allocation rule that considers the total number of available beams of the base station 402. Each of the UEs 404a-c may then transmit the respective one of response signals 426a-c to the base station 402 on a respective feedback resource.

In some potential scenarios, one or more of the UEs 404a-c may fail to receive an SPS transmission from the base station 402, such as the first SPS signals 424. In such potential scenarios, the base station 402 may be configured to retransmit SPS signals (e.g., broadcast or multicast data and/or control information). The base station 402 may retransmit SPS signals based on feedback from the UEs 404a-c, such as NACK feedback, and/or based on an absence of feedback from the UEs 404a-c, such as the absence of ACK feedback. However, retransmitting the SPS signals via all of the active set of beams may consume unnecessary resources and/or may introduce interference to proximate systems and devices. According, the base station 402 may be configured for separate beam management with respect to initial transmissions and retransmissions of SPS signaling.

The separate beam management for initial transmissions and retransmissions of SPS signaling may be based on different feedback configurations for the UEs 404a-c. In some aspects, a beam-specific group ACK may be configured for initial transmissions of SPS signaling. That is, for an initial transmission, the base station 402 may configure each of a set of beam-specific ACK resources on the uplink channel (e.g., PUCCH) for a respective beam of the active set of beams, which may include the first, third, and fourth beams 410a, 410c-d. Each of the UEs 404a-c may receive SPS configuration information 422 that indicates the set of beam-specific ACK resources on the uplink channel for a respective beam of the active set of beams included in the available beams 410a-d.

Accordingly, for an initial transmission of SPS signaling (e.g., the first SPS signals 424), the UEs 404a-c may transmit the response signal 426a-c indicating ACK feedback on the beam-specific ACK resources corresponding to those beams of the active set of beams via which the UEs 404a-c are able to successfully receive the first SPS signals 424. In some aspects, the second UE 404b may be able to transmit more than one response signal 426b on more than one beam-specific ACK resource, e.g., as the second UE 404b may be configured for beam combining when covered by the third and fourth beams 410c-d of the active set of beams.

Illustratively, the first and second UEs 404a-b may successfully receive the first SPS signals 424 via the first, third, and fourth beams 410a, 410c-d of the active set of beams. Therefore, the base station 402 may receive response signals 426a-b indicating ACK feedback on the beam-specific ACK resources corresponding to the first, third, and fourth beams 410a, 410c-d, and the base station 402 may determine that the first SPS signals 424 were successfully received via the first, third, and fourth beams 410a, 410c-d. However, the third UE 404c may fail to successfully receive the first SPS signals 424 via the fourth beam 410d of the active set of beams.

For retransmissions of SPS signaling, a beam-specific group NACK may be used. That is, the base station 402 may configure each of a set of beam-specific NACK resources on the uplink channel (e.g., PUCCH) for a respective beam of the active set of beams. The set of beam-specific NACK resources may be different from the set of beam-specific ACK resources (e.g., different resources, different periodicity), and may be triggered by DCI with a different RNTI or a flag in DCI with the same RNTI. The UEs 404*a-c* may receive the SPS configuration information 422 that indicates each of the set of beam-specific NACK resources on the uplink channel for a respective beam of the active set of beams. Each of the UEs 404*a-c* may allowed to select one of the beam-specific NACK resources, such that each of the UEs 404*a-c* may select a subset of the active set of beams for retransmission among the respectively detected beams of the active set.

Thus, when the third UE 404*c* fails to successfully receive the first SPS signals 424 via the fourth beam 410*d*, the third UE 404*c* may transmit the third response signal 426*c* indicating NACK feedback associated with the first SPS signals 424 on the beam-specific NACK resource corresponding to the fourth beam 410*d* via which the first SPS signals 424 are unsuccessfully received.

The base station 402 may receive the third response signal 426*c* indicating NACK feedback on the beam-specific NACK resource corresponding to the fourth beam 410*d*. In response, the base station 402 may transmit the second SPS signals 428, which may be a retransmission of the first SPS signals 424, via the fourth beam 410*d*, e.g., so that the third UE 404*c* may receive the retransmission of the first SPS signals 424. However, the base station 402 may refrain from transmitting the second SPS signals 428 via the first and third beams 410*a*, 410*c*, which may correspond to beam-specific ACK resources on which the base station 402 received response signals 426*a-b* and, further, may not correspond to any beam specific NACK resources on which the base station 402 received response signals 426*c*. Effectively, the base station 402 may avoid unnecessary consumption of resources and/or introduction of interference by limiting retransmissions to only those beams covering UEs that unsuccessfully received initial transmissions.

In some aspects, the base station 402 may configure one or more of the UEs 404*a-c* with SPS for at least two broadcast or multicast services and/or may configure different sets of the UEs 404*a-c* with SPS for different broadcast or multicast services. Each of the broadcast or multicast services may be associated with a different SPS configuration. For each broadcast or multicast service, the base station 402 may configure transmission of respective SPS signaling differently from that configured for the other broadcast or multicast service(s). For example, the base station 402 may configure transmission of SPS signaling for a first broadcast or multicast service to have at least one of a different active set of beams and/or a different SFN cell combination than that configured for a second broadcast or multicast service.

Thus, beam management may be separately configured for different broadcast or multicast services. Potentially, beam sweeping with beam activation or deactivation (e.g., based on UE feedback) may be extended for periodic data transmission without DCI triggering (or DCI activation) or DCI releasing (or DCI deactivation) for one or more of the UEs 404*a-c*. However, beam sweeping with beam activation or deactivation (e.g., based on UE feedback) may be signaled via MAC CE activation or deactivation instead.

Further, the base station 402 may separately configure communication of SPS signaling for different broadcast or multicast services by configuring different feedback resources on the uplink channel for different broadcast or multicast services. When one of the UEs 404*a-c* then receives SPS signaling (e.g., data and/or control signaling on the MTCH and/or MCCH, respectively) for a first broadcast or multicast service via one of the active set of beams configured for the first broadcast or multicast service, then that one of the UEs 404*a-c* may send ACK feedback on the feedback resource corresponding to that one of the active set of beams that is configured for the first broadcast or multicast service (and not on a feedback resource corresponding to that same beam but configured for the second broadcast or multicast service).

Correspondingly, when one or more of the UEs 404*a-c* receives another broadcast or multicast service, the one or more of the UEs 404*a-c* may receive other SPS configuration information, which may be for broadcast and/or multicast (e.g., similar to the SPS configuration information 422). The other SPS configuration information may indicate another set of feedback resources on the uplink channel for the second broadcast or multicast service, which may be different from a set of feedback resources on the uplink channel configured for a first broadcast or multicast service.

The one or more of the UEs 404*a-c* may receive, from the base station 402 on the downlink data channel, other SPS signals associated with the other broadcast or multicast service, which may be different from the first and/or second SPS signals 424, 428 associated with the first broadcast or multicast service, and may be received via at least one of a different active set of beams of the available beams 410*a-d* and/or a different SFN cell combination. When the one or more of the UEs 404*a-c* successfully receives the other SPS signals associated with the other broadcast or multicast service, the one or more of the UEs 404*a-c* may transmit response signals indicating ACK feedback (e.g., similar to the response signals 426*a-c*) on the other set of feedback resources configured for the second broadcast or multicast service.

Figure 5A:
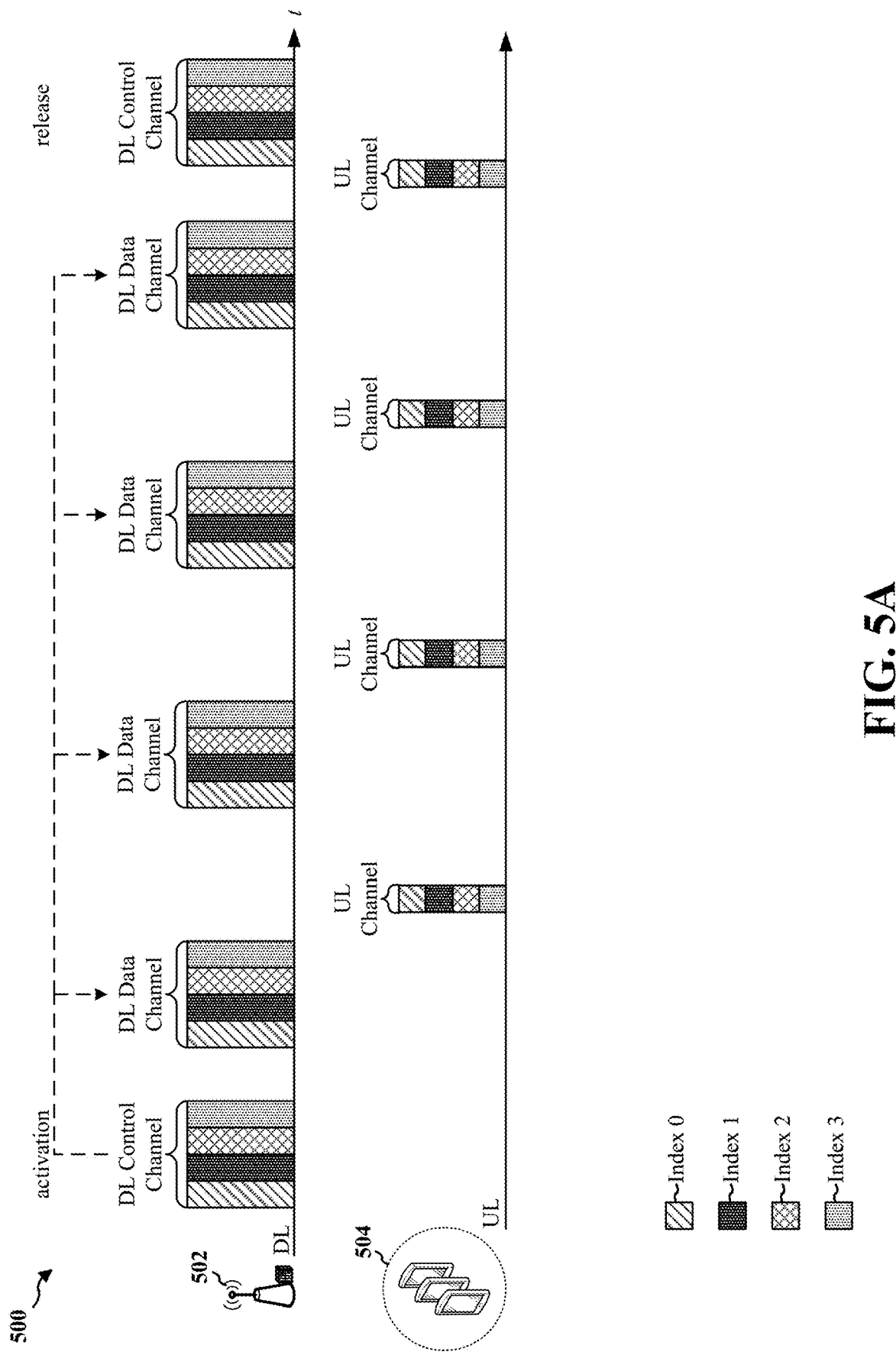
FIGS. 5A and 5B are diagrams illustrating example communication in wireless communications system.
Figure 5B:
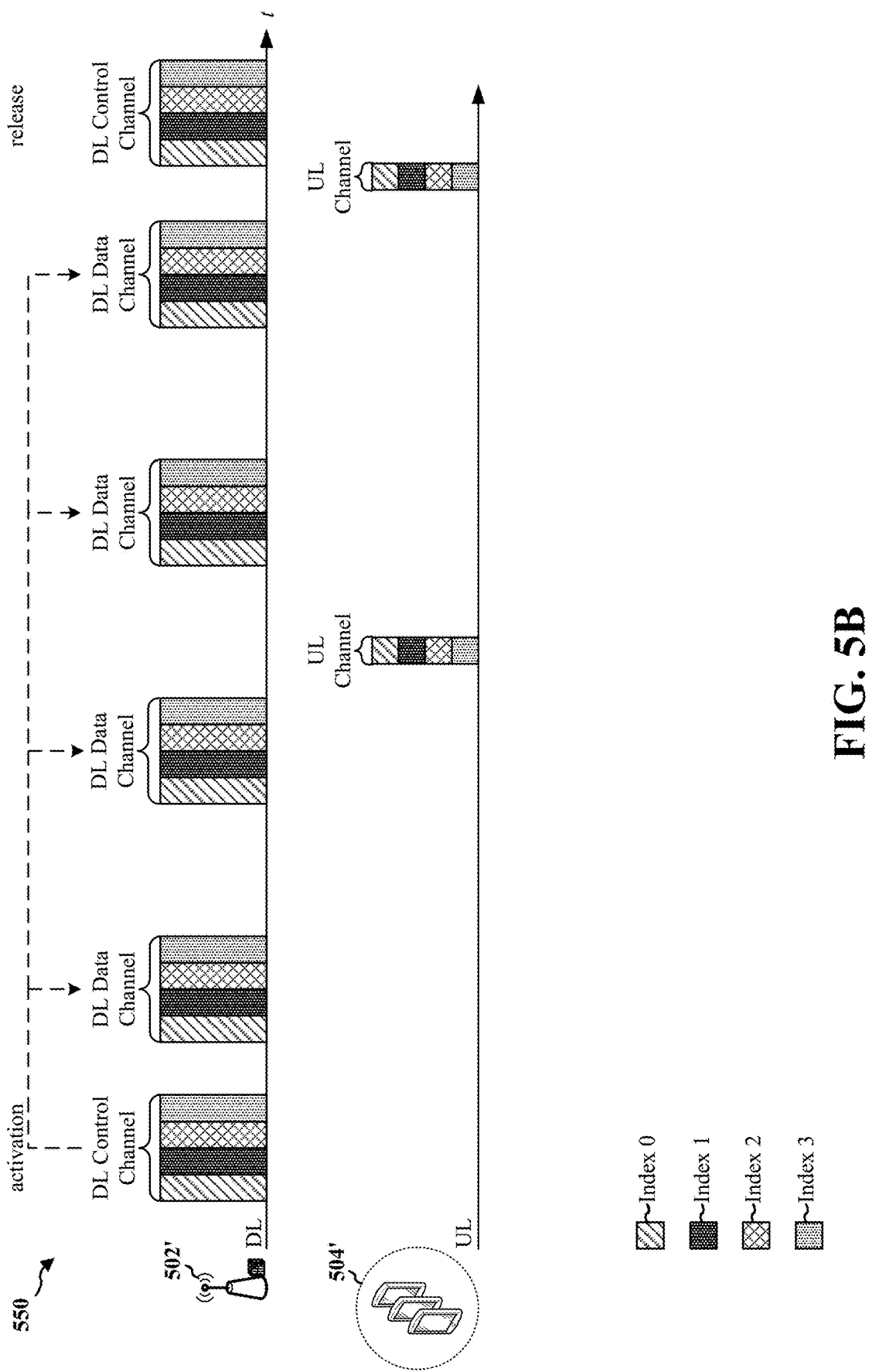

FIGS. 5A and 5B are diagrams illustrating example wireless communications systems 500, 550 that include first and second aspects of a base station 502, 502' and a set of UEs 504, 504'. The base station 502, 502' may be configured to allocate resources for beam-specific feedback on an uplink channel. The base station 502, 502' may respectively configure the set of UEs 504, 504' with SPS. When the base station 502, 502' is to transmit SPS signaling on a downlink data channel (e.g., PDSCH), the base station 502, 502' may activate the downlink SPS signaling using control signaling on a downlink control channel (e.g., PDCCH).

Accordingly, the base station 502, 502' may transmit the SPS signaling following the SPS activation on the downlink control channel. The base station 502, 502' may transmit the SPS signaling on each of an active set of TX beams, which may be indexed. Illustratively, the active set of TX beams may be indexed from 0-4. The indexes may also refer to TCI states and/or QCL information.

The base station 502, 502' may configure a set of uplink resources on the uplink channel for feedback. Each of the set of uplink resources may correspond to a respective TX beam of the active set of TX beams. The base station 502, 502' may transmit SPS configuration information for broadcast and/or multicast indicating the set of uplink resources to the set of UE 504, 504', which may be configured with broadcast or multicast SPS. The base station 502, 502' may then transmit the SPS signaling to the set of UE 504, 504' via the set of TX beams over each of the set of SPS occasions. The SPS signaling may include SPS data on the downlink data channel (e.g., PDSCH) and/or may include one or more reference signals (e.g., CSI-RS and/or DM-RS).

Each of the set of UE 504, 504' may receive the SPS signaling on a respective subset of the set of TX beams, indexed from 0 to 3, and therefore, each of the set of uplink resources may respectively correspond to one of the set of TX beams, indexed from 0 to 3. Each of the set of UE 504, 504' may generate, and transmit to the base station 502, 502', feedback on a respective subset of the set of uplink resources corresponding to a respective subset of the set of TX beams based on receiving the SPS signaling.

The feedback may indicate either ACK or NACK based on whether the SPS signaling is successfully received over a subset of the set of SPS occasions. In one aspect, the SPS signaling may be transmitted with at least one reference signal over each of the set of SPS occasions, and the feedback may be based on the at least one reference signal over at least one of the subset of the set of SPS occasions. In another aspect, the SPS signaling may include SPS data over each of the set of SPS occasions, and the feedback may be based on the SPS data over at least one of the subset of the set of SPS occasions. The subset of the set of SPS occasions may be configured by the base station 502, and may be indicated in the SPS configuration information for broadcast and/or multicast.

In FIG. 5A, the subset of the set of SPS occasions of the SPS signaling associated with the feedback may be one SPS occasion, and therefore, the SPS configuration information for broadcast and/or multicast may indicate that the number of the subset of the set of SPS occasions is one. In FIG. 5B, the subset of the set of SPS occasions of the SPS signaling associated with the feedback may be at least two SPS occasions, and therefore, the SPS configuration information for broadcast and/or multicast may indicate that the number of the subset of the set of SPS occasions is two (or more, in other aspects).

The base station 502, 502' may receive each of the feedback from a respective UE of the set of UE 504, 504' on at least one of the uplink resources corresponding to at least one TX beam of the set of TX beams. Accordingly, the base station 502 may determine via which of the beams the SPS signaling is successfully or unsuccessfully received.

Referring to FIG. 5A, a first aspect of resource allocation for beam-specific feedback on an uplink channel (e.g., PUCCH) is illustrated. In the first aspect, a 1-to-1 mapping between the beam-specific feedback on the uplink channel and the SPS signaling on the downlink data channel. Thus, the SPS configuration information for broadcast and/or multicast may indicate a number of SPS occasions over which each of the set of UE 504 is to consider when generating feedback to be transmitted on one of the uplink resources corresponding to one of the TX beams on which each of the set of UE 504 receives the SPS signaling. In the first aspect, the number of SPS occasions may be one.

After each SPS occasion, then, each of the set of UE 504 may generate feedback indicating an ACK, if the SPS signaling is successfully received, or a NACK, if the SPS signaling is unsuccessfully received. Each of the set of UE 504 may then transmit the feedback to the base station 502 on a respective uplink resource on the uplink channel corresponding to the one of the TX beams, indexed from 0 to 3, via which the SPS signaling is received. Each of the set of UE 504 may not be expected to transmit feedback for more than one TX beam during the same feedback occasion—e.g., if one of the set of UE 504 receives SPS signaling on at least two of the TX beams, that one of the set of UE 504 may transmit feedback on a uplink resource on the uplink channel corresponding to one TX beam of the at least two TX beams, but may refrain from transmitting feedback on a uplink resource corresponding to other TX beam(s) of the at least two TX beams.

The base station 502 may receive each of the feedback from a respective UE of the set of UE 504 on at least one of the uplink resources corresponding to at least one TX beam of the set of TX beams. Accordingly, the base station 502 may determine via which of the beams the SPS signaling is successfully or unsuccessfully received, as indicated by which of the uplink resources respectively configured to correspond to one of the TX beams carries ACK or NACK feedback.

Referring to FIG. 5B, a second aspect of resource allocation for beam-specific feedback on an uplink channel (e.g., PUCCH) is illustrated. In the second aspect, a 1-to-N mapping between the beam-specific feedback on the uplink channel and the SPS signaling on the downlink data channel. Thus, the SPS configuration information for broadcast and/or multicast indicates a number N of SPS occasions over which each of the set of UE 504' is to consider when generating feedback to be transmitted on one of the uplink resources corresponding to one of the TX beams on which each of the set of UE 504' receives the SPS signaling. In the first aspect, the number N of SPS occasions may be at least two.

After N SPS occasions, then, each of the set of UE 504' may generate feedback indicating an ACK, if the SPS signaling is successfully received over the N SPS occasions, or a NACK, if the SPS signaling is unsuccessfully received over the N SPS occasions. After each of the N SPS occasions, each of the set of UE 504' may then transmit the feedback to the base station 502' on a respective uplink resource on the uplink channel corresponding to the one of the TX beams, indexed from 0 to 3, via which the SPS signaling is received.

Each of the set of UE 504' may determine whether SPS signaling is successfully received over the N SPS occasions based on, for example, detection of the SPS signaling over at least one of the N SPS occasions and/or the average energy detection of the SPS signaling over the N SPS occasions. In one example, each of the set of UE 504' may generate the feedback to indicate an ACK when the energy associated with the SPS signaling detected over at least one SPS occasion of the N SPS occasions satisfies a first threshold. Each of the set of UE 504' may determine whether the respective energy with which the SPS signaling is received on one TX beam of the subset of the set of TX beams at one of the N SPS occasions satisfies the first threshold. Each of the set of UE 504' may transmit feedback indicating an ACK on one uplink resource corresponding to one of TX beams via which the SPS signaling satisfying the first threshold is detected. However, each of the set of UE 504' may transmit feedback indicating a NACK on one uplink resource corresponding to one of the TX beams via which the SPS signaling failing to satisfy the first threshold is detected.

In another example, each of the set of UE 504' may generate the feedback to indicate an ACK when the energy associated with the SPS signaling averaged over the N SPS occasions satisfies a second threshold. Thus, in some aspects, each of the set of UE 504' may detect, at each of the N SPS occasions, a respective energy with which the SPS signaling is received on each TX beam of the subset of the set of TX beams, and each of the set of UE 504' may determine a respective average energy with which the SPS signaling is received via one of the TX beams over each of the N SPS occasions. Each of the set of UE 504' may generate respective feedback to indicate an ACK if the respective average energy associated with one of the TX beams satisfies the second threshold, and each of the set of UE 504' may transmit the feedback on the uplink resource corresponding to that one of the TX beams via which the respective average energy satisfying the second threshold is detected. However, each of the set of UE 504' may then generate respective feedback to indicate a NACK if the respective average energy associated with one of the TX beams fails to satisfy the second threshold, and each of the set of UE 504' may transmit the feedback on the uplink resource corresponding to that one of the TX beams via which the respective average energy failing to satisfy the second threshold is detected.

The base station 502' may receive each of the feedback from a respective UE of the set of UE 504' on at least one of the uplink resources corresponding to at least one TX beam of the set of TX beams. Accordingly, the base station 502' may determine via which of the beams the SPS signaling is successfully or unsuccessfully received, as indicated by which of the uplink resources respectively configured to correspond to one of the TX beams carries ACK or NACK feedback.

Figure 6:
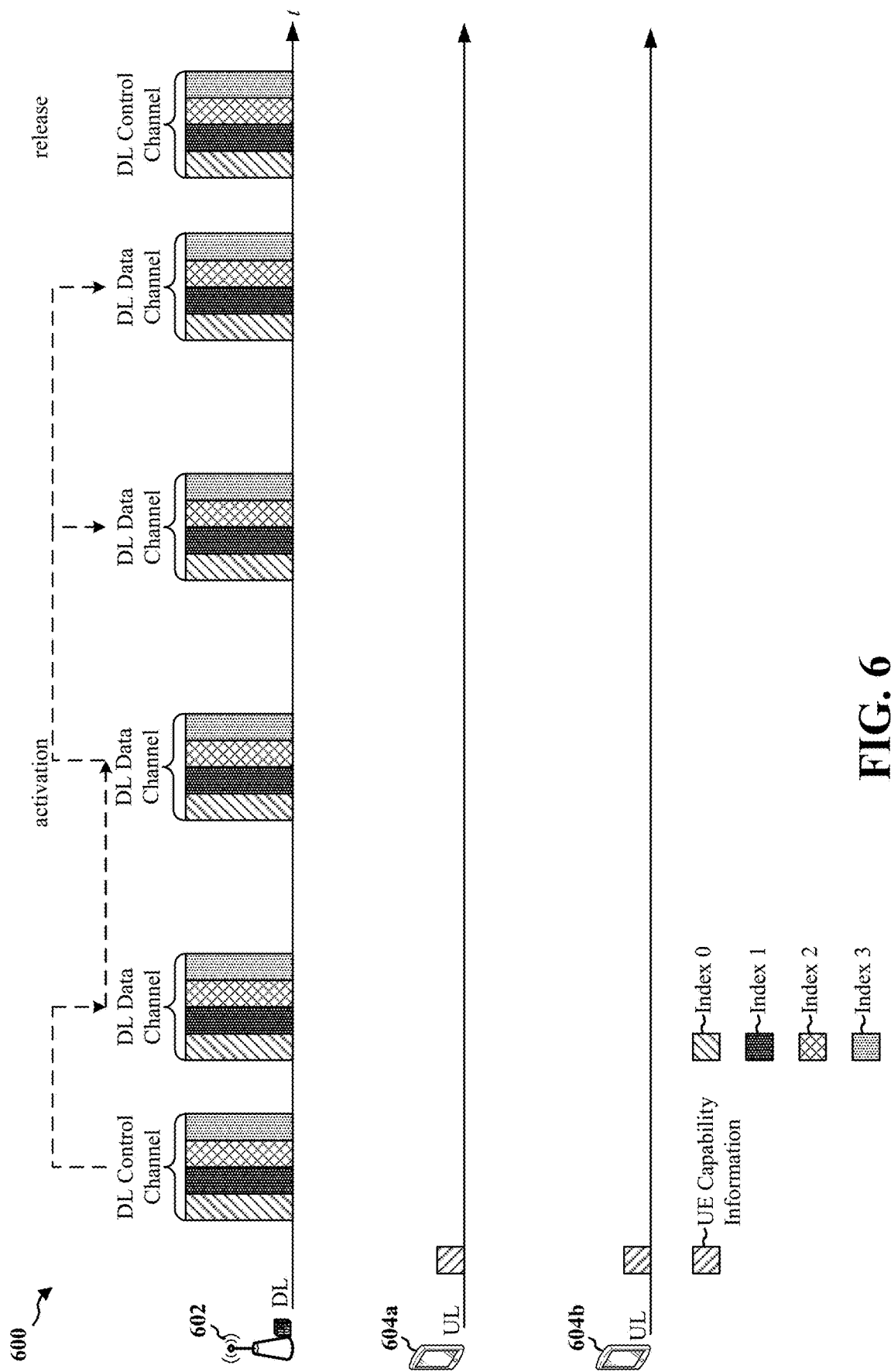
FIG. 6 is a diagram illustrating example communication in wireless communications system.

With reference to FIG. 6, a diagram illustrates a wireless communications system 600 in which a base station 602 communicates with a set of UE that includes a first UE 604a and a second UE 604b. Each of the UE 604a-b may be capable of be configured with SPS, e.g., for receiving broadcast or multicast signaling. In order to do so, the UE 604a-b may inform the base station 602 of the UE capabilities. Accordingly, each of the UE 604a-b may transmit respective UE capability information to the base station 602.

Each of the UE capability information may indicate a capability of a respective one of UE 604a-b for at least one of multicast communication, multi-beam reception (e.g., for beam combining), and/or parallel feedback transmission. For example, a respective capability of multicast communication may indicate a number (e.g., maximum number) of SPS multicast transmissions that each of the UE 604a-b is capable of receiving. A respective capability of multi-beam reception may indicate a number (e.g., maximum number) of TX beams of the base station 602 that each of the UE 604a-b is capable of monitoring (e.g., for downlink SPS transmissions).

A respective capability of feedback may indicate whether the UE is able to feedback for SPS broadcast or multicast transmission. A respective capability of parallel feedback transmission may indicate a number (e.g., maximum number) of parallel transmissions on an uplink channel (e.g., PUCCH) that each of the UE 604a-b is able to transmit for feedback, e.g., if the base station 602 is to configure different sets of uplink resources on the uplink channel for feedback. A respective capability of requiring gap may indicate the minimum time (one of a couple of zero or non-zero values) between different PDSCH transmission for SPS broadcast or multicast transmission. The UE capability may be different per CC and/or different per band.

The base station 602 may receive the respective UE capability information from each of the UE 604a-b. Based on the respective UE capability information, the base station 602 may configure each of the UE 604a-b with broadcast or multicast SPS. The base station 602 may configure the UE 604a-b as a broadcast or multicast group. In addition, the base station 602 may perform beam management for SPS signaling based on the respective UE capability information, such as by activating and/or deactivating TX beams of the base station 602 for SPS signaling transmission.

The base station 602 may indicate activation (or "triggering") of SPS signaling transmission over a set of SPS occasions using DCI on a downlink control channel (e.g., PDCCH). Similarly, the base station 602 may release (or deactivate) the SPS signaling transmission using DCI on the downlink control channel (e.g., PDCCH). Accordingly, SPS signaling is dependent upon DCI on the downlink control channel for activation and release. Consequently, if one of the UE 604a-b misses the activation in the DCI on the downlink control channel, that one of the UE 604a-b may be unable to detect the subsequent broadcast or multicast SPS signaling on the downlink data channel (e.g., PDSCH). That is, the one of the UE 604a-b that misses SPS activation in DCI may be unaware the scheduling for the broadcast or multicast SPS signaling and, therefore, may be unable to find the broadcast or multicast.

As one option to address UE failure to successfully receive the activation DCI, the base station 602 may configure the UE 604a-b with UE-specific ACK/NACK feedback. Thus, each of the UE 604a-b may be able to inform the base station 602 that the activation DCI has been missed, e.g., during a discontinuous transmission (DTX) cycle, by transmitting NACK feedback. The base station 602 may retransmit the activation DCI on the downlink control channel in response to receiving the NACK feedback, which may allow one of the UE 604a-b to receive the activation DCI and begin receiving the SPS signaling (e.g., at subsequent SPS occasions of the downlink data channel). However, UE-specific ACK/NACK feedback configurations may consume a relatively significant amount of resources, and in particular when a broadcast or multicast group configured with SPS includes a relatively large number of UE.

As another option, the base station 602 may configure the UE 604a-b with group-NACK feedback. In such a configuration, each of the UE 604a-b may transmit only NACK feedback on an uplink resource of the uplink channel corresponding to one of the TX beams, indexed from 0 to 3. However, only NACK feedback on uplink resources corresponding to TX beams may cause the base station 602 to assume that each of the UE 604a-b has successfully received the SPS signaling on the downlink data channel, and therefore, would not retransmit the activation DCI on the downlink control channel.

As a further option, the base station 602 may configure the UE 604a-b with group-ACK feedback. In such a configuration, each of the UE 604a-b may transmit only ACK feedback on an uplink resource of the uplink channel corresponding to one of the TX beams, indexed from 0 to 3. However, only ACK feedback on uplink resources corresponding to TX beams may cause the base station 602 to assume that no UEs are covered by some of the TX beams via which no ACK feedback is received, and therefore, the base station 602 may deactivate those TX beams for which no ACK feedback is received on a corresponding uplink resource even though one or more UEs are covered by those TX beams but have failed to successfully receive the activation DCI.

Similarly, if one of the UE 604a-b misses the release in the DCI on the downlink control channel, that one of the UE 604a-b may become unaligned with the base station 602 and may continue sending feedback (e.g., feedback indicating a NACK) for SPS signaling on the downlink data channel that is not actually being transmitted. By transmitting feedback to the base station 602 for signaling that is not actually occurring, the unaligned one of the UE 604a-b may introduce unnecessary interference to proximate systems and devices and, further, may cause unnecessary overhead at the base station 602.

As one option to address UE failure to successfully receive the release DCI, the base station 602 may configure the UE 604a-b with UE-specific ACK/NACK feedback for the release DCI. Thus, each of the UE 604a-b may be able to inform the base station 602 that the release DCI has been missed, e.g., during an on or awake state of a DTX cycle, by transmitting NACK feedback. The base station 602 may retransmit the release DCI on the downlink control channel in response to receiving the NACK feedback for the release DCI, which may allow one of the UE 604*a-b* to receive the release DCI and cease monitoring for SPS signaling (as well as cease feedback transmission). Again, however, UE-specific ACK/NACK feedback configurations may consume a relatively significant amount of resources, and in particular when a broadcast or multicast group configured with SPS includes a relatively large number of UE.

As another option, the base station 602 may configure the UE 604*a-b* with group-NACK feedback for the release DCI. In such a configuration, each of the UE 604*a-b* may transmit only NACK feedback on an uplink resource of the uplink channel corresponding to one of the TX beams, indexed from 0 to 3. However, only NACK feedback on uplink resources corresponding to TX beams may cause one of the UE 604*a-b* to continuously transmit NACK feedback even though the SPS signaling has ended when the one of the UE 604*a-b* fails to successfully receive the release DCI.

As a further option, the base station 602 may configure the UE 604*a-b* with group-ACK feedback for the release DCI. In such a configuration, each of the UE 604*a-b* may transmit only ACK feedback on an uplink resource of the uplink channel corresponding to one of the TX beams, indexed from 0 to 3. However, only ACK feedback on uplink resources corresponding to TX beams may result in one of the UE 604*a-b* continuously detecting for SPS signaling that has already ended when that one of the UE 604*a-b* fails to successfully receive the release DCI.

The base station 602 may transmit downlink data to the UE 604*a-b* configured with SPS on the downlink data channel over a set of SPS occasions. The base station 602 may then determine whether to retransmit at least one of the downlink data and/or DCI associated with SPS activation or release, and the base station 602 may retransmit the at least one of the downlink data and/or the DCI when determining that the at least one of the downlink data and/or the DCI are to be retransmitted.

Each of the UE 604*a-b* may determine whether at least one of downlink data on the downlink data channel over at least one multicast SPS occasions or DCI associated with SPS activation or release is unsuccessfully received from the base station 602 and, further, may receive a retransmission of the at least one of the downlink data or the DCI when the at least one of the downlink data or the DCI is determined to be unsuccessfully received. In some aspects, each of the UE 604*a-b* may receive retransmission of the SPS activation or release for the multicast group in unicast DCI, though the multicast SPS activation or release may have also indicated by multicast DCI, which the UE may have failed to successfully receive In a first aspect, the base station 602 may configure feedback for the activation DCI and/or for broadcast or multicast signaling on the downlink data channel (e.g., PDSCH). In a first scenario of the first aspect in which the broadcast or multicast SPS signaling on the downlink data channel needs feedback, the base station 602 may configure UE-specific ACK/NACK feedback for broadcast or multicast SPS signaling on the downlink data channel that is scheduled by activation DCI. However, the base station 602 may configure group-specific NACK feedback only for broadcast or multicast SPS signaling on the downlink data channel that is not scheduled by activation DCI.

Further to the first scenario of the first aspect, the base station 602 may configure each of the UE 604*a-b* with a respective set UE-specific feedback resources on the uplink channel (e.g., PUCCH). A respective set of UE-specific feedback resources may be configured to carry one of ACK or NACK feedback associated with the downlink data over one of the set of SPS occasions that is activated by the DCI. Further, the base station 602 may configure each of a set of beam-specific feedback resources on the uplink channel for a respective beam of a set of beams via which the downlink data is transmitted. Each of the beam-specific feedback resources may be configured to carry NACK feedback associated with the downlink data over one of the set of SPS occasions that is not activated. The base station 602 may determine to retransmit the at least one of the downlink data or the DCI when at least one of the UE-specific feedback resources and/or the beam-specific feedback resources carries NACK feedback.

Correspondingly, each of the UE 604*a-b* may receive first configuration information from the base station 602 indicating the set of UE-specific feedback resources on the uplink channel, and the set of UE-specific feedback resources may be configured to carry at least one of ACK or NACK feedback associated with downlink data over one of a set of SPS occasions that is activated by the DCI. Further, each of the UE 604*a-b* may receive second configuration information from the base station 602 indicating a set of beam-specific feedback resources on the uplink channel for a respective TX beam of the set of TX beams of the base station 602, and each of the beam-specific feedback resources may be configured to carry NACK feedback associated with the downlink data over one of the set of SPS occasions that is not activated by DCI.

Each of the UE 604*a-b* may transmit one of the ACK feedback or the NACK feedback on the set of UE-specific feedback resources based on whether the downlink data is successfully received from the base station 602 over the one of the set of SPS occasions that is not activated by the DCI. Further, each of the UE 604*a-b* may transmit the NACK feedback on one of the beam-specific feedback resources when the downlink data is successfully received from the base station over the one of the set of SPS occasions that is not activated by the DCI. The retransmission of the at least one of the downlink data or the DCI may be received based on transmitting at least one of the NACK feedback on the set of UE-specific feedback resources or the NACK feedback on the set of beam-specific feedback resources.

In a second scenario of the first aspect in which broadcast or multicast SPS signaling on the downlink data channel does not need feedback, the base station may configure the UE 604*a-b* with a UE-specific ACK or ACK/NACK on a UE-specific resource if the UE successfully receives the activation DCI. That is, no feedback may be used for the SPS signaling on the downlink data channel; rather, the feedback may be configured as an ACK for activation DCI (and not for the UE decoding result of the SPS signaling on the downlink data channel).

The base station 602 may configure each of the set of UE 604*a-b* with a respective set of UE-specific feedback resources on the uplink channel (e.g., PUCCH). The base station 602 may configure each set of UE-specific feedback resources to carry one of ACK or NACK feedback associated with the DCI. The DCI may be transmitted to activate or release the SPS signaling over the set of SPS occasions, and the base station 602 may determine to retransmit the DCI when at least one of the UE-specific feedback resources carries NACK feedback or the ACK feedback is absent from the UE-specific feedback resources.

Further to the second scenario of the first aspect, each of the UE 604*a-b* may receive configuration information indicating a set of UE-specific feedback resources on the uplink channel. The set of UE-specific feedback resources may be configured to carry one of ACK or NACK feedback associated with the DCI. Each of the UE 604*a-b* may transmit the NACK feedback on the set of UE-specific feedback resources when the DCI is unsuccessfully received. The DCI may be received to activate or release the set of SPS occasions, and the retransmission of the DCI may be received when the NACK feedback is transmitted on at least one of the UE-specific feedback resources or the ACK feedback is absent from the UE-specific feedback resources. In some aspects, one, some, or all of the retransmissions of the DCI may be unicast, even where the initial transmission may have been multicast.

In a second aspect, the reliability of activation DCI and/or release DCI for SPS may be improved by introducing repetition of SPS downlink control channel (e.g., PDCCH) signaling, more diversity by inter-slot interleaving/hopping, larger aggregation levels, etc. so that the base station 602 may select an appropriate resource on the downlink control channel to increase the reliability to a satisfactory level, even without feedback. In a second scenario, a detection window may be introduced in which multiple repetitions of SPS control signaling may be transmitted on the downlink control channel—that is, the base station 602 may transmit more than one activation DCI in a window and/or more than one release DCI in another window.

The base station 602 may determine a retransmission associated with the DCI, and the base station 602 may transmit the DCI at least twice within the retransmission window. For example, the base station 602 may determine a repetition number for the DCI, which may be indicated via a SIB, signaling on the MCCH, and/or unicast RRC signaling.

Correspondingly, each of the UE 604*a-b* may determine a retransmission window in which to detect for at least one retransmission of the DCI, and each of the UE 604*a-b* may further receive a retransmission of the DCI in the retransmission window when an initial retransmission of the DCI is unsuccessfully received. Each of the UE 604*a-b* may receive information indicating the number of repetitions for the retransmission of the DCI from the base station 602 via at least one of a SIB, an MCCH, and/or unicast RRC signaling, and the retransmission of the DCI may be received based on the determined number of repetitions.

In some aspects, the base station 602 may transmit an initial transmission of the DCI with at least one of an inter-slot interleaving pattern, an inter-slot hopping pattern, and/or an aggregation level that is different from at least one retransmission of the DCI. The retransmission with the different at least one of inter-slot interleaving pattern, inter-slot hopping pattern, and/or aggregation level may occur in the retransmission window. Thus, each of the UE 604*a-b* may receive the retransmission of the DCI with at least one of an inter-slot interleaving pattern, an inter-slot hopping pattern, and/or an aggregation level that is differently configured from an initial transmission of the DCI.

Figure 7:
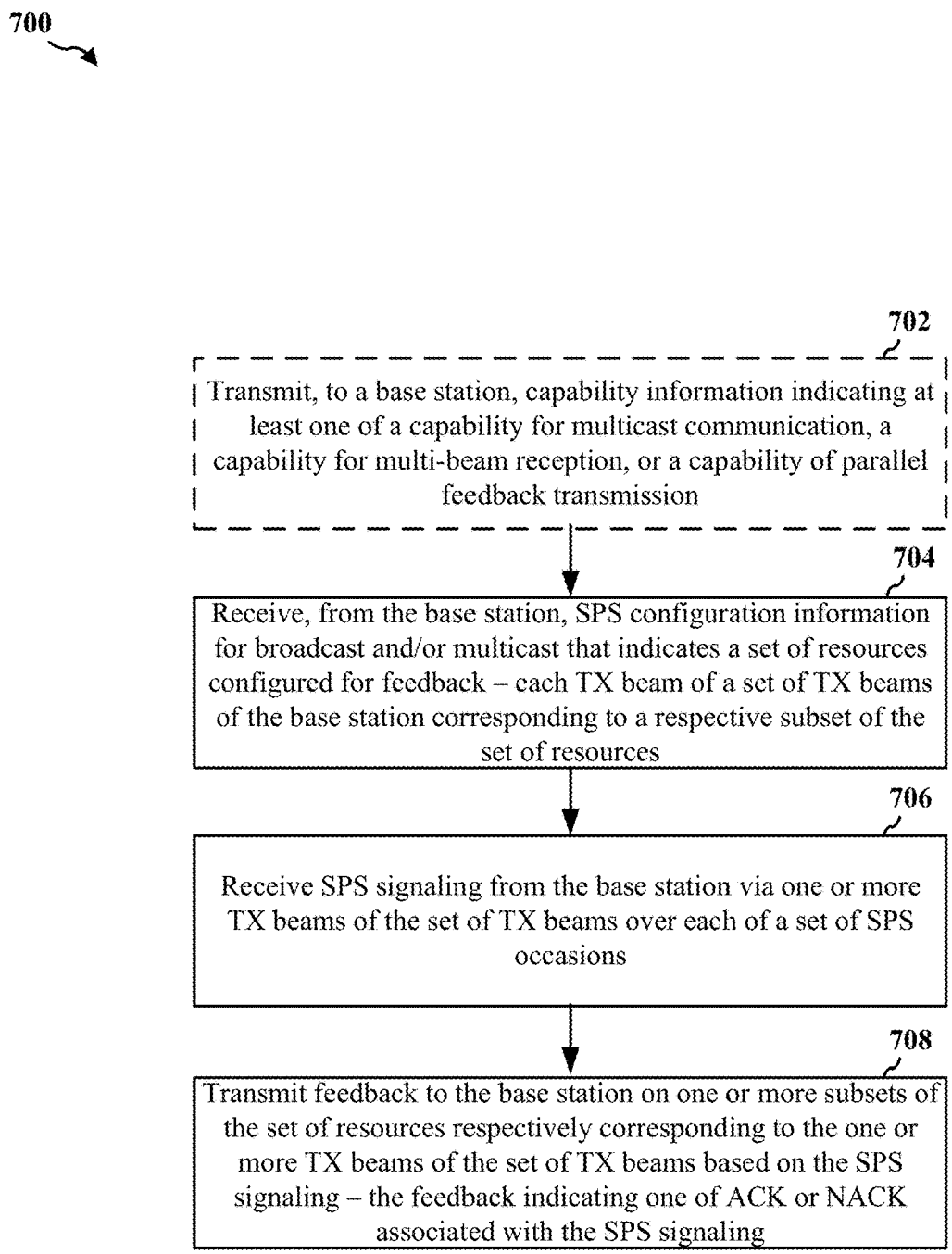
FIG. 7 is a flowchart of a method of wireless communication by a UE.

FIG. 7 is a flowchart of a method 700 of wireless communication. The method 700 may be performed by a UE. For example, the method 700 may be performed by one or more of the UE 104, 350, 402*a-c*, 504/504', 604*a-b* and/or the apparatus 1502/1502'. In another example, the method 700 may be performed by the processing system 1614, which may include the memory 360 and which may be an entire UE or a component of a UE, such as the TX processor 368, the RX processor 356, and/or the controller/processor 359. In some aspects, a UE performing the method 700 may be configured with SPS by a base station. According to various different aspects, one or more of the illustrated operations may be transposed, omitted, or contemporaneously performed.

At 702, the UE may transmit, to a base station, capability information indicating at least one of a capability for multicast communication, a capability for multi-beam reception (e.g., for beam combining), or a capability of parallel feedback transmission. In some aspects, The UE capability information may indicate a respective capability of the UE for each of multiple CCs and/or each of multiple band. In some aspects, a capability of multicast communication may indicate a number (e.g., maximum number) of SPS multicast transmissions the UE is capable of receiving. A capability of multi-beam reception may indicate a number (e.g., maximum number) of TX beams of the base station that the UE is capable of monitoring (e.g., for downlink SPS transmissions).

For example, referring to FIGS. 4A and 4B, at least one of the set of UE 404*a-c* may transmit, to the base station 402, capability information indicating at least one of a capability for multicast communication, a capability for multi-beam reception, or a capability of parallel feedback transmission. For example, referring to FIGS. 5A and 5B, at least one of the set of UE 504/504' may transmit, to the base station 402, capability information indicating at least one of a capability for multicast communication, a capability for multi-beam reception, or a capability of parallel feedback transmission. For example, referring to FIG. 6, one of the UEs 604*a-b* may transmit, to the base station 602, UE capability information that may indicate a capability of the one of the UE 604*a-b* for at least one of multicast communication, multi-beam reception, and/or parallel feedback transmission.

At 704, the UE may receive, from a base station, SPS configuration information for broadcast and/or multicast that indicates a set of resources configured for feedback. For example, the SPS configuration information for multicast may be based on common resources for a group of multicast UEs. Common resources may include resources that are allocated to all of the group of multicast UEs. In the downlink, for example, common resources may include resources on which multicast transmissions are scheduled or may otherwise be found. Each UE of the group of multicast UEs may receive and decode the information carried on such downlink common resources. In the uplink, for example, common resources may include resources allocated to any or all UEs of the group of multicast UEs. Accordingly, such resources may not be UE-specific; however, such resources may be beam-specific. In some aspects, the set of resources may be a set of uplink resources on an uplink channel. Each TX beam of a set of TX beams of the base station may correspond to a respective subset of the set of resources. In some aspects, the set of resources may be or may include a set of beam-specific feedback resources on an uplink channel, with each TX beam of the set of TX beams corresponding to a respective subset of the set of beam-specific feedback resources.

For example, referring to FIGS. 4A and 4B, at least one of the set of UE 404*a-c* may receive, from the base station 402, SPS configuration information 422 indicating the set of uplink resources on the uplink channel (e.g., PUCCH) configured for feedback. Each TX beam of a set of TX beams 410*a-d*, respectively indexed 0 through 3, of the base station 402 may correspond to a respective subset of the set of uplink resources, which may be associated with a respective one of indexes 0 through 3. For example, referring to FIGS. 5A and 5B, at least one of the set of UE 504/504' may receive, from the base station 502/502', SPS configuration information for broadcast and/or multicast that indicates the set of uplink resources on the uplink channel (e.g., PUCCH) configured for feedback. Each TX beam of a set of TX beams, respectively indexed 0 through 3, of the base station 502/502' may correspond to a respective subset of the set of uplink resources, which may be associated with a respective one of indexes 0 through 3. For example, referring to FIG. 6, one of the UEs 604a-b may receive, from the base station 602, SPS configuration information for broadcast and/or multicast that indicates the set of uplink resources on the uplink channel (e.g., PUCCH) for feedback, with each of a set of TX beams of the base station 602 corresponding to a respective subset of the set of uplink resources.

At 706, the UE may receive SPS signaling from the base station via one or more TX beams of the set of TX beams over each of a set of SPS occasions. For example, referring to FIGS. 4A and 4B, at least one of the set of UE 404a-c may receive, from the base station 402, at least one first SPS signal 424 via at least one of the set of TX beams 410a-d of the base station 402. For example, referring to FIGS. 5A and 5B, at least one of the set of UE 504/504' may receive SPS signaling from the base station 502/502' via at least one of a set of TX beams, indexed from 0 through 3, over each of the set of SPS occasions. For example, referring to FIG. 6, one of the UEs 604a-b may receive SPS signaling from the base station 602 via at least one of a set of TX beams over each of a set of SPS occasions.

At 708, the UE may transmit feedback to the base station on one or more subsets of the set of resources respectively corresponding to the one or more TX beams based on the SPS signaling. The feedback may indicate one of ACK or NACK associated with the SPS signaling. In some aspects, the feedback may be associated with the SPS signaling over a subset of the set of SPS occasions. In some aspects, the subset of the set of SPS occasions of the SPS signaling associated with the feedback may be one SPS occasion. In some other aspects, the subset of the set of SPS occasions of the SPS signaling associated with the feedback may include at least two SPS occasions. The SPS configuration information for broadcast and/or multicast may further indicate a number of the at least two SPS occasions. In addition, the SPS configuration information for broadcast and/or multicast may further indicate that the feedback is to indicate the ACK when one of: energy associated with the SPS signaling detected over at least one SPS occasion of the at least two SPS occasions satisfies (e.g., meets or exceeds) a first threshold, or energy associated with the SPS signaling averaged over the at least two SPS occasions satisfies a second threshold. In still further aspects, the feedback may be transmitted on each subset of the set of beam-specific feedback resources that corresponds to one of the subset of TX beams.

For example, referring to FIGS. 4A and 4B, at least one of the set of UE 404a-c may transmit, to the base station 402, a respective at least one response signal 426a-c on one or more subsets of a set of uplink resources respectively corresponding to one or more of the set of TX beams 410a-d to indicate ACK or NACK feedback for the one or more of the set of TX beams 410a-d. For example, referring to FIGS. 5A and 5B, the set of UE 504/504' may transmit feedback to the base station 502/502' on one or more subsets of a set of uplink resources respectively corresponding to one or more of the set of TX beams based on the SPS signaling, and the feedback may indicate one of ACK or NACK. For example, referring to FIG. 6, one of the UEs 604a-b may transmit feedback to the base station 602 on one or more subsets of a set of uplink resources respectively corresponding to one or more of the set of TX beams based on the SPS signaling.

Figure 8:
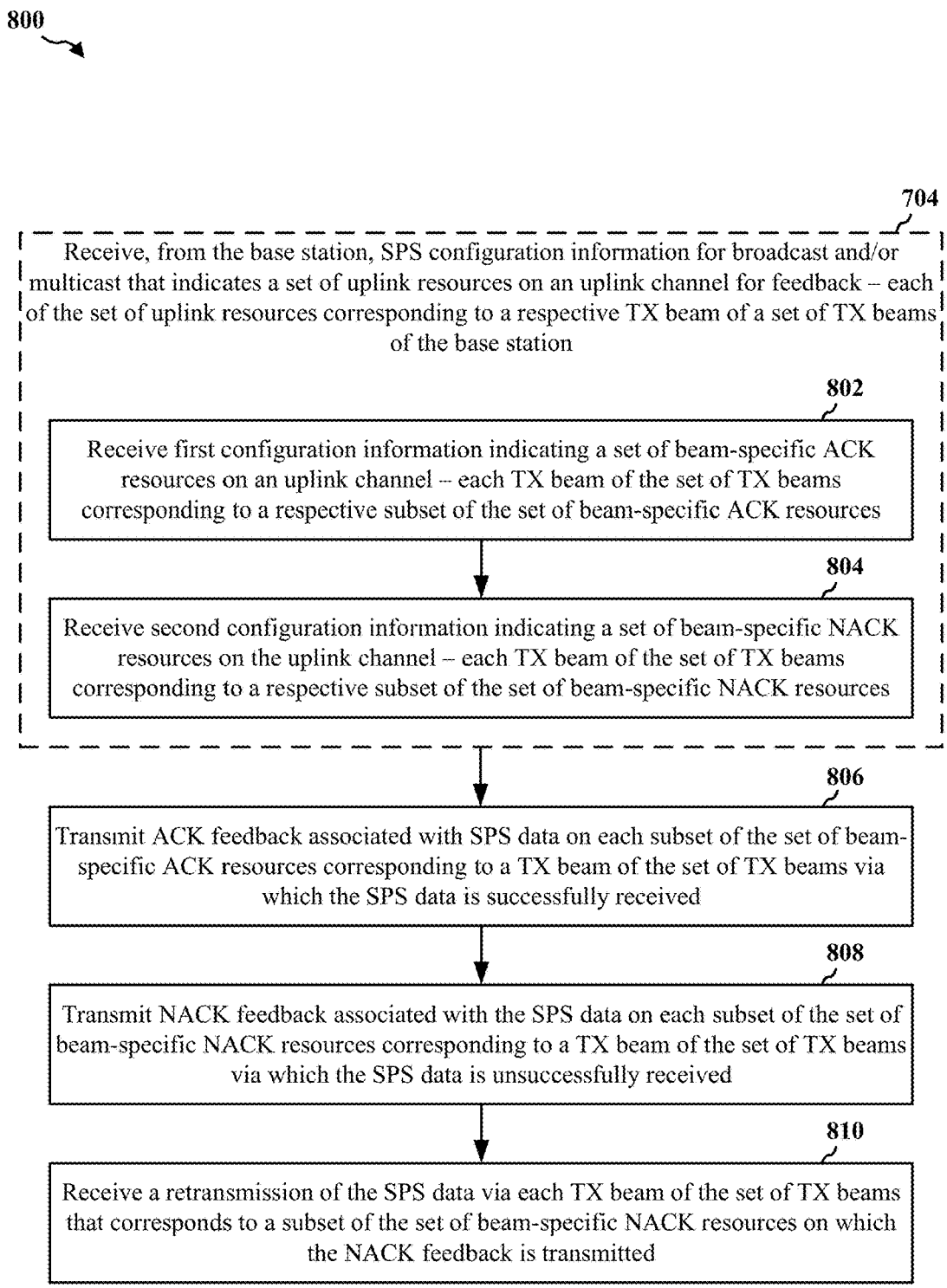
FIG. 8 is a flowchart of a method of wireless communication by a UE.

FIG. 8 is a flowchart of a method 800 of wireless communication. The method 800 may be performed by a UE. For example, the method 800 may be performed by one or more of the UE 104, 350, 402a-c, 504/504', 604a-b and/or the apparatus 1502/1502'. In another example, the method 800 may be performed by the processing system 1614, which may include the memory 360 and which may be an entire UE or a component of a UE, such as the TX processor 368, the RX processor 356, and/or the controller/processor 359. In some aspects, a UE performing the method 800 may be configured with SPS by a base station.

In some aspects, the method 800 of FIG. 8 may be practiced in connection with the method 700 of FIG. 7. For example, FIG. 8 illustrates some example operations of 704, as well as some example operations that may be practiced after 704, within 704, or at another time. According to various different aspects, one or more of the illustrated operations may be transposed, omitted, or contemporaneously performed.

In some aspects, to receive, from the base station, SPS configuration information for broadcast and/or multicast that indicates a set of uplink resources on an uplink channel for feedback, as illustrated by 704 of FIG. 7, the UE may practice or perform 802 and 804 of FIG. 8.

At 802, the UE may receive first configuration information indicating a set of beam-specific ACK resources on an uplink channel, with each TX beam of the set of TX beams corresponding to a respective subset of the set of beam-specific ACK resources. For example, referring to FIGS. 4A and 4B, at least one of the set of UE 404a-c may receive the SPS configuration information 422 indicating a set of beam-specific ACK resources on an uplink channel, with each TX beam of the set of TX beams 410a-d corresponding to a respective subset of the set of beam-specific ACK resources. For example, referring to FIGS. 5A and 5B, at least one of the set of UE 504/504' may receive first configuration information indicating a set of beam-specific ACK resources on an uplink channel, with each TX beam of the set of TX beams corresponding to a respective subset of the set of beam-specific ACK resources. For example, referring to FIG. 6, one of the UEs 604a-b may receive first configuration information indicating a set of beam-specific ACK resources on an uplink channel, with each TX beam of the set of TX beams corresponding to a respective subset of the set of beam-specific ACK resources. In the context of FIG. 7, the set of resources, described in the method 700, may be or may include the set of beam-specific ACK resources on the uplink channel.

At 804, the UE may receive second configuration information indicating a set of beam-specific NACK resources on the uplink channel, with each TX beam of the set of TX beams corresponding to a respective subset of the set of beam-specific NACK resources. For example, referring to FIGS. 4A and 4B, at least one of the set of UE 404a-c may receive the SPS configuration information 422 indicating a set of beam-specific NACK resources on the uplink channel, with each TX beam of the set of TX beams 410a-d corresponding to a respective subset of the set of beam-specific NACK resources. For example, referring to FIGS. 5A and 5B, at least one of the set of UE 504/504' may receive second configuration information indicating a set of beam-specific NACK resources on an uplink channel, with each TX beam of the set of TX beams corresponding to a respective subset of the set of beam-specific NACK resources. For example, referring to FIG. 6, one of the UEs 604a-b may receive second configuration information indicating a set of beam-specific NACK resources on an uplink channel, with each TX beam of the set of TX beams corresponding to a respective subset of the set of beam-specific NACK resources. In the context of FIG. 7, the set of resources, described in the method 700, may be or may include the set of beam-specific NACK resources on the uplink channel.

At 806, the UE may transmit ACK feedback associated with SPS data on each subset of the set of beam-specific ACK resources corresponding to a TX beam of the set of TX beams via which the SPS data is successfully received. For example, referring to FIGS. 4A and 4B, at least one of the set of UE 404a-c may transmit at least one respective response signal(s) 426a-c, which may indicate ACK feedback associated with SPS data on each subset of the set of beam-specific ACK resources corresponding to a TX beam of the set of TX beams 410a-d via which SPS data is successfully received (e.g., the first signal(s) 424 may include SPS data). For example, referring to FIGS. 5A and 5B, at least one of the set of UE 504/504' may transmit ACK feedback associated with SPS data on each subset of the set of beam-specific ACK resources corresponding to a TX beam of the set of TX beams via which the SPS data is successfully received. For example, referring to FIG. 6, one of the UEs 604a-b may transmit ACK feedback associated with SPS data on each subset of the set of beam-specific ACK resources corresponding to a TX beam of the set of TX beams via which the SPS data is successfully received.

At 808, the UE may transmit NACK feedback associated with the SPS data on each subset of the set of beam-specific NACK resources corresponding to a TX beam of the set of TX beams via which the SPS data is unsuccessfully received. For example, referring to FIGS. 4A and 4B, at least one of the set of UE 404a-c may transmit at least one respective response signal(s) 426a-c, which may indicate NACK feedback associated with the SPS data on each subset of the set of beam-specific NACK resources corresponding to a TX beam of the set of TX beams 410a-d via which SPS data is unsuccessfully received (e.g., the first signal(s) 424 may include SPS data). For example, referring to FIGS. 5A and 5B, at least one of the set of UE 504/504' may transmit NACK feedback associated with the SPS data on each subset of the set of beam-specific NACK resources corresponding to a TX beam of the set of TX beams via which the SPS data is unsuccessfully received. For example, referring to FIG. 6, one of the UEs 604a-b may transmit NACK feedback associated with the SPS data on each subset of the set of beam-specific NACK resources corresponding to a TX beam of the set of TX beams via which the SPS data is unsuccessfully received.

At 810, the UE may receive a retransmission of the SPS data via each TX beam of the set of TX beams that corresponds to a subset of the set of beam-specific NACK resources on which the NACK feedback is transmitted. For example, referring to FIGS. 4A and 4B, at least one of the set of UE 404a-c may receive at least one set of the second SPS signal(s) 428 via each TX beam of the set of TX beams 410a-d that corresponds to a subset of the set of beam-specific NACK resources on which the NACK feedback is transmitted, which may include a retransmission of the SPS data. For example, referring to FIGS. 5A and 5B, at least one of the set of UE 504/504' may receive a retransmission of the SPS data via each TX beam of the set of TX beams that corresponds to a subset of the set of beam-specific NACK resources on which the NACK feedback is transmitted. For example, referring to FIG. 6, one of the UEs 604a-b may receive a retransmission of the SPS data via each TX beam of the set of TX beams that corresponds to a subset of the set of beam-specific NACK resources on which the NACK feedback is transmitted.

Figure 9:
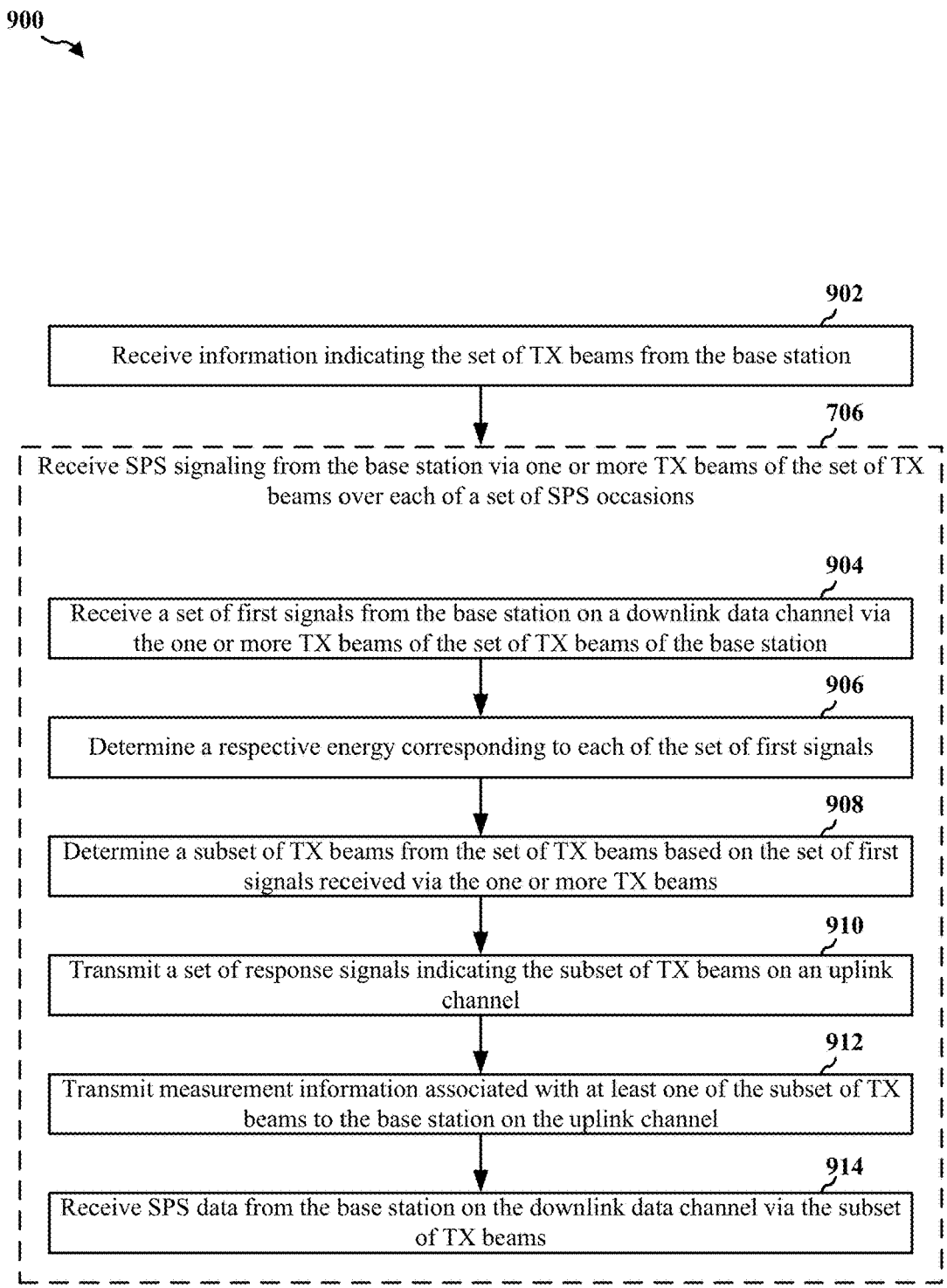
FIG. 9 is a flowchart of a method of wireless communication by a UE.

FIG. 9 is a flowchart of a method 900 of wireless communication. The method 900 may be performed by a UE. For example, the method 900 may be performed by one or more of the UE 104, 350, 402a-c, 504/504', 604a-b and/or the apparatus 1502/1502'. In another example, the method 900 may be performed by the processing system 1614, which may include the memory 360 and which may be an entire UE or a component of a UE, such as the TX processor 368, the RX processor 356, and/or the controller/processor 359. In some aspects, a UE performing the method 900 may be configured with SPS by a base station.

In some aspects, the method 900 of FIG. 9 may be practiced in connection with the method 700 of FIG. 7. For example, FIG. 9 illustrates some example operations of 706, as well as some example operations that may be practiced after or within 706 or elsewhere. According to various different aspects, one or more of the illustrated operations may be transposed, omitted, or contemporaneously performed.

At 902, the UE may receive information indicating the set of TX beams from the base station. In some aspects, the information indicating the set of TX beams may indicate a number of beams of the base station and a bitmap having each bit corresponding to a respective one of the beams of the base station, and in the bitmap, a first bit value (e.g., "1") may indicate a corresponding one of the beams is included in the set of TX beams and a second bit value (e.g., "0") may indicate a corresponding one of the beams is excluded from the set of TX beams. For example, the set of TX beams may include an active set of TX beams (e.g., beams via which the base station is configured to transmit SPS data or other information), so that a first bit value in the bitmap may indicate a beam is included in the active set of TX beams and a second bit value in the bitmap indicates a beam is excluded from the active set of TX beams.

For example, referring to FIGS. 4A and 4B, at least one of the set of UE 404a-c may receive the SPS configuration information 422 indicating the set of TX beams 410a-d from the base station 402. The SPS configuration information 422 may include a bitmap having a first value at the bits corresponding to the first TX beam 410a, second TX beam 410b, and fourth TX beam 410d; however, the bitmap may have a second value at the bit corresponding to the second beam 410b, which may be excluded from the active set of TX beams. For example, referring to FIGS. 5A and 5B, at least one of the set of UE 504/504' may receive information indicating the set of TX beams from the base station 502/502'. For example, referring to FIG. 6, one of the UEs 604a-b may receive information indicating the set of TX beams from the base station 602.

In some aspects, to receive SPS signaling from the base station via one or more TX beams of the set of TX beams over each of a set of SPS occasions, as illustrated by 706 of FIG. 7, the UE may practice or perform one or more of 904, 906, 908, 910, 912, and/or 914 of FIG. 9.

At 904, the UE may receive a set of first signals from the base station on a downlink data channel via the one or more TX beams of the set of TX beams of the base station. In some aspects, each of the set of first signals may be a reference, pilot, or synchronization signal, such as a CSI-RS, SSB, or other reference signal. In some other aspects, each of the set of first signals may include a control signal on an MCCH carried in the downlink data channel. In still other aspects, the set of first signals may include SPS data. The UE may receive a respective subset of the set of first signals over each of a set of SPS occasions.

For example, referring to FIGS. 4A and 4B, at least one of the set of UE 404*a-c* may receive at least one first signal(s) 424 from the base station 402 on a downlink data channel via the one or more of the set of TX beams 410*a-d* of the base station 402. For example, referring to FIGS. 5A and 5B, at least one of the set of UE 504/504' may receive at least one first signal(s) from the base station 502/502' on a downlink data channel via the set of TX beams of the base station 502/502'. For example, referring to FIG. 6, one of the UEs 604*a-b* may receive at least one first signal(s) from the base station 602 on a downlink data channel via the set of TX beams of the base station 602.

At 906, the UE may determine a respective energy corresponding to each of the set of first signals. In some aspects, first, the UE may measure the energy of one of the set of first signals. For example, the UE may measure at least one value indicative of channel quality, signal strength, etc. (e.g., at least one of an RSRP, RSSI, RSRQ, SNR, and/or other channel quality value) based on receiving the one of the set of first signals. Second, the UE may store the measured value in association with the one of the set of first signals from which the value is measured. As each of the set of first signals may be associated with a TX beam of the set of TX beams, the UE may store the measured value in association with one of the set of TX beams via which the one of the set of first signals is received.

In some other aspects, first, the UE may measure the average energy of at least two of the set of first signals received via one of the set of TX beams over at least two SPS occasions. For example, the UE may measure at least one respective value indicative of channel quality, signal strength, etc. (e.g., at least one of an RSRP, RSSI, RSRQ, SNR, and/or other channel quality value) based on receiving each of the at least two of the set of first signals via one of the set of TX beams over one of the at least two SPS occasions. The UE may average the at least two measured values to obtain an average value for the at least two first signals received via the one of the set of TX beams over the at least two SPS occasions. The UE may store the average value in association with at least one of the at least two of the set of first signals from which the at least two respective values are measured. As each of the set of first signals may be associated with a TX beam of the set of TX beams, the UE may store the average value in association with the one of the set of TX beams via which the at least two of the set of first signals are received.

For example, referring to FIGS. 4A and 4B, at least one of the set of UE 404*a-c* may determine a respective energy corresponding to each of the set of first signal(s) 424 received via one of the set of TX beams 410*a-d* over a set of SPS occasions. For example, referring to FIGS. 5A and 5B, at least one of the set of UE 504/504' may determine a respective energy corresponding to each of the set of first signal(s) received via one of the set of TX beams over a set of SPS occasions. For example, referring to FIG. 6, one of the UEs 604*a-b* may determine a respective energy corresponding to each of the set of first signal(s) received via one of the set of TX beams 410*a-d* over a set of SPS occasions.

At 908, the UE may determine a subset of TX beams from the set of TX beams based on the set of first signals received via the one or more TX beams of the set of TX beams. In some aspects, first, the UE may compare at least one value (e.g., a measured value or average value) associated with at least one of the set of TX beams with a threshold, such as a threshold associated with a satisfactory channel quality, signal strength, etc. Second, the UE may evaluate whether the at least one value satisfies (e.g., meets or exceeds) the threshold. Third, the UE may select a TX beam of the set of TX beams to include in the subset of TX beams when the TX beam is associated with at least one value that satisfies the threshold, or the UE may exclude a TX beam of the set of TX beams from the subset of TX beams when the TX beam is associated with at least one value that fails to satisfy (e.g., is less than) the threshold.

For example, referring to FIGS. 4A and 4B, at least one of the set of UE 404*a-c* may determine a subset of TX beams, including at least one of the first, third, and fourth TX beams 410*a*, 410*c*, 410*d*, from the set of TX beams 410*a-d* based on the set of first signal(s) 424 received via the one or more TX beams of the set of TX beams 410*a-d*. For example, referring to FIGS. 5A and 5B, at least one of the set of UE 504/504' may determine a subset of TX beams from the set of TX beams based on the set of first signals received via the one or more TX beams of the set of TX beams. For example, referring to FIG. 6, one of the UEs 604*a-b* may determine a subset of TX beams from the set of TX beams based on the set of first signals received via the one or more TX beams of the set of TX beams.

At 910, the UE may transmit a set of response signals indicating the subset of TX beams on the uplink channel. The subset of TX beams may be those beams having a satisfactory channel quality, signal strength, etc., as reflected by a respective measured value associated with each of the subset of TX beams. In some aspects, each of the set of response signals may indicate the respective energy corresponding to one of the reference signals received via one of the subset of TX beams satisfies a threshold. In some other aspects, each of the set of response signals may include an ACK signal corresponding to a respective control signal received via one of the subset of TX beams. In still further aspects, each of the set of response signals may be transmitted on the set of beam-specific feedback resources corresponding to the subset of TX beams.

For example, referring to FIGS. 4A and 4B, at least one of the set of UE 404*a-c* may transmit a respective one of the sets of response signals 426*a-c* indicating a respective subset of TX beams, including at least one of the first, third, and fourth TX beams 410*a*, 410*c*, 410*d*, from the set of TX beams 410*a-d* on the uplink channel. For example, referring to FIGS. 5A and 5B, at least one of the set of UE 504/504' may transmit a respective response signal(s) indicating a respective subset of TX beams of the set of TX beams on the uplink channel. For example, referring to FIG. 6, one of the UEs 604*a-b* may transmit a respective response signal(s) indicating a respective subset of TX beams of the set of TX beams on the uplink channel.

At 912, the UE may transmit measurement information associated with at least one of the subset of TX beams to the base station on the uplink channel. The measurement information may include one or more values (e.g., one or more measured values or one or more average values) that satisfy the threshold, with each of the one or more values associated with a respective one of the subset of TX beams. In some aspects, the measurement information may include each determined value of energy corresponding to a respective one of the set of first signals received via the subset of TX beams.

For example, referring to FIGS. 4A and 4B, at least one of the set of UE 404*a-c* may transmit one of the sets of response signals 426*a-c* indicating a subset of TX beams of the set of TX beams 410*a-d* to the base station 402 on the uplink channel, with the one of the sets of response signals 426a-c including measurement information associated with at least one of the subset of TX beams of the set of TX beams 410a-d. For example, referring to FIGS. 5A and 5B, at least one of the set of UE 504/504' may transmit a response signal(s) indicating a subset of TX beams of the set of TX beams to the base station 502/502' on the uplink channel, with the response signal(s) including measurement information associated with at least one of the subset of TX beams. For example, referring to FIG. 6, one of the UEs 604a-b may transmit a response signal(s) indicating a subset of TX beams of the set of TX beams to the base station 602 on the uplink channel, with the response signal(s) including measurement information associated with at least one of the subset of TX beams.

At 914, the UE may receive SPS data from the base station on the downlink data channel via the subset of TX beams. In some aspects, the SPS data may be received based on UE capability information transmitted to the base station. For example, referring to FIGS. 4A and 4B, at least one of the set of UE 404a-c may receive at least one set of the second SPS signal(s) 428, which may include SPS data on the downlink data channel received via each of the subset of TX beams associated with feedback or measurement information transmitted to the base station 402. For example, referring to FIGS. 5A and 5B, at least one of the set of UE 504/504' may receive SPS data on the downlink data channel via each of the subset of TX beams associated with feedback or measurement information transmitted to the base station 502/502'. For example, referring to FIG. 6, one of the UEs 604a-b may receive SPS data on the downlink data channel via each of the subset of TX beams associated with feedback or measurement information transmitted to the base station 602.

Figure 10:
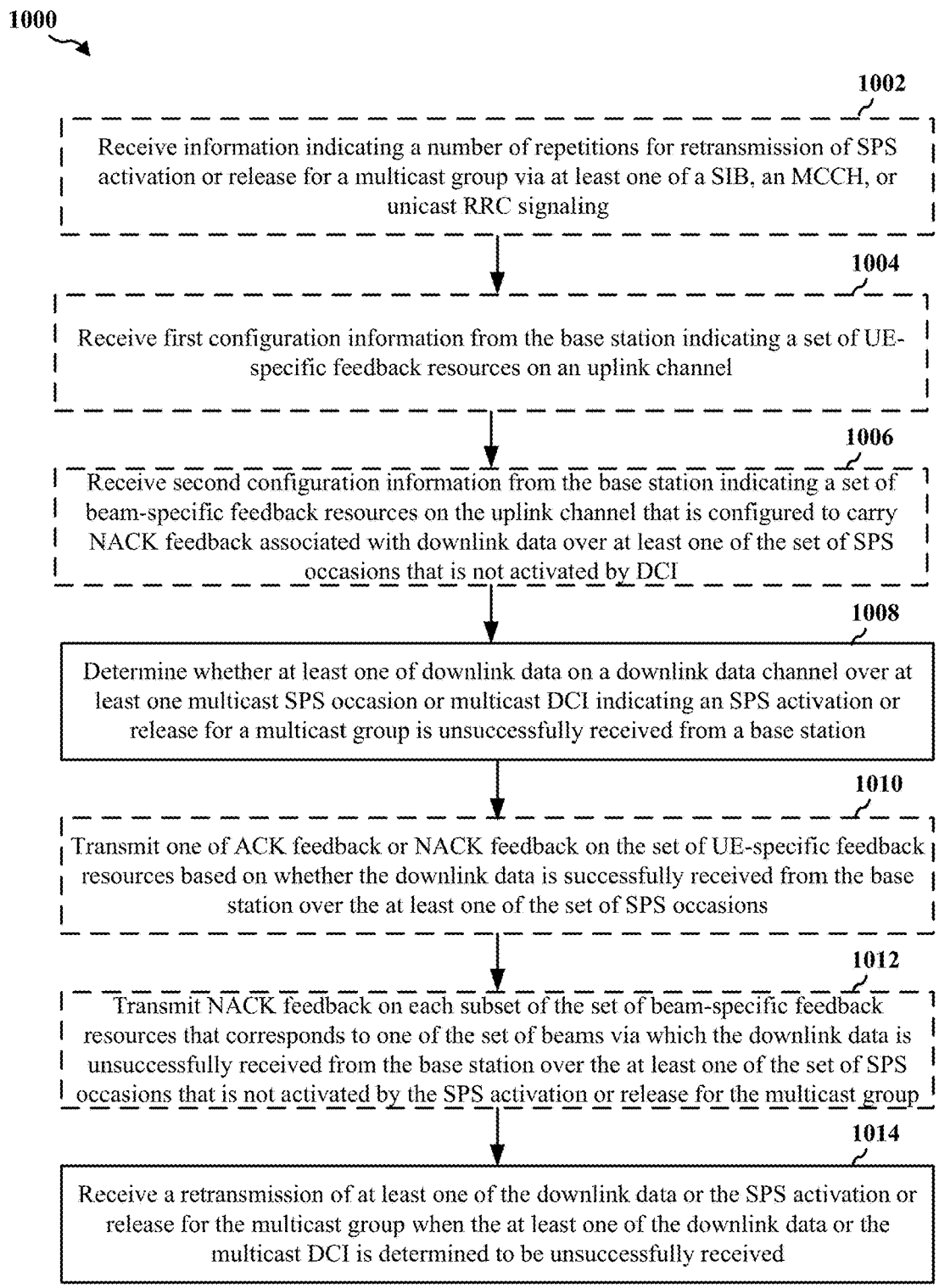
FIG. 10 is a flowchart of a method of wireless communication by a UE.

FIG. 10 is a flowchart of a method 1000 of wireless communication. The method 1000 may be performed by a UE. For example, the method 1000 may be performed by one or more of the UE 104, 350, 402a-c, 504/504', 604a-b and/or the apparatus 1502/1502'. In another example, the method 1000 may be performed by the processing system 1614, which may include the memory 360 and which may be an entire UE or a component of a UE, such as the TX processor 368, the RX processor 356, and/or the controller/processor 359. In some aspects, a UE performing the method 1000 may be configured with SPS by a base station. According to various different aspects, one or more of the illustrated operations may be transposed, omitted, or contemporaneously performed.

At 1002, the UE may receive information indicating a number of repetitions for retransmission of SPS activation or release for a multicast group indicated by DCI via at least one of a SIB, an MCCH, or unicast RRC signaling. For example, referring to FIGS. 4A and 4B, at least one of the set of UE 404a-c may receive information indicating a number of repetitions for retransmission of SPS activation or release for a multicast group indicated by multicast DCI via at least one of a SIB, an MCCH, or unicast RRC signaling. For example, referring to FIGS. 5A and 5B, at least one of the set of UE 504/504' may receive information indicating a number of repetitions for retransmission of SPS activation or release for a multicast group indicated by multicast DCI via at least one of a SIB, an MCCH, or unicast RRC signaling. For example, referring to FIG. 6, one of the UEs 604a-b may receive information indicating a number of repetitions for retransmission of SPS activation or release for a multicast group indicated by multicast DCI via at least one of a SIB, an MCCH, or unicast RRC signaling.

At 1004, the UE may receive first configuration information from the base station indicating a set of UE-specific feedback resources on an uplink channel. The set of UE-specific feedback resources may be configured to carry at least one of ACK feedback or NACK feedback associated with downlink data over at least one of a set of SPS occasions. In some aspects, the at least one of the set of SPS occasions is activated by DCI. For example, referring to FIGS. 4A and 4B, at least one of the set of UE 404a-c may receive first configuration information from the base station 402 indicating a set of UE-specific feedback resources on an uplink channel, with the set of UE-specific feedback resources being configured to carry at least one of ACK feedback or NACK feedback associated with downlink data over at least one of a set of SPS occasions. For example, referring to FIGS. 5A and 5B, at least one of the set of UE 504/504' may receive first configuration information from the base station 502/502' indicating a set of UE-specific feedback resources on an uplink channel, with the set of UE-specific feedback resources being configured to carry at least one of ACK feedback or NACK feedback associated with downlink data over at least one of a set of SPS occasions. For example, referring to FIG. 6, one of the UEs 604a-b may receive first configuration information from the base station 602 indicating a set of UE-specific feedback resources on an uplink channel, with the set of UE-specific feedback resources being configured to carry at least one of ACK feedback or NACK feedback associated with downlink data over at least one of a set of SPS occasions.

At 1006, the UE may receive second configuration information from the base station indicating a set of beam-specific feedback resources on the uplink channel that is configured to carry NACK feedback associated with the downlink data over at least one of the set of SPS occasions that is not activated by DCI. In some aspects, each beam of a set of beams of the base station corresponds to a respective subset of the set of beam-specific feedback resources. For example, referring to FIGS. 4A and 4B, at least one of the set of UE 404a-c may receive second configuration information from the base station 402 indicating a set of beam-specific feedback resources on the uplink channel that is configured to carry NACK feedback associated with the downlink data over at least one of the set of SPS occasions that is not activated by DCI. In some aspects, each beam of a set of beams 410a-d of the base station 402 corresponds to a respective subset of the set of beam-specific feedback resources. For example, referring to FIGS. 5A and 5B, at least one of the set of UE 504/504' may receive second configuration information from the base station 502/502' indicating a set of beam-specific feedback resources on the uplink channel that is configured to carry NACK feedback associated with the downlink data over at least one of the set of SPS occasions that is not activated by DCI. In some aspects, each beam of a set of beams of the base station 502/502' corresponds to a respective subset of the set of beam-specific feedback resources. For example, referring to FIG. 6, one of the UEs 604a-b may receive second configuration information from the base station 602 indicating a set of beam-specific feedback resources on the uplink channel that is configured to carry NACK feedback associated with the downlink data over at least one of the set of SPS occasions that is not activated by DCI. In some aspects, each beam of a set of beams of the base station 602 corresponds to a respective subset of the set of beam-specific feedback resources.

At 1008, the UE may determine whether at least one of downlink data on a downlink data channel over at least one multicast SPS occasion or multicast DCI is unsuccessfully received from a base station. The UE may identify at least one of the set of beams of the base station via which the downlink data or the DCI is unsuccessfully received. In some aspects, first, the UE may identify a set of resources scheduled to carry at least one of downlink data on a downlink data channel over at least one multicast SPS occasion or SPS activation or release for the multicast group indicated by DCI associated with SPS activation or release. Second, the UE may monitor the identified set of resources, and the UE may decode information carried on the identified set of resources to attempt to obtain the at least one of downlink data or DCI associated with SPS activation or release. Where the UE successfully decodes the information on the identified set of resources to obtain the at least one of downlink data or DCI associated with SPS activation or release (e.g., the UE may determine that an error check or data integrity check has succeeded, and the decoded information is addressed to a multicast group including the UE), the UE may determine that the at least one of downlink data or DCI associated with SPS activation or release is successfully received. Where the UE is unable to successfully decode the information on the identified set of resources to obtain the at least one of downlink data or DCI associated with SPS activation or release (e.g., the UE may determine that an error check or data integrity check has failed as the UE is decoding the information), the UE may determine that the at least one of downlink data or DCI associated with SPS activation or release is unsuccessfully received, and further, the UE may identify one of the set of beams of the base station via which the downlink data or the DCI is unsuccessfully received.

For example, referring to FIGS. 4A and 4B, at least one of the set of UE 404*a-c* may determine whether at least one of downlink data on a downlink data channel over at least one multicast SPS occasion or SPS activation or release for the multicast group indicated by DCI associated with SPS activation or release is unsuccessfully received from the base station 402. For example, referring to FIGS. 5A and 5B, at least one of the set of UE 504/504' may determine whether at least one of downlink data on a downlink data channel over at least one multicast SPS occasion or SPS activation or release for the multicast group indicated by DCI associated with SPS activation or release is unsuccessfully received from the base station 502/502'. For example, referring to FIG. 6, one of the UEs 604*a-b* may determine whether at least one of downlink data on a downlink data channel over at least one multicast SPS occasion or SPS activation or release for the multicast group indicated by DCI associated with SPS activation or release is unsuccessfully received from the base station 602.

At 1010, the UE may transmit one of ACK feedback or NACK feedback on the set of UE-specific feedback resources based on whether the downlink data is successfully received from the base station over the at least one of the set of SPS occasions. In some aspects, the at least one of the set of SPS occasions is not activated by DCI. The UE may transmit ACK feedback on at least one of the set of UE-specific feedback resources when the downlink data is successfully received from the base station over the at least one of the set of SPS occasions. However, the UE may transmit NACK feedback on at least one of the set of UE-specific feedback resources when the downlink data is unsuccessfully received from the base station over the at least one of the set of SPS occasions.

For example, referring to FIGS. 4A and 4B, at least one of the set of UE 404*a-c* may transmit one of ACK feedback or NACK feedback on the set of UE-specific feedback resources based on whether the downlink data is successfully received from the base station 402 over at least one of the set of SPS occasions. For example, referring to FIGS. 5A and 5B, at least one of the set of UE 504/504' may transmit one of ACK feedback or NACK feedback on the set of UE-specific feedback resources based on whether the downlink data is successfully received from the base station 502/502' over at least one of the set of SPS occasions. For example, referring to FIG. 6, one of the UEs 604*a-b* may transmit one of ACK feedback or NACK feedback on the set of UE-specific feedback resources based on whether the downlink data is successfully received from the base station 602 over at least one of the set of SPS occasions.

At 1012, the UE may transmit NACK feedback on each subset of the set of beam-specific feedback resources that corresponds to one of the set of beams via which the downlink data is unsuccessfully received from the base station over the at least one of the set of SPS occasions that is not activated by the DCI. In some aspects, however, the UE may refrain from transmitting feedback (e.g., ACK feedback) on at least one of the set of beam-specific feedback resources when the downlink data is successfully received from the base station over the at least one of the set of SPS occasions that is not activated by DCI, as the set of beam-specific feedback resources may be configured to carry NACK feedback but not ACK feedback.

For example, referring to FIGS. 4A and 4B, at least one of the set of UE 404*a-c* may transmit NACK feedback on each subset of the set of beam-specific feedback resources that corresponds to one of the set of beams via which the downlink data is unsuccessfully received from the base station 402 over the at least one of the set of SPS occasions that is not activated by the DCI. For example, referring to FIGS. 5A and 5B, at least one of the set of UE 504/504' may transmit NACK feedback on each subset of the set of beam-specific feedback resources that corresponds to one of the set of beams via which the downlink data is unsuccessfully received from the base station 502/502' over the at least one of the set of SPS occasions that is not activated by the DCI. For example, referring to FIG. 6, one of the UEs 604*a-b* may transmit NACK feedback on each subset of the set of beam-specific feedback resources that corresponds to one of the set of beams via which the downlink data is unsuccessfully received from the base station 602 over the at least one of the set of SPS occasions that is not activated by the DCI.

At 1014, the UE may receive a retransmission of at least one of the downlink data or SPS activation or release for the multicast group when the at least one of the downlink data or SPS activation or release for the multicast group is determined to be unsuccessfully received. The retransmission of the at least one of the downlink data or the SPS activation or release for the multicast group may be received based on transmission of at least one of the NACK feedback on the set of UE-specific feedback resources or the NACK feedback on the set of beam-specific feedback resources. In some aspects, the UE may receive one or more retransmissions of the SPS activation or release for the multicast group, with the number of repetitions of the one or more retransmissions being received via at least one of a SIB, an MCCH, or unicast RRC signaling having information indicating the number of repetitions for the retransmissions of SPS activation or release for the multicast group. In some aspects, the UE may receive retransmission of the SPS activation or release for the multicast group in unicast DCI, though the multicast SPS activation or release may have also indicated by multicast DCI, which the UE may have failed to successfully receive.

For example, referring to FIGS. 4A and 4B, at least one of the set of UE 404*a-c* may receive a retransmission of the at least one of the downlink data or SPS activation or release for the multicast group when the at least one of the downlink data or SPS activation or release for the multicast group is determined to be unsuccessfully received. For example, referring to FIGS. 5A and 5B, at least one of the set of UE 504/504' may receive a retransmission of the at least one of the downlink data or SPS activation or release for the multicast group when the at least one of the downlink data or SPS activation or release for the multicast group is determined to be unsuccessfully received. For example, referring to FIG. 6, one of the UEs 604*a-b* may receive a retransmission of the at least one of the downlink data or SPS activation or release for the multicast group when the at least one of the downlink data or SPS activation or release for the multicast group is determined to be unsuccessfully received.

Figure 11:
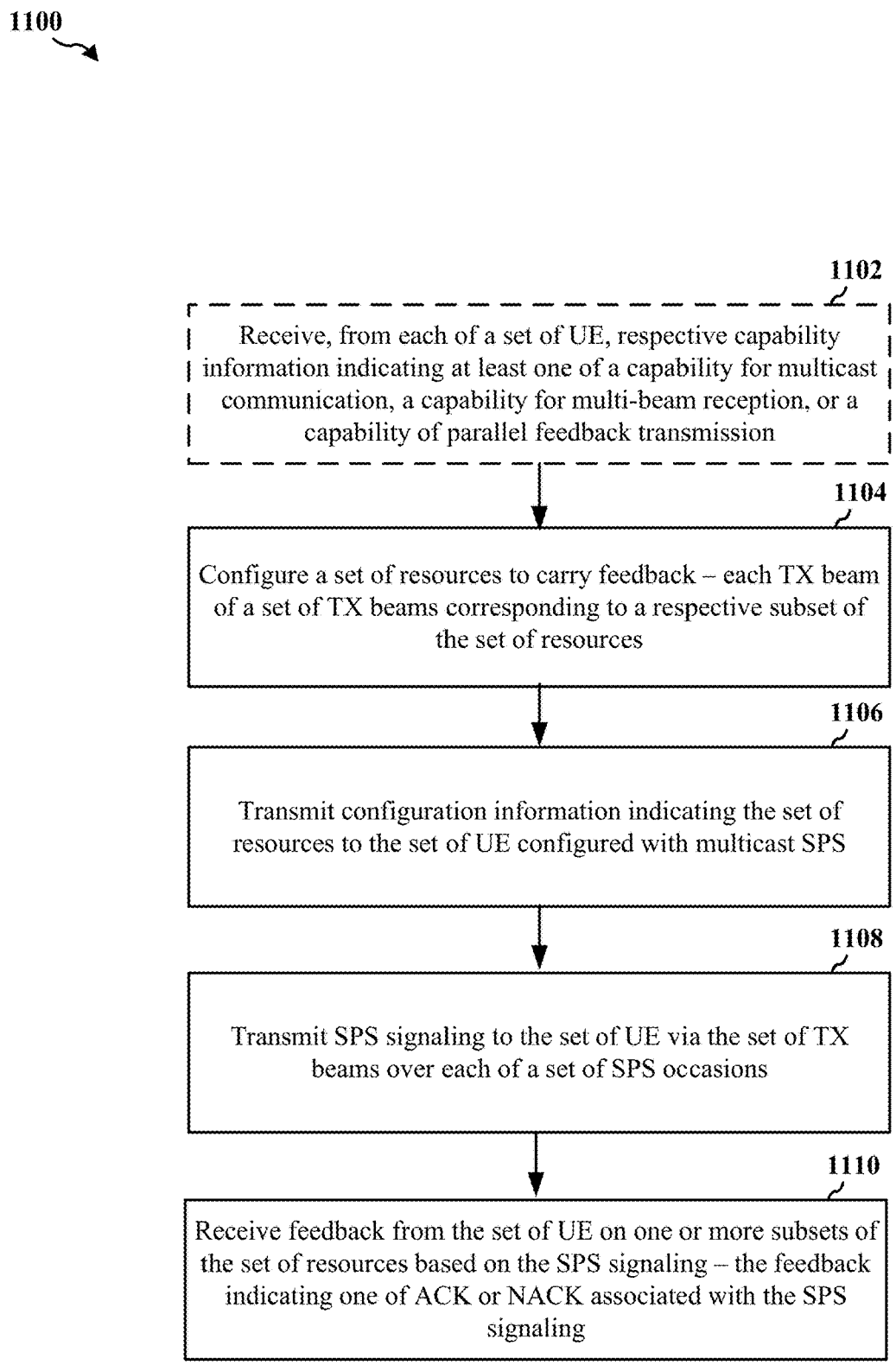
FIG. 11 is a flowchart of a method of wireless communication by a base station.

FIG. 11 is a flowchart of a method 1100 of wireless communication. The method 1100 may be performed by a base station. For example, the method 1100 may be performed by a base station 102/180, 310, 402, 502/502', 602, and/or the method 1100 may be performed by the apparatus 1702/1702'. In another example, the method 1100 may be performed by the processing system 1814, which may include the memory 376 and which may be an entire base station 102/180, 310, 402, 502/502', 602, or a component of a base station 102/180, 310, 402, 502/502', 602, such as the TX processor 316, the RX processor 370, and/or the controller/processor 375. According to various different aspects, one or more of the illustrated operations may be transposed, omitted, or contemporaneously performed.

At 1102, At 1102, the base station may receive, from each of a set of UE, respective capability information indicating at least one of a capability for multicast communication, a capability for multi-beam reception (e.g., for beam combining), or a capability of parallel feedback transmission. Each of the set of UE may be configured for SPS, e.g., by the base station via SPS configuration information for broadcast and/or multicast. In some aspects, the respective UE capability information may indicate a capability of the UE for each of multiple CCs and/or each of multiple band. In some aspects, a capability of multicast communication may indicate a number (e.g., maximum number) of SPS multicast transmissions the UE is capable of receiving. A capability of multi-beam reception may indicate a number (e.g., maximum number) of TX beams of the base station that the UE is capable of monitoring (e.g., for downlink SPS transmissions).

For example, referring to FIGS. 4A and 4B, the base station 402 may receive, from at least one of the set of UE 404*a-c*, capability information indicating at least one of a capability for multicast communication, a capability of the at least one of the set of UE 404*a-c* for multi-beam reception, or a capability of parallel feedback transmission. For example, referring to FIGS. 5A and 5B, the base station 502/502' may receive, from at least one of the set of UE 504/504', capability information indicating at least one of a capability of the at least one of the set of UE 504/504' for multicast communication, a capability for multi-beam reception, or a capability of parallel feedback transmission. For example, referring to FIG. 6, the base station 602 may receive, from at least one of the set of UE 604*a-b*, capability information that may indicate a capability of the at least one of the set of UE 604*a-b* for at least one of multicast communication, multi-beam reception, and/or parallel feedback transmission.

At 1104, the base station may configure a set of resources to carry feedback. Each TX beam of the set of TX beams may correspond to a respective subset of the set of resources. The set of resources may include uplink resources on an uplink channel. The set of resources may be common resources for a group of multicast UEs. Common resources may include resources that are allocated to all of the group of multicast UEs. In the uplink, which may be configured to carry feedback, common resources may include resources allocated to any or all UEs of the group of multicast UEs. Accordingly, such resources may not be UE-specific; however, such resources may be beam-specific. In some aspects, first, the base station may select resources that are not yet scheduled, and second, the base station may allocate the selected resources to carry feedback. Third, the base station may assign a respective subset of the selected resources to each TX beam of a set of TX beams of the base station—e.g., the base station may store information indicating an association between each subset of the selected resources and a respective TX beam of the set of TX beams. In some aspects, the set of resources may be or may include a set of beam-specific feedback resources on an uplink channel, and each TX beam of the set of TX beams may correspond to a respective subset of the set of beam-specific feedback resources.

For example, referring to FIGS. 4A and 4B, the base station 402 may configure a set of resources to carry feedback, with each TX beam of a set of TX beams 410*a-d*, respectively indexed 0 through 3, corresponding to a respective subset of the set of uplink resources, which may be associated with a respective one of indexes 0 through 3. For example, referring to FIGS. 5A and 5B, the base station 502/502' may configure a set of resources to carry feedback, with each TX beam of a set of TX beams corresponding to a respective subset of the set of uplink resources. For example, referring to FIG. 6, the base station 602 may configure a set of resources to carry feedback, with each TX beam of a set of TX beams corresponding to a respective subset of the set of uplink resources.

At 1106, the base station may transmit configuration information indicating the set of resources configured to carry feedback to the set of UE. The configuration information may be associated with SPS for multicast, and further, the set of UE may be configured with multicast SPS. In some aspects, the configuration information indicates a subset of the set of SPS occasions for which each of the set of UE is to provide feedback. The subset of the set of SPS occasions may be one SPS occasion, or the subset of the set of SPS occasions may be two SPS occasions. The configuration information may further indicate a number of the at least two SPS occasions to the set of UE. In some aspects, the configuration information further indicates that each of the set of UE is to provide feedback indicating ACK feedback when one of: energy associated with SPS signaling detected over at least one SPS occasion of the at least two SPS occasions satisfies a first threshold, or energy associated with the SPS signaling averaged over the at least two SPS occasions satisfies a second threshold.

For example, referring to FIGS. 4A and 4B, the base station 402 may transmit, to the set of UE 404*a-c* configured with multicast SPS, SPS configuration information 422 indicating the set of resources configured for feedback. For example, referring to FIGS. 5A and 5B, the base station 502/502' may transmit, to at least one of the set of UE 504/504', SPS configuration information for broadcast and/or multicast that indicates the set of uplink resources on the uplink channel (e.g., PUCCH) configured for feedback. Each TX beam of a set of TX beams, respectively indexed 0 through 3, of the at least one of the set of UE 504/504' may correspond to a respective subset of the set of uplink resources, which may be associated with a respective one of indexes 0 through 3. For example, referring to FIG. 6, the base station 602 may transmit, to the set of UE 604a-b, SPS configuration information for broadcast and/or multicast that indicates the set of uplink resources on the uplink channel (e.g., PUCCH) configured for feedback.

At 1108, the base station may transmit SPS signaling to the set of UE via the set of TX beams over each of a set of SPS occasions. In some aspects, the SPS signaling may include a set of reference signals, synchronization signals, and/or pilot signals, such as CSI-RSs, SSBs, pilot signals, and the like. In some other aspects, the SPS signaling may include a set of control signals on an MCCH carried on a downlink data channel. In still further aspects, the SPS signaling may include SPS date.

For example, referring to FIGS. 4A and 4B, the base station 402 may transmit, to the set of UE 404a-c, the set of first SPS signal(s) 424 via the set of TX beams 410a-d over each of a set of SPS occasions. For example, referring to FIGS. 5A and 5B, the base station 502/502' may transmit SPS signaling to the set of UE 504/504' via a set of TX beams over each of the set of SPS occasions. For example, referring to FIG. 6, one of the base station 602 may transmit SPS signaling to the set of UE 604a-b via a set of TX beams over each of a set of SPS occasions.

At 1110, the base station may receive feedback from the set of UE on one or more subsets of the set of resources based on the SPS signaling. The feedback may be associated with the SPS signaling over a subset of the set of SPS occasions, such as one SPS occasion or at least two SPS occasions. The feedback may indicate one of ACK or NACK associated with the SPS signaling. In some aspects, the feedback may be received from a respective UE of the set of UE on at least one subset of the set of resources corresponding to at least one TX beam of the set of TX beams. In some aspects, the feedback may be received on each subset of the set of beam-specific feedback resources that corresponds to one of the set of TX beams via which at least one of the set of UE received at least one of the set of first signals.

For example, referring to FIGS. 4A and 4B, the base station 402 may receive, from the set of UE 404a-c, the set of response signals 426a-c on one or more subsets of the set of resources based on the set of first signal(s) 424. The one or more subsets of the set of resources may respectively correspond to one or more of the set of TX beams 410a-d to indicate ACK or NACK feedback for the one or more of the set of TX beams 410a-d. For example, referring to FIGS. 5A and 5B, the base station 502/502' may receive feedback from the set of UE 504/504' on one or more subsets of the set of resources respectively corresponding to one or more of the set of TX beams based on the SPS signaling, and the feedback may indicate one of ACK or NACK. For example, referring to FIG. 6, one of the base station 602 may receive feedback from the set of UE 604a-b on one or more subsets of the set of resources respectively corresponding to one or more of the set of TX beams based on the SPS signaling, and the feedback may indicate one of ACK or NACK.

Figure 12:
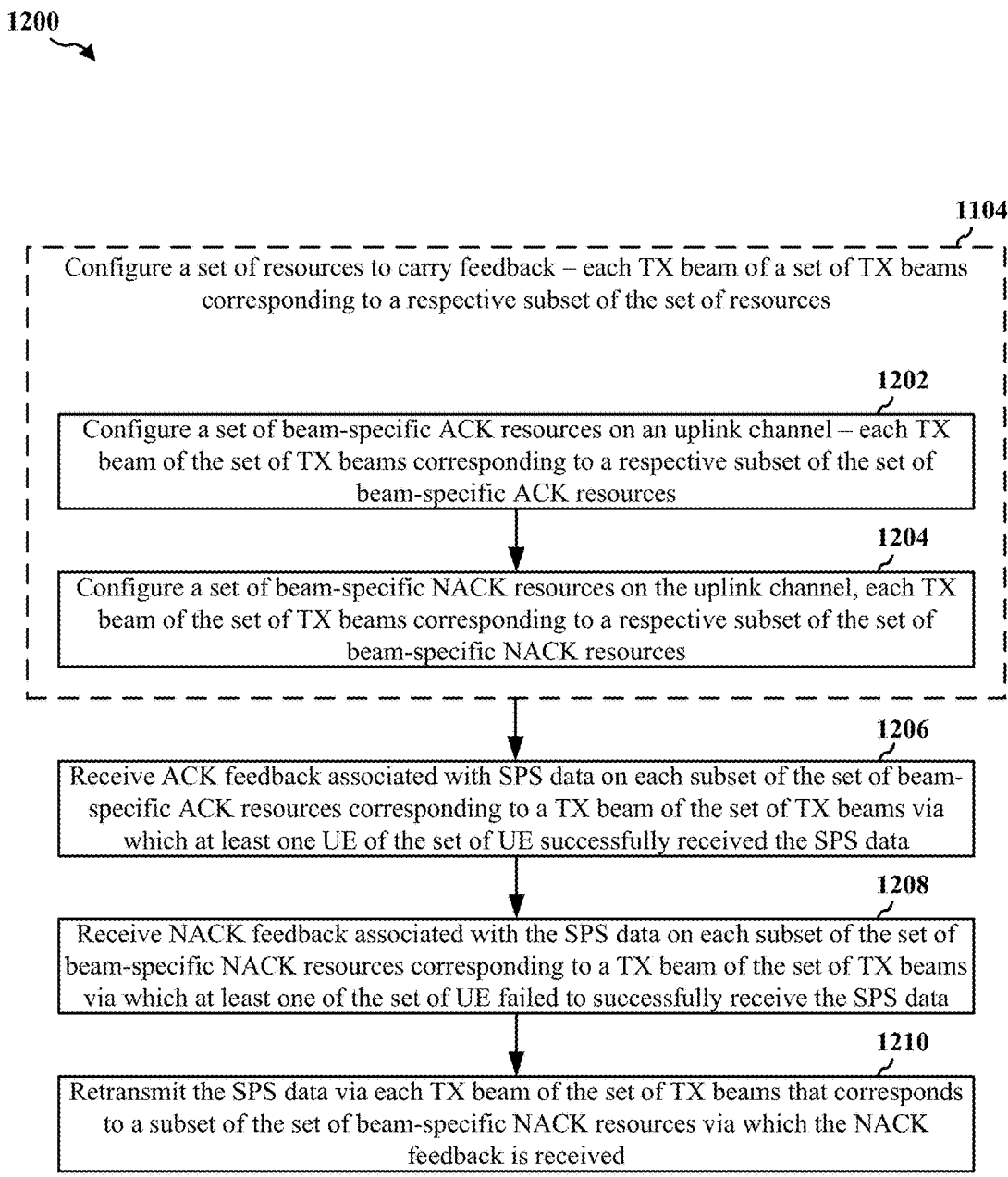
FIG. 12 is a flowchart of a method of wireless communication by a base station.

FIG. 12 is a flowchart of a method 1200 of wireless communication. The method 1200 may be performed by a base station. For example, the method 1200 may be performed by at least one of the base station 102/180, 310, 402, 502/502', 602, and/or the method 1200 may be performed by the apparatus 1702/1702'. In another example, the method 1200 may be performed by the processing system 1814, which may include the memory 376 and which may be an entire base station 102/180, 310, 402, 502/502', 602, or a component of a base station 102/180, 310, 402, 502/502', 602, such as the TX processor 316, the RX processor 370, and/or the controller/processor 375.

In some aspects, the method 1200 of FIG. 12 may be practiced in connection with the method 1100 of FIG. 11. For example, FIG. 12 illustrates some example operations of 1104, as well as some example operations that may be practiced after 1104, within 1104, or at another time. According to various different aspects, one or more of the illustrated operations may be transposed, omitted, or contemporaneously performed.

In some aspects, to configure a set of resources to carry feedback, with each TX beam of a set of TX beams corresponding to a respective subset of the set of resources, as illustrated by 1104 of FIG. 11, the base station may practice or perform 1202 and 1204 of FIG. 12.

At 1202, the base station may configure a set of beam-specific ACK resources on an uplink channel, with each TX beam of the set of TX beams corresponding to a respective subset of the set of beam-specific ACK resources. In some aspects, first, the base station may select resources that are not yet scheduled, and second, the base station may allocate the selected resources to carry ACK feedback that is beam-specific with respect to the set of TX beams of the base station. Third, the base station may assign a respective subset of the selected resources to each TX beam of a set of TX beams of the base station—e.g., the base station may store information indicating an association between each subset of the selected resources and a respective TX beam of the set of TX beams.

For example, referring to FIGS. 4A and 4B, the base station 402 may configure a set of beam-specific ACK resources on an uplink channel, with each TX beam of the set of TX beams 410a-d corresponding to a respective subset of the set of beam-specific ACK resources. For example, referring to FIGS. 5A and 5B, the base station 502/502' may configure a set of beam-specific ACK resources on an uplink channel, with each TX beam of the set of TX beams corresponding to a respective subset of the set of beam-specific ACK resources. For example, referring to FIG. 6, the base station 602 may configure a set of beam-specific ACK resources on an uplink channel, with each TX beam of the set of TX beams corresponding to a respective subset of the set of beam-specific ACK resources. In the context of FIG. 11, the set of resources, described in the method 1100, may be or may include the set of beam-specific ACK resources on the uplink channel.

At 1204, the base station may configure a set of beam-specific NACK resources on the uplink channel, with each TX beam of the set of TX beams corresponding to a respective subset of the set of beam-specific NACK resources. In some aspects, first, the base station may select other resources that are not yet scheduled, and second, the base station may allocate the selected other resources to carry NACK feedback that is beam-specific with respect to the set of TX beams of the base station. Third, the base station may assign a respective other subset of the selected other resources to each TX beam of a set of TX beams of the base station—e.g., the base station may store information indicating an association between each other subset of the selected other resources and a respective TX beam of the set of TX beams.

For example, referring to FIGS. 4A and 4B, the base station 402 may configure a set of beam-specific NACK resources on an uplink channel, with each TX beam of the set of TX beams 410*a-d* corresponding to a respective subset of the set of beam-specific NACK resources. For example, referring to FIGS. 5A and 5B, the base station 502/502' may configure a set of beam-specific NACK resources on an uplink channel, with each TX beam of the set of TX beams corresponding to a respective subset of the set of beam-specific NACK resources. For example, referring to FIG. 6, the base station 602 may configure a set of beam-specific NACK resources on an uplink channel, with each TX beam of the set of TX beams corresponding to a respective subset of the set of beam-specific NACK resources. In the context of FIG. 11, the set of resources, described in the method 1100, may be or may include the set of beam-specific NACK resources on the uplink channel.

At 1206, the base station may receive ACK feedback associated with SPS data on each subset of the set of beam-specific ACK resources corresponding to a TX beam of the set of TX beams via which the SPS data is successfully received by at least one of the set of UE. The ACK feedback may indicate, to the base station, that the SPS data was successfully received by at least one of the set of UE via one or more TX beams of the set of TX beams corresponding to the set of beam-specific ACK resources on which the ACK feedback is received.

For example, referring to FIGS. 4A and 4B, the base station 402 may receive at least one respective response signal(s) 426*a-c*, which may indicate ACK feedback associated with SPS data on each subset of the set of beam-specific ACK resources corresponding to a TX beam of the set of TX beams 410*a-d* via which SPS data is successfully received by at least one of the set of UE 404*a-c* (e.g., the first signal(s) 424 may include SPS data). For example, referring to FIGS. 5A and 5B, the base station 502/502' may receive ACK feedback associated with SPS data on each subset of the set of beam-specific ACK resources corresponding to a TX beam of the set of TX beams via which the SPS data is successfully received by at least one of the set of UE 504/504'. For example, referring to FIG. 6, one of the base station 602 may receive ACK feedback associated with SPS data on each subset of the set of beam-specific ACK resources corresponding to a TX beam of the set of TX beams via which the SPS data is successfully received by at least one of the set of UE 604*a-b*.

At 1208, the base station may receive NACK feedback associated with the SPS data on each subset of the set of beam-specific NACK resources corresponding to a TX beam of the set of TX beams via which the SPS data is unsuccessfully received by at least one of the set of UE. The NACK feedback may indicate, to the base station, that the SPS data was unsuccessfully received by at least one of the set of UE via one or more TX beams of the set of TX beams corresponding to the set of beam-specific NACK resources on which the NACK feedback is received.

For example, referring to FIGS. 4A and 4B, the base station 402 may receive at least one respective response signal(s) 426*a-c*, which may indicate NACK feedback associated with the SPS data on each subset of the set of beam-specific NACK resources corresponding to a TX beam of the set of TX beams 410*a-d* via which SPS data is unsuccessfully received by at least one of the set of UE 404*a-c* (e.g., the first signal(s) 424 may include SPS data). For example, referring to FIGS. 5A and 5B, the base station 502/502' may receive NACK feedback associated with the SPS data on each subset of the set of beam-specific NACK resources corresponding to a TX beam of the set of TX beams via which the SPS data is unsuccessfully received by at least one of the set of UE 504/504'. For example, referring to FIG. 6, one of the base station 602 may receive NACK feedback associated with the SPS data on each subset of the set of beam-specific NACK resources corresponding to a TX beam of the set of TX beams via which the SPS data is unsuccessfully received by at least one of the set of UE 604*a-b*.

At 1210, the base station may retransmit the SPS data via each TX beam of the set of TX beams that corresponds to a subset of the set of beam-specific NACK resources on which the NACK feedback is received. For example, referring to FIGS. 4A and 4B, the base station 402 may retransmit at least one set of the second SPS signal(s) 428 via each TX beam of the set of TX beams 410*a-d* that corresponds to a subset of the set of beam-specific NACK resources on which the NACK feedback is received, which may include a retransmission of SPS data. For example, referring to FIGS. 5A and 5B, the base station 502/502' may retransmit SPS data via each TX beam of the set of TX beams that corresponds to a subset of the set of beam-specific NACK resources on which the NACK feedback is received. For example, referring to FIG. 6, one of the base station 602 may retransmit SPS data via each TX beam of the set of TX beams that corresponds to a subset of the set of beam-specific NACK resources on which the NACK feedback is received.

Figure 13:
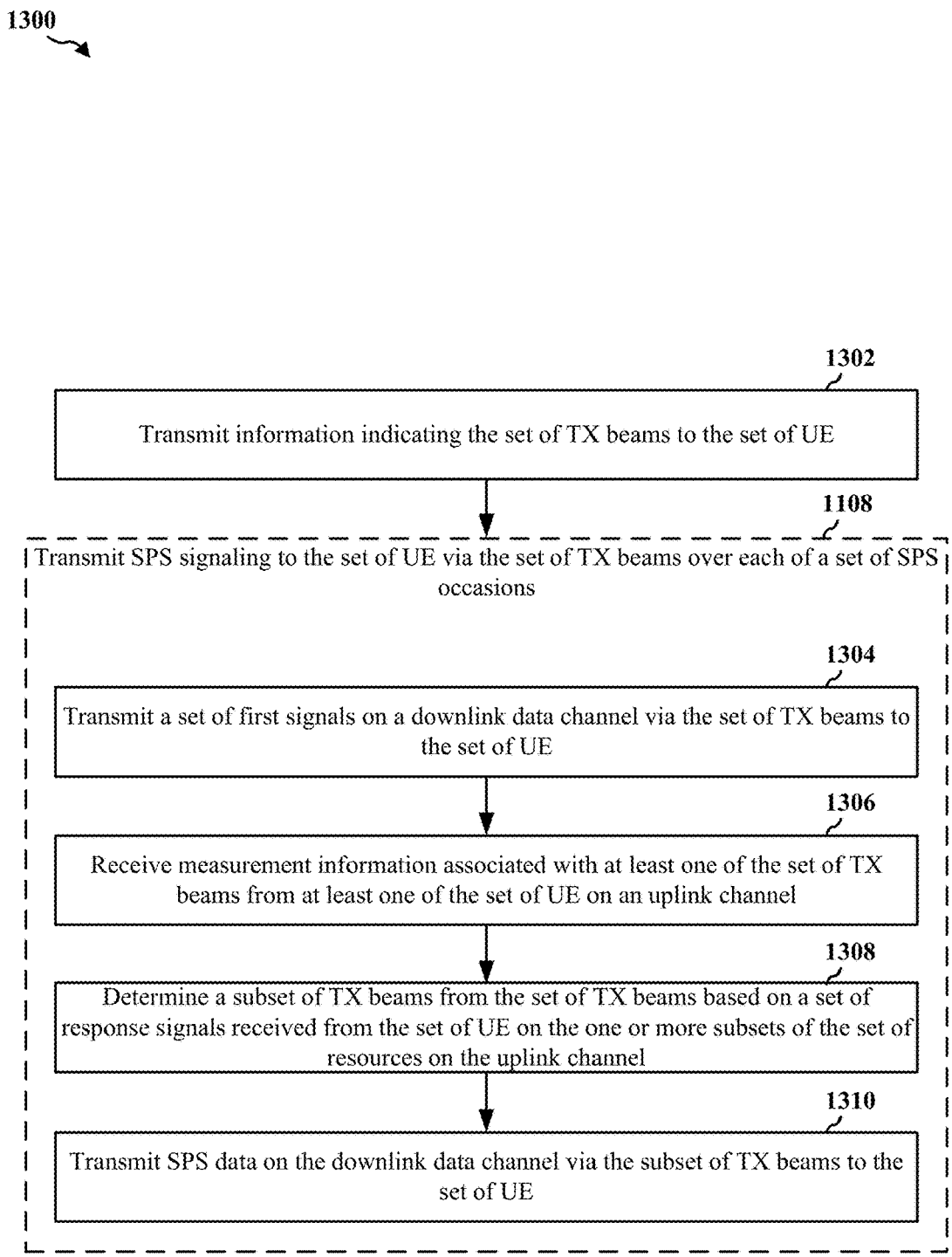
FIG. 13 is a flowchart of a method of wireless communication by a base station.

FIG. 13 is a flowchart of a method 1300 of wireless communication. For example, the method 1200 may be performed by a base station 102/180, 310, 402, 502/502', 602, and/or the method 1200 may be performed by the apparatus 1702/1702'. In another example, the method 1200 may be performed by the processing system 1814, which may include the memory 376 and which may be an entire base station 102/180, 310, 402, 502/502', 602, or a component of a base station 102/180, 310, 402, 502/502', 602, such as the TX processor 316, the RX processor 370, and/or the controller/processor 375.

In some aspects, the method 1300 of FIG. 13 may be practiced in connection with the method 1100 of FIG. 11. For example, FIG. 13 illustrates some example operations of 1108, as well as some example operations that may be practiced before or within 1108 or elsewhere. According to various different aspects, one or more of the illustrated operations may be transposed, omitted, or contemporaneously performed.

At 1302, the base station may transmit information indicating the set of TX beams to the set of UE. Each of the set of UE may be configured for SPS, e.g., by the base station via SPS configuration information for broadcast and/or multicast. In some aspects, the information indicating the set of TX beams may indicate a number of beams of the base station and a bitmap having each bit corresponding to a respective one of the beams of the base station. In the bitmap, a first bit value (e.g., "1") may indicate a corresponding one of the beams is included in the set of TX beams and a second bit value (e.g., "0") may indicate a corresponding one of the beams is excluded from the set of TX beams. For example, the set of TX beams may include an active set of TX beams (e.g., beams via which the base station is configured to transmit SPS data or other information), so that a first bit value in the bitmap may indicate a beam is included in the active set of TX beams and a second bit value in the bitmap indicates a beam is excluded from the active set of TX beams.

In some aspects, to transmit SPS signaling to the set of UE via the set of TX beams over each of a set of SPS occasions, as illustrated by 1106 of FIG. 11, the base station may practice or perform one or more of 1304, 1306, 1308, and/or 1310 of FIG. 13.

At 1304, the base station may transmit a set of first signals on a downlink data channel via the set of TX beams to the set of UE. In some aspects, each of the set of first signals may be a reference, pilot, or synchronization signal, such as a CSI-RS, SSB, or other reference signal. In some other aspects, each of the set of first signals may include a control signal on an MCCH carried in the downlink data channel. In still other aspects, the set of first signals may include SPS data. The base station may transmit a respective subset of the set of first signals over each of a set of SPS occasions.

For example, referring to FIGS. 4A and 4B, the base station 402 may transmit the set of first signal(s) 424 on a downlink data channel via the set of TX beams 410a-d to the set of UE 404a-c. For example, referring to FIGS. 5A and 5B, the base station 502/502' may transmit at least one first signal(s) on a downlink data channel via a set of TX beams to the set of UE 504/504'. For example, referring to FIG. 6, one of the base station 602 may transmit at least one first signal(s) on a downlink data channel via a set of TX beams to the set of UE 604a-b.

At 1306, the base station may receive measurement information associated with at least one of the set of TX beams from at least one of the set of UE on the uplink channel. In some aspects, the measurement information may include one or more values (e.g., one or more measured values or one or more average values) that satisfy the threshold, with each of the one or more values associated with a respective TX beam of the at least one of the set of TX beams. In some other aspects, the measurement information may include an energy measurement corresponding to the at least one of the set of TX beams. In still other aspects, the measurement information may include at least one value indicative of channel quality, signal strength, etc. (e.g., at least one of an RSRP, RSSI, RSRQ, SNR, and/or other channel quality value) associated with the at least one of the set of TX beams. In some aspects, the measurement information may include a measurement associated with SPS signaling received over one of the set of SPS occasions. In some other aspects, the measurement information may include an average of at least two measurements associated with SPS signaling received over at least two of the set of SPS occasions.

For example, referring to FIGS. 4A and 4B, the base station 402 may receive one of the sets of response signals 426a-c indicating at least one of the set of TX beams 410a-d from at least one of the set of UE 404a-c on the uplink channel, with the one of the sets of response signals 426a-c including measurement information associated with the at least one of the set of TX beams 410a-d. For example, referring to FIGS. 5A and 5B, the base station 502/502' may receive a response signal(s) indicating at least one of the set of TX beams from at least one of the set of UE 504/504' on the uplink channel, with the response signal(s) including measurement information associated with the at least one of the set of TX beams. For example, referring to FIG. 6, one of the base station 602 may receive a response signal(s) indicating at least one of the set of TX beams from at least one of the set of UE 604a-b on the uplink channel, with the response signal(s) including measurement information associated with the at least one of the subset of TX beams.

At 1308, the base station may determine a subset of TX beams from the set of TX beams based on a set of response signals received from the set of UE on the one or more subsets of the set of resources on an uplink channel. Each of the set of response signals may indicate a TX beam of the subset of TX beams. In some aspects, first, the base station may receive a set of response signals on the one or more subsets of the set of resources from the set of UE, and second, the base station may identify each of the set of TX beams corresponding to a respective subset of the one or more subsets of the set of resources. If the feedback received on a respective subset of the one or more subsets of the set of resources indicates ACK feedback, then the base station may include the corresponding TX beam in the subset of TX beams. However, if the feedback received on a respective subset of the one or more subsets of the set of resources indicates NACK feedback, then the base station may exclude the corresponding TX beam from the subset of TX beams. In other some aspects the set of response signals may include the measurement information and, first, the base station may compare at least one value (e.g., a measured value or average value received in the measurement information) associated with at least one of the set of TX beams with a threshold, such as a threshold associated with a satisfactory channel quality, signal strength, etc. Second, the base station may evaluate whether the at least one value satisfies (e.g., meets or exceeds) the threshold. Third, the base station may select a TX beam of the set of TX beams to include in the subset of TX beams when the TX beam is associated with at least one value that satisfies the threshold, or the base station may exclude a TX beam of the set of TX beams from the subset of TX beams when the TX beam is associated with at least one value that fails to satisfy (e.g., is less than) the threshold.

For example, referring to FIGS. 4A and 4B, the base station 402 may determine a subset of TX beams, including the first, third, and fourth TX beams 410a, 410c, 410d, from the set of TX beams 410a-d based on the set of response signals 426a-c received from the set of UE 404a-c on the one or more subsets of the set of resources on an uplink channel. Each of the set of response signals may indicate at least one of the first, third, and fourth TX beams 410a, 410c, 410d included in the subset of TX beams. For example, referring to FIGS. 5A and 5B, the base station 502/502' may determine a subset of TX beams from the set of TX beams based on a set of response signals received from the set of UE 504/504' on the one or more subsets of the set of resources on an uplink channel. For example, referring to FIG. 6, one of the base station 602 may determine a subset of TX beams from the set of TX beams based on a set of response signals received from the set of UE 604a-b on the one or more subsets of the set of resources on an uplink channel.

At 1310, the base station may transmit SPS data on the downlink data channel via the subset of TX beams to the set of UE. In some aspects, the SPS data may be transmitted based on UE capability information received from each of the set of UE. In some aspects, the base station may transmit the SPS data over each of a set of SPS occasions.

For example, referring to FIGS. 4A and 4B, the base station 402 may transmit at least one set of second SPS signal(s) 428, which may include SPS data on the downlink data channel transmitted via each of the subset of TX beams associated with feedback or measurement information received from at least one of the set of UE 404a-c. For example, referring to FIGS. 5A and 5B, the base station 502/502' may transmit SPS data on the downlink data channel via each of the subset of TX beams associated with feedback or measurement information received from at least one of the set of UE 504/504'. For example, referring to FIG. 6, one of the base station 602 may transmit SPS data on the downlink data channel via each of the subset of TX beams associated with feedback or measurement information received from at least one of the set of UE 604*a-b*.

Figure 14:
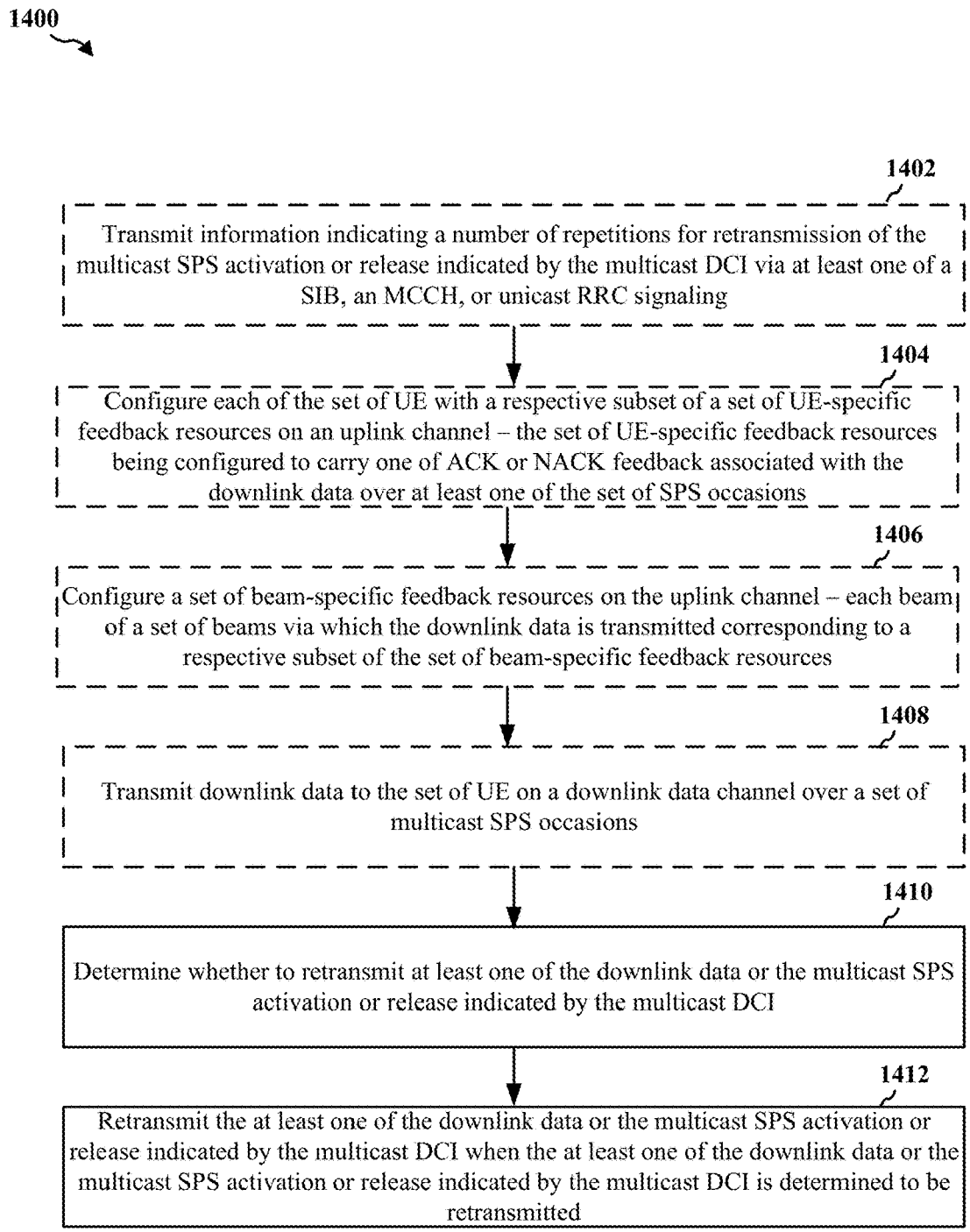
FIG. 14 is a flowchart of a method of wireless communication by a base station.

FIG. 14 is a flowchart of a method 1400 of wireless communication. The method 1400 may be performed by a base station. For example, the method 1400 may be performed by a base station 102/180, 310, 402, 502/502', 602, and/or the method 1400 may be performed by the apparatus 1702/1702'. In another example, the method 1400 may be performed by the processing system 1814, which may include the memory 376 and which may be an entire base station 102/180, 310, 402, 502/502', 602, or a component of a base station 102/180, 310, 402, 502/502', 602, such as the TX processor 316, the RX processor 370, and/or the controller/processor 375. According to various different aspects, one or more of the illustrated operations may be transposed, omitted, or contemporaneously performed.

At 1402, the base station may transmit information indicating a number of repetitions for retransmission of multicast SPS activation or release indicated by multicast DCI via at least one of a SIB, an MCCH, or unicast RRC signaling. In some aspects, the DCI may include information for activation of SPS. In some other aspects, the DCI may include information releasing SPS. The information may be transmitted to a set of UE, and each of the set of UE may be configured with SPS.

For example, referring to FIGS. 4A and 4B, the base station 402 may transmit information indicating a number of repetitions for retransmission of multicast SPS activation or release indicated by multicast DCI via at least one of a SIB, an MCCH, or unicast RRC signaling. For example, referring to FIGS. 5A and 5B, the base station 502/502' may transmit information indicating a number of repetitions for retransmission of multicast SPS activation or release indicated by multicast DCI via at least one of a SIB, an MCCH, or unicast RRC signaling. For example, referring to FIG. 6, one of the base station 602 may transmit information indicating a number of repetitions for retransmission of multicast SPS activation or release indicated by multicast DCI via at least one of a SIB, an MCCH, or unicast RRC signaling.

At 1404, the base station may configure each of the set of UE with a respective subset of a set of UE-specific feedback resources on an uplink channel. The UE-specific feedback resources may be configured to carry at least one of ACK feedback or NACK feedback associated with downlink data over at least one of a set of SPS occasions. In some aspects, the at least one of the set of SPS occasions is activated by DCI. In some aspects, first, the base station may select resources that are not yet scheduled, and second, the base station may allocate the selected resources to carry ACK feedback or NACK feedback. Third, the base station may assign a respective subset of the selected resources to each of the set of UE—e.g., the base station may store information indicating an association between each subset of the selected resources and a respective UE of the set of UE. Fourth, the base station may transmit information indicating a respective subset of the set of UE-specific feedback resources to each of the set of UE.

For example, referring to FIGS. 4A and 4B, the base station 402 may configure each of the set of UE 404*a-c* with a respective subset of a set of UE-specific feedback resources on an uplink channel, with the set of UE-specific feedback resources being configured to carry at least one of ACK feedback or NACK feedback associated with downlink data over at least one of a set of SPS occasions. For example, referring to FIGS. 5A and 5B, the base station 502/502' may configure each of the set of UE 504/504' with a respective subset of a set of UE-specific feedback resources on an uplink channel, with the set of UE-specific feedback resources being configured to carry at least one of ACK feedback or NACK feedback associated with downlink data over at least one of a set of SPS occasions. For example, referring to FIG. 6, one of the base station 602 may configure each of the set of UE 604*a-b* with a respective subset of a set of UE-specific feedback resources on an uplink channel, with the set of UE-specific feedback resources being configured to carry at least one of ACK feedback or NACK feedback associated with downlink data over at least one of a set of SPS occasions.

At 1406, the base station may configure a set of beam-specific feedback resources on the uplink channel, with each beam of a set of beams via which the downlink data is transmitted corresponding to a respective subset of the set of beam-specific feedback resources. The base station may configure the set of beam-specific feedback resources to carry NACK feedback associated with the downlink data over at least one of the set of SPS occasions that is not activated by DCI. Potentially, the base station may configure the set of beam-specific feedback resources so that ACK feedback cannot be carried on the set of beam-specific feedback resources.

For example, referring to FIGS. 4A and 4B, the base station 402 may configure each of a set specific feedback resources on the uplink channel that is configured to carry NACK feedback associated with the downlink data over at least one of the set of SPS occasions that is not activated by DCI. In some aspects, each beam of a set of beams 410*a-d* of the at least one of the set of UE 404*a-c* corresponds to a respective subset of the set of beam-specific feedback resources. For example, referring to FIGS. 5A and 5B, the base station 502/502' may transmit second configuration information from the at least one of the set of UE 504/504' indicating a set of beam-specific feedback resources on the uplink channel that is configured to carry NACK feedback associated with the downlink data over at least one of the set of SPS occasions that is not activated by DCI. In some aspects, each beam of a set of beams of the at least one of the set of UE 504/504' corresponds to a respective subset of the set of beam-specific feedback resources. For example, referring to FIG. 6, one of the base station 602 may transmit second configuration information from the at least one of the set of UE 604*a-b* indicating a set of beam-specific feedback resources on the uplink channel that is configured to carry NACK feedback associated with the downlink data over at least one of the set of SPS occasions that is not activated by DCI. In some aspects, each beam of a set of beams of the at least one of the set of UE 604*a-b* corresponds to a respective subset of the set of beam-specific feedback resources.

At 1408, the base station may transmit downlink data to the set of UE on a downlink channel over a set of multicast SPS occasions. The base station may transmit the downlink data via the set of beams respectively corresponding to the subsets of the set of beam-specific feedback resources.

For example, referring to FIGS. 4A and 4B, the base station 402 may transmit downlink data to the set of UE 404*a-b* on a downlink channel over a set of SPS occasions. For example, referring to FIGS. 5A and 5B, the base station 502/502' may transmit downlink data to the set of UE 504/504' on a downlink channel over a set of SPS occasions. For example, referring to FIG. 6, the base station 602 may transmit downlink data to the set of UE 604*a-b* on a downlink channel over a set of SPS occasions.

At 1410, the base station may determine whether to retransmit at least one of downlink data or multicast SPS activation or release indicated by multicast DCI. In some aspects, first, the base station may receive a set of signals on at least one subset of the set of UE-specific resources and/or on at least one subset of the set of beam-specific feedback resources. Second, the base station may identify whether the set of signals includes NACK feedback. If the set of signals includes ACK feedback but not NACK feedback, then the UE may determine to refrain from retransmission of the downlink data and multicast SPS activation or release indicated by multicast DCI. If the set of signals includes NACK feedback and the NACK feedback is carried on a subset of the set of UE-specific feedback resources, the base station may identify which of the set of UE transmitted the NACK feedback by identifying which UE of the set of UE is configured with the subset of the set of UE-specific feedback resources on which the NACK feedback is carried. The base station may determine to retransmit at least one of the downlink data or multicast SPS activation or release indicated by multicast DCI associated with SPS activation or release to the UE of the set of UE that is configured with the subset of the set of UE-specific feedback resources on which the NACK feedback is carried. However, if the set of signals includes NACK feedback and the NACK feedback is carried on a subset of the set of beam-specific feedback resources, the base station may identify which beam of the set of beams corresponds to the NACK feedback by identifying which of the set of beams corresponds to the subset of the set of beam-specific feedback resources on which the NACK feedback is carried. Accordingly, the base station may determine to retransmit at least one of the downlink data or multicast SPS activation or release indicated by multicast DCI associated with SPS activation or release via the one of the set of beams that corresponds to the subset of the set of beam-specific feedback resources on which the NACK feedback is carried.

For example, referring to FIGS. 4A and 4B, the base station 402 may determine whether to retransmit at least one of downlink data or DCI associated with SPS activation or release when the base station 402 receives NACK feedback on at least one subset of the set of UE-specific feedback resources and/or on at least one subset of the set of beam-specific feedback resources. For example, referring to FIGS. 5A and 5B, the base station 502/502' may determine whether to retransmit at least one of downlink data or DCI associated with SPS activation or release when the base station 502/502' receives NACK feedback on at least one subset of the set of UE-specific feedback resources and/or on at least one subset of the set of beam-specific feedback resources. For example, referring to FIG. 6, the base station 602 may determine whether to retransmit at least one of downlink data or DCI associated with SPS activation or release when the base station 602 receives NACK feedback on at least one subset of the set of UE-specific feedback resources and/or on at least one subset of the set of beam-specific feedback resources.

At 1412, the base station may retransmit the at least one of the downlink data or the multicast SPS activation or release indicated by multicast DCI when the at least one of the downlink data or the multicast SPS activation or release indicated by multicast DCI is determined to be retransmitted. In some aspects, the base station may repeatedly retransmit the multicast SPS activation or release indicated by multicast DCI, with the number of repetitions of the retransmissions being transmitted via at least one of a SIB, an MCCH, or unicast RRC signaling having information indicating the number of repetitions for the retransmissions of multicast SPS activation or release indicated by multicast DCI. In some aspects, the base station may retransmit the multicast SPS activation or release indicated by multicast DCI in a unicast DCI. The base station may retransmit the multicast SPS activation or release indicated by multicast DCI in a retransmission window, which may be configured by the base station for the set of UE. For example, the base station may retransmit multicast SPS activation or release indicated by multicast DCI associated with SPS activation in a first retransmission window, and the base station may retransmit multicast SPS activation or release indicated by multicast DCI associated with SPS release in a second retransmission window, which may be different (or the same) as the first retransmission window. In some other aspects, the base station may retransmit the downlink data over a set of SPS occasions. In still further aspects, the base station may retransmit the downlink data or multicast SPS activation or release indicated by multicast DCI to the UE configured with the subset of the set of UE-specific feedback resources on which the NACK feedback is received, such as by retransmitting the downlink data or multicast SPS activation or release indicated by multicast DCI via one of the set of beams that covers the UE. Alternatively or additionally, the base station may retransmit the downlink data or multicast SPS activation or release indicated by multicast DCI via the beam of the set of beams that corresponds to the subset of the set of beam-specific feedback resources on which the NACK feedback is received.

For example, referring to FIGS. 4A and 4B, the base station 402 may retransmit the at least one of the downlink data or the DCI when the at least one of the downlink data or the DCI is determined to be retransmitted. For example, referring to FIGS. 5A and 5B, the base station 502/502' may retransmit the at least one of the downlink data or the DCI when the at least one of the downlink data or the multicast SPS activation or release indicated by multicast DCI is determined to be retransmitted. For example, referring to FIG. 6, the base station 602 may retransmit the at least one of the downlink data or the DCI when the at least one of the downlink data or the multicast SPS activation or release indicated by multicast DCI is determined to be retransmitted.

Figure 15:
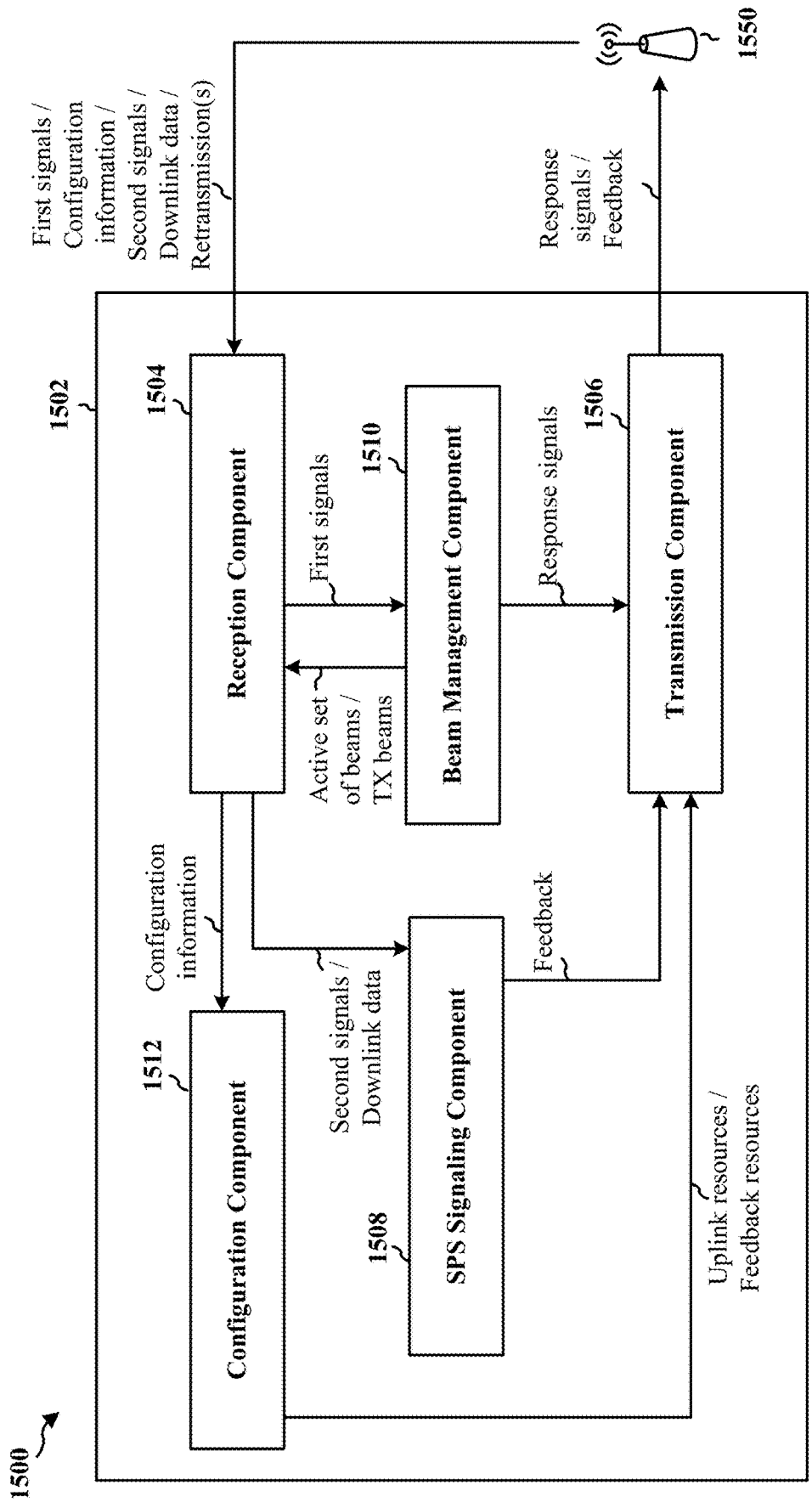
FIG. 15 is a conceptual data flow diagram illustrating the data flow between different means/components in an example apparatus.

FIG. 15 is a conceptual data flow diagram illustrating example data flow 1500 between different means/components in an example apparatus 1502. The apparatus 1502 may be a UE.

In one configuration, the apparatus 1502 may include a transmission component 1506 configured to transmit, to the base station 1550, capability information indicating at least one of a capability for multicast communication, a capability for multi-beam reception, or a capability of parallel feedback transmission, e.g., as described in connection with 702 of FIG. 7.

The apparatus 1502 may further include a reception component 1504 that may receive, from the base station 1550, SPS configuration information for broadcast and/or multicast that indicates a set of resources configured for feedback, and each TX beam of a set of TX beams of the base station 1550 may correspond to a respective subset of the set of resources, e.g., as described in connection with 704 of FIG. 7. In some aspects, the set of resources may be or may include a set of beam-specific feedback resources on an uplink channel, with each TX beam of the set of TX beams corresponding to a respective subset of the set of beam-specific feedback resources.

The reception component 1504 may be further configured to receive SPS signaling from the base station 1550 via one or more TX beams of the set of TX beams over each of a set of SPS occasions, e.g., as described in connection with 706 of FIG. 7.

The transmission component 1506 may be further configured to transmit feedback to the base station 1550 on one or more subsets of the set of resources respectively corresponding to the one or more TX beams based on the SPS signaling, e.g., as described in connection with 708 of FIG. 7. The feedback may indicate one of ACK or NACK associated with the SPS signaling.

In some aspects, the reception component 1504 may be further configured to receive first configuration information indicating a set of beam-specific ACK resources on an uplink channel, with each TX beam of the set of TX beams corresponding to a respective subset of the set of beam-specific ACK resources, e.g., as described in connection with 802 of FIG. 8.

The apparatus 1502 may further include configuration component 1512 that may be configured to schedule signaling (e.g., a set of response signals) on the set of beam-specific ACK resources on an uplink channel when SPS data is successfully received.

The reception component 1504 may be further configured to receive second configuration information indicating a set of beam-specific NACK resources on the uplink channel, with each TX beam of the set of TX beams corresponding to a respective subset of the set of beam-specific NACK resources, e.g., as described in connection with 804 of FIG. 8.

The configuration component 1512 that may be further configured to schedule signaling (e.g., a set of response signals) on the set of beam-specific NACK resources on the uplink channel when SPS data is unsuccessfully received. The configuration component 1512 may provide information indicating the scheduled resources to the transmission component 1506.

The apparatus 1502 may further include an SPS signaling component 1508 that is configured to decode received data and/or control information and provide the status of the decode to the transmission component 1506 for reporting to the base station 1550. The SPS signaling component 1508 may determine whether data and/or control information is successfully received, such as by performing an error check, data integrity check, etc. that passes when the data and/or control information is decoded, or unsuccessfully received, such as when the error check, data integrity check, etc. fails.

The transmission component 1506 may be further configured to transmit ACK feedback associated with SPS data on each (scheduled) subset of the set of beam-specific ACK resources corresponding to a TX beam of the set of TX beams via which the SPS data is successfully received, e.g., as described in connection with 806 of FIG. 8.

However, the transmission component 1506 may be further configured to transmit NACK feedback associated with the SPS data on each (scheduled) subset of the set of beam-specific NACK resources corresponding to a TX beam of the set of TX beams via which the SPS data is unsuccessfully received, e.g., as described in connection with 808 of FIG. 8.

The reception component 1504 may be further configured to receive a retransmission of the SPS data via each TX beam of the set of TX beams that corresponds to a subset of the set of beam-specific NACK resources on which the NACK feedback is transmitted, e.g., as described in connection with 810 of FIG. 8.

The reception component 1504 may be further configured to receive information indicating the set of TX beams from the base station 1550, e.g., as described in connection with 902 of FIG. 9. In some aspects, the information indicating the set of TX beams may indicate a number of beams of the base station 1550 and a bitmap having each bit corresponding to a respective one of the beams of the base station 1550, and in the bitmap, a first bit value (e.g., "1") may indicate a corresponding one of the beams is included in the set of TX beams and a second bit value (e.g., "0") may indicate a corresponding one of the beams is excluded from the set of TX beams. For example, the set of TX beams may include an active set of TX beams (e.g., beams via which the base station 1550 is configured to transmit SPS data or other information), so that a first bit value in the bitmap may indicate a beam is included in the active set of TX beams and a second bit value in the bitmap indicates a beam is excluded from the active set of TX beams.

The reception component 1504 may be further configured to receive a set of first signals from the base station 1550 on a downlink data channel via the one or more TX beams of the set of TX beams of the base station 1550, e.g., as described in connection with 904 of FIG. 9. In some aspects, each of the set of first signals may be a reference, pilot, or synchronization signal, such as a CSI-RS, SSB, or other reference signal. In some other aspects, each of the set of first signals may include a control signal on an MCCH carried in the downlink data channel. In still other aspects, the set of first signals may include SPS data. The reception component 1504 may receive a respective subset of the set of first signals over each of a set of SPS occasions.

The apparatus 1502 may further include a beam management component 1510 that may be configured to determine a respective energy corresponding to each of the set of first signals, e.g., as described in connection with 906 of FIG. 9. In some aspects, the beam management component 1510 may measure the energy of one of the set of first signals corresponding to one of the set of TX beams of the base station 1550 over one of the set of SPS occasions, and/or may average energies measured from at least two of the set of first signals corresponding to one of the set of TX beams of the base station 1550 over at least two of the set of SPS occasions.

The beam management component 1510 may be further configured to determine a subset of TX beams from the set of TX beams based on the set of first signals received via the one or more TX beams of the set of TX beams, e.g., as described in connection with 908 of FIG. 9.

The transmission component 1506 may be further configured to transmit a set of response signals indicating the subset of TX beams on the uplink channel, e.g., as described in connection with 910 of FIG. 9. In some aspects, the subset of TX beams may be selected by the beam management component 1510. The subset of TX beams may be those beams having a satisfactory channel quality, signal strength, etc., as reflected by a respective measured value associated with each of the subset of TX beams. In some aspects, each of the set of response signals may indicate the respective energy corresponding to one of the reference signals received via one of the subset of TX beams satisfies a threshold. In some other aspects, each of the set of response signals may include an ACK signal corresponding to a respective control signal received via one of the subset of TX beams.

The transmission component 1506 may be further configured to transmit measurement information associated with at least one of the subset of TX beams to the base station 1550 on the uplink channel, e.g., as described in connection with 912 of FIG. 9. The measurement information may include one or more values (e.g., one or more measured values or one or more average values) that satisfy a threshold, with each of the one or more values associated with a respective one of the subset of TX beams. In some aspects, the measurement information may include each determined value of energy corresponding to a respective one of the set of first signals received via the subset of TX beams.

The reception component 1504 may be further configured to receive SPS data from the base station 1550 on the downlink data channel via the subset of TX beams, e.g., as described in connection with 914 of FIG. 9. In some aspects, the SPS data may be received based on capability information transmitted by the transmission component 1506 to the base station 1550.

In another configuration, the reception component 1504 may be configured to receive information indicating a number of repetitions for retransmission of DCI via at least one of a SIB, an MCCH, or unicast RRC signaling, e.g., as described in connection with 1002 of FIG. 10. In some aspects, a retransmission of DCI may be based on the number of repetitions.

In the other configuration, the reception component 1504 may be further configured to receive first configuration information from the base station 1550 indicating a set of UE-specific feedback resources on an uplink channel, with the set of UE-specific feedback resources being configured to carry at least one of ACK feedback or NACK feedback associated with downlink data over at least one of a set of SPS occasions, e.g., as described in connection with 1004 of FIG. 10.

In the other configuration, the reception component 1504 may be further configured to receive second configuration information from the base station 1550 indicating a set of beam-specific feedback resources on the uplink channel that is configured to carry NACK feedback associated with the downlink data over at least one of the set of SPS occasions that is not activated by DCI, e.g., as described in connection with 1006 of FIG. 10. Each beam of a set of beams of the base station 1550 via which the downlink data is to be received may correspond to a respective subset of the set of beam-specific feedback resources.

In the other configuration, the SPS signaling component 1508 may be configured to determine whether at least one of downlink data on a downlink data channel over at least one multicast SPS occasion or SPS activation or release for the multicast group indicated by DCI associated with SPS activation or release is unsuccessfully received from the base station 1550, e.g., as described in connection with 1008 of FIG. 10.

In the other configuration, the transmission component 1506 may be configured to transmit one of ACK feedback or NACK feedback on the set of UE-specific feedback resources based on whether the downlink data is successfully received from the base station 1550 over the at least one of the set of SPS occasions, e.g., as described in connection with 1010 of FIG. 10.

In the other configuration, the transmission component 1506 may be further configured to transmit NACK feedback on each subset of the set of beam-specific feedback resources that corresponds to one of the set of beams via which the downlink data is unsuccessfully received from the base station 1550 over the at least one of the set of SPS occasions that is not activated by the DCI, e.g., as described in connection with 1012 of FIG. 10. In some aspects, retransmission of the at least one of the downlink data or the DCI is based on transmission of at least one of the NACK feedback on the set of UE-specific feedback resources or the NACK feedback on the set of beam-specific feedback resources.

In the other configuration, the reception component 1504 may be further configured to receive a retransmission of the at least one of the downlink data or the DCI when the at least one of the downlink data or the DCI is determined to be unsuccessfully received, e.g., as described in connection with 1014 of FIG. 10.

The apparatus 1502 may include additional components that perform each of the blocks of the algorithm in the aforementioned call flow diagram of FIG. 4B and flowcharts of FIGS. 7 through 10. As such, each block in the aforementioned call flow diagram of FIG. 4B and flowcharts of FIGS. 7 through 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
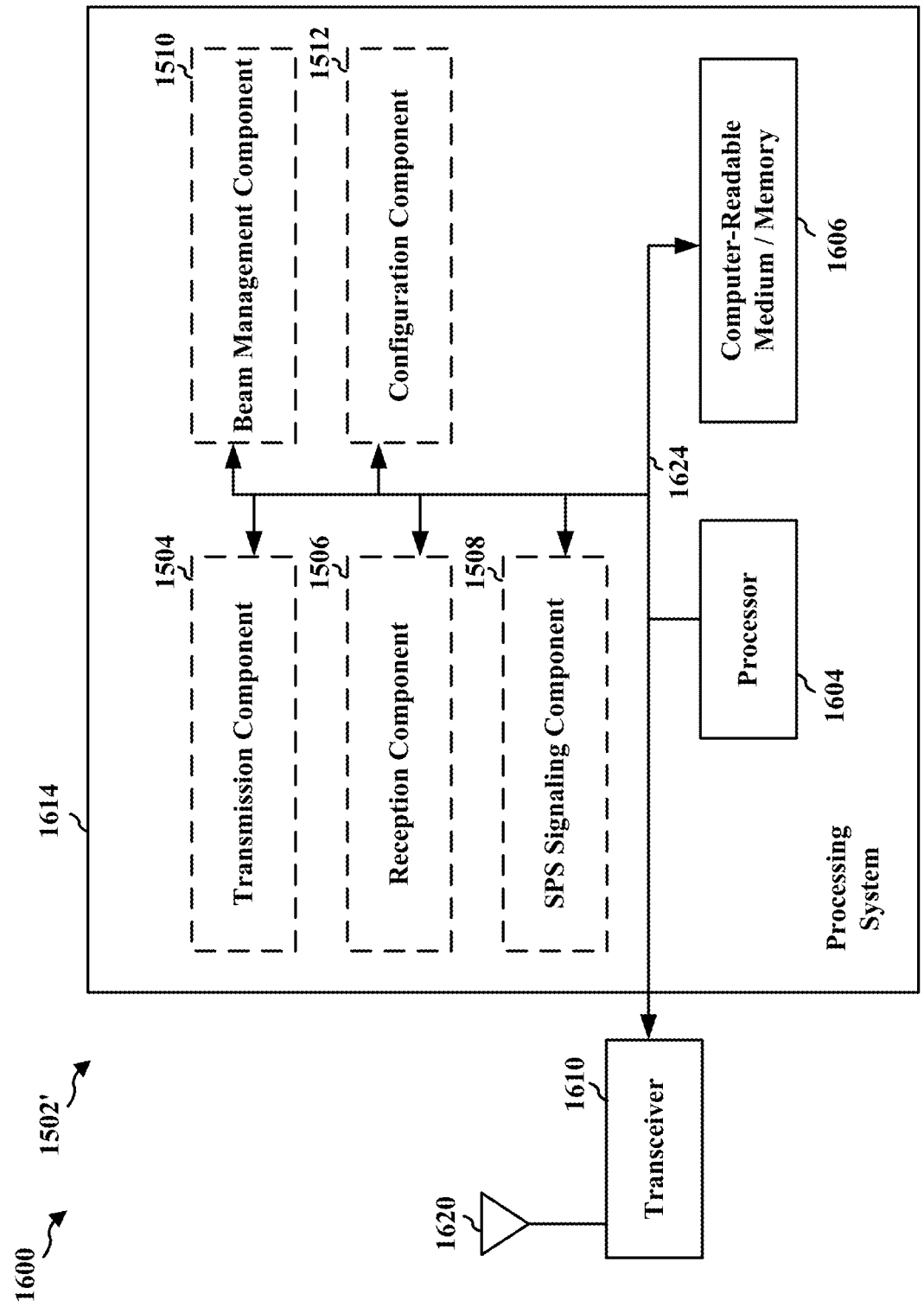
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359. Alternatively, the processing system 1614 may be the entire UE (e.g., the UE 350 of FIG. 3).

In one configuration, the apparatus 1502/1502' for wireless communication includes means for receiving, from a base station, SPS configuration information for broadcast and/or multicast indicating a set of resources configured for feedback, each TX beam of a set of TX beams of the base station corresponding to a respective subset of the set of resources. The apparatus 1502/1502' for wireless communication further includes means for receiving SPS signaling from the base station via one or more TX beams of the set of TX beams over each of a set of SPS occasions. The apparatus 1502/1502' for wireless communication further includes means for transmitting feedback to the base station on one or more subsets of the set of resources respectively corresponding to the one or more TX beams based on the SPS signaling, the feedback indicating one of ACK or NACK.

In one configuration, the feedback is associated with the SPS signaling over a subset of the set of SPS occasions.

In one configuration, the subset of the set of SPS occasions includes at least two SPS occasions.

In one configuration, the SPS configuration information for broadcast and/or multicast further indicates a number of the at least two SPS occasions.

In one configuration, the SPS configuration information for broadcast and/or multicast further indicates that the feedback is to indicate the ACK when one of: energy associated with the SPS signaling detected over at least one SPS occasion of the at least two SPS occasions satisfies a first threshold, or energy associated with the SPS signaling averaged over the at least two SPS occasions satisfies a second threshold.

In one configuration, the means for receiving SPS signaling from the base station is configured to: receive a set of first signals from the base station on a downlink data channel via the one or more TX beams; determine a subset of TX beams from the set of TX beams based on the set of first signals received via the one or more TX beams; transmit a set of response signals indicating the subset of TX beams on an uplink channel; and receive SPS data from the base station on the downlink data channel via the subset of TX beams.

In one configuration, the apparatus 1502/1502' for wireless communication further includes means for receiving information indicating the set of TX beams from the base station.

In one configuration, the information indicating the set of TX beams includes information indicating a number of beams of the base station and a bitmap having each bit corresponding to a respective one of the beams. In the bitmap, a first bit value may indicate a corresponding one of the beams is included in the set of TX beams and a second bit value may indicate a corresponding one of the beams is excluded from the set of TX beams.

In one configuration, the apparatus 1502/1502' for wireless communication further includes means for transmitting measurement information associated with at least one of the subset of TX beams to the base station on the uplink channel.

In one configuration, the set of resources includes a set of beam-specific feedback resources on the uplink channel, each TX beam of the set of TX beams corresponding to a respective subset of the set of beam-specific feedback resources, and a respective one of the set of response signals is transmitted on each subset of the set of beam-specific feedback resources that corresponds to one of the subset of TX beams.

In one configuration, the apparatus 1502/1502' for wireless communication further includes means for determining a respective energy corresponding to each of the set of first signals, and each of the set of first signals includes a reference signal, and each of the set of response signals indicates the respective energy corresponding to one of the reference signals received via one of the subset of TX beams satisfies a threshold.

In one configuration, each of the set of first signals includes a control signal on a MCCH carried in the downlink data channel, and each of the set of response signals includes an ACK signal corresponding to a respective control signal received via one of the subset of TX beams.

In one configuration, the means for receiving SPS configuration information for broadcast and/or multicast is configured to: receive first configuration information indicating a set of beam-specific ACK resources on an uplink channel, each TX beam of the set of TX beams corresponding to a respective subset of the set of beam-specific ACK resources; and receive second configuration information indicating a set of beam-specific NACK resources on the uplink channel, each TX beam of the set of TX beams corresponding to a respective subset of the set of beam-specific NACK resources, and the set of beam-specific ACK resources may be different from the set of beam-specific NACK resources.

In one configuration, the apparatus 1502/1502' for wireless communication further includes means for transmitting ACK feedback associated with SPS data on each subset of the set of beam-specific ACK resources corresponding to a TX beam of the set of TX beams via which the SPS data is successfully received; means for transmitting NACK feedback associated with the SPS data on each subset of the set of beam-specific NACK resources corresponding to a TX beam of the set of TX beams via which the SPS data is unsuccessfully received; and means for receiving a retransmission of the SPS data via each TX beam of the set of TX beams corresponding to a subset of the set of beam-specific NACK resources on which the NACK feedback is transmitted.

In one configuration, the apparatus 1502/1502' for wireless communication further includes means for transmitting, to the base station, capability information indicating at least one of a capability for multicast communication, a capability for multi-beam reception, or a capability of parallel feedback transmission, with downlink data being received based on the capability information transmitted to the base station.

In another configuration, the apparatus 1502/1502' for wireless communication includes means for determining whether at least one of downlink data on a downlink data channel over at least one multicast SPS occasion or SPS activation or release for the multicast group indicated by DCI associated with SPS activation or release is unsuccessfully received from a base station. In the other configuration, the apparatus 1502/1502' for wireless communication includes means for receiving a retransmission of the at least one of the downlink data or the DCI when the at least one of the downlink data or the DCI is determined to be unsuccessfully received.

In the other configuration, the apparatus 1502/1502' for wireless communication further includes means for receiving first configuration information from the base station indicating a set of UE-specific feedback resources on an uplink channel, with the set of UE-specific feedback resources being configured to carry at least one of ACK feedback or NACK feedback associated with downlink data over at least one of a set of SPS occasions; means for receiving second configuration information from the base station indicating a set of beam-specific feedback resources on the uplink channel that is configured to carry NACK feedback associated with the downlink data over at least one of the set of SPS occasions that is not activated by DCI, and each beam of a set of beams of the base station via which the downlink data is to be received corresponds to a respective subset of the set of beam-specific feedback resources; means for transmitting one of ACK feedback or NACK feedback on the set of UE-specific feedback resources based on whether the downlink data is successfully received from the base station over the at least one of the set of SPS occasions; and means for transmitting NACK feedback on each subset of the set of beam-specific feedback resources that corresponds to one of the set of beams via which the downlink data is unsuccessfully received from the base station over the at least one of the set of SPS occasions that is not activated by the DCI. In some aspects, retransmission of the at least one of the downlink data or the DCI is based on transmitting at least one of the NACK feedback on the set of UE-specific feedback resources or the NACK feedback on the set of beam-specific feedback resources.

In the other configuration, the apparatus 1502/1502' for wireless communication may further include means for receiving information indicating a number of repetitions for retransmission of the DCI via at least one of a SIB, an MCCH, or unicast RRC signaling, and retransmission of the DCI may be based on the number of repetitions.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
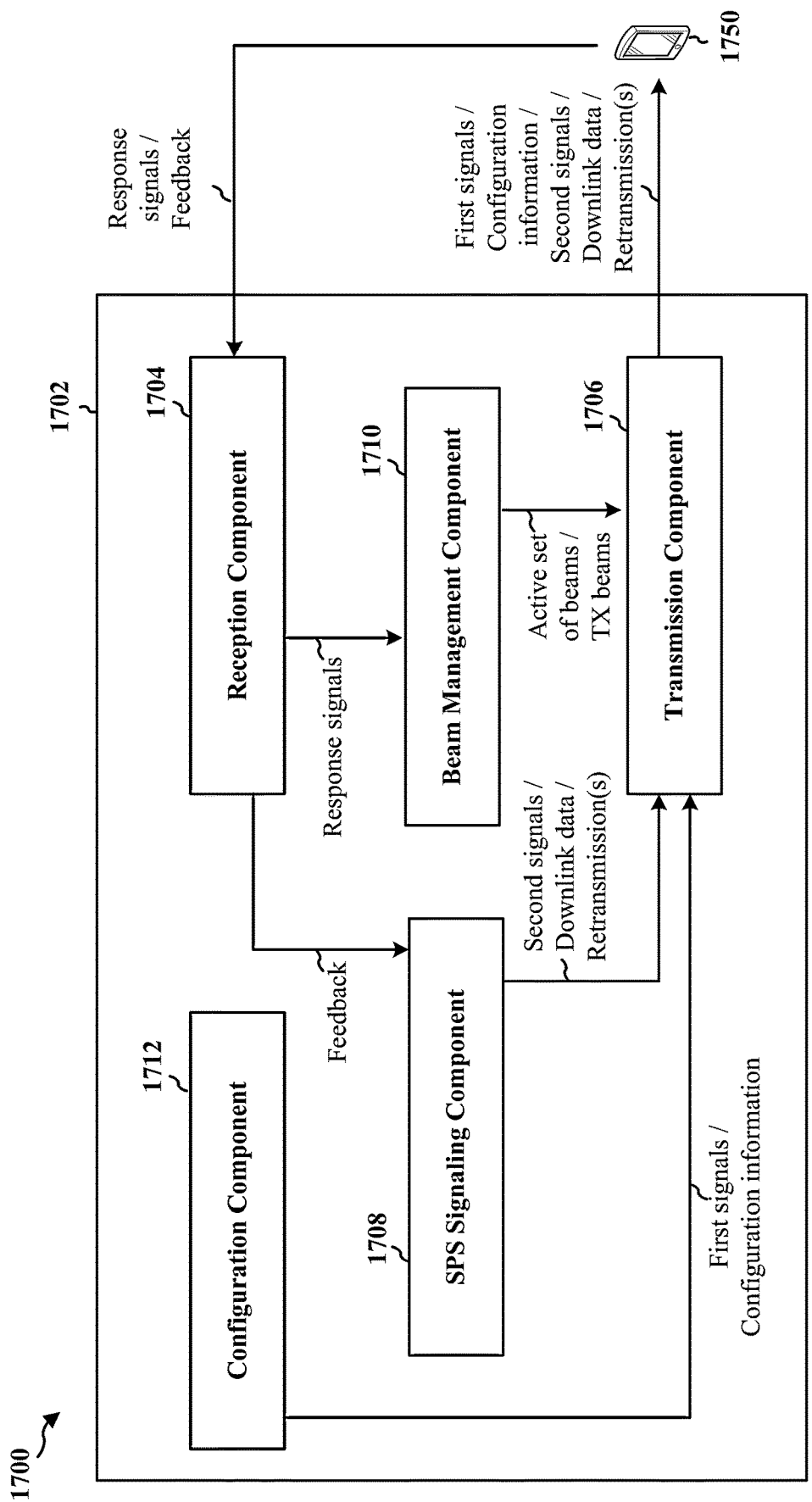
FIG. 17 is another conceptual data flow diagram illustrating the data flow between different means/components in another example apparatus.

FIG. 17 is a conceptual data flow diagram illustrating example data flow 1700 between different means/components in an example apparatus 1702. The apparatus 1702 may be a base station.

The apparatus 1702 may include a reception component 1704 may be configured to receive, from each of the set of UE, including the UE 1750, respective capability information indicating at least one of a capability for multicast communication, a capability for multi-beam reception, or a capability of parallel feedback transmission, e.g., as described in connection with 1102 of FIG. 11.

In one configuration, downlink data may be transmitted to the set of UE based on the respective capability information received from each of the set of UE.

In one configuration, the apparatus 1702 may further include a beam management component 1710 that may configure a set of resources to carry feedback, with each TX beam of a set of TX beams corresponding to a respective subset of the set of resources, e.g., as described in connection with 1104 of FIG. 11.

The apparatus 1702 may further include a transmission component 1706 configured to transmit configuration information indicating the set of resources to a set of UE, including the UE 1750, with the configuration information being associated with SPS, e.g., as described in connection with 1106 of FIG. 11.

The transmission component 1706 may be further configured to transmit SPS signaling to the set of UE, including the UE 1750, via the set of TX beams over each of a set of SPS occasions, e.g., as described in connection with 1108 of FIG. 11.

The reception component 1704 may be further configured to receive feedback from the set of UE, including the UE 1750, on one or more subsets of the set of resources based on the SPS signaling, with the feedback indicating one of ACK or NACK associated with the SPS signaling, e.g., as described in connection with 1110 of FIG. 11. The feedback may be received from a respective UE of the set of UE, including the UE 1750, on the one or more subsets of the set of resources corresponding to one or more of the set of TX beams, with the feedback being associated with the SPS signaling over a subset of the set of SPS occasions. The subset of the set of SPS occasions of the SPS signaling associated with the feedback may include at least two SPS occasions, and the configuration information may further indicate a number of the at least two SPS occasions to the set of UE, including the UE 1750. The configuration information may further indicate that the feedback is to indicate the ACK when one of: energy associated with the SPS signaling detected over at least one SPS occasion of the at least two SPS occasions satisfies a first threshold, or energy associated with the SPS signaling averaged over the at least two SPS occasions satisfies a second threshold.

In one configuration, the configuration component 1712 may configure a set of beam-specific ACK resources on an uplink channel, with each TX beam of the set of TX beams corresponding to a respective subset of the set of beam-specific ACK resources, e.g., as described in connection with 1202 of FIG. 12.

Further, the configuration component 1712 may configure a set of beam-specific NACK resources on the uplink channel, with each TX beam of the set of TX beams corresponding to a respective subset of the set of beam-specific NACK resources, and the set of beam-specific ACK resources being different from the set of beam-specific NACK resources, e.g., as described in connection with 1204 of FIG. 12.

The reception component 1704 may be further configured to receive ACK feedback associated with SPS data on each subset of the set of beam-specific ACK resources corresponding to a TX beam of the set of TX beams via which at least one of the set of UE successfully received the SPS data, e.g., as described in connection with 1206 of FIG. 12.

The reception component 1704 may be further configured to receive NACK feedback associated with the SPS data on each subset of the set of beam-specific NACK resources corresponding to a TX beam of the set of TX beams via which at least the UE 1750 of the set of UE failed to successfully receive the SPS data, e.g., as described in connection with 1208 of FIG. 12.

The SPS signaling component 1708 may provide the SPS data for retransmission to the transmission component 1706. The transmission component 1706 may be further configured to retransmit the SPS data via each TX beam of the set of TX beams that corresponds to a subset of the set of beam-specific NACK resources via which the NACK feedback is received, e.g., as described in connection with 1210 of FIG. 12.

The transmission component 1706 may be further configured to transmit information indicating the set of TX beams to the set of UE, e.g., as described in connection with 1302 of FIG. 13.

The transmission component 1706 may be further configured to transmit a set of first signals on a downlink data channel via the set of TX beams to the set of UE, including the UE 1750, e.g., as described in connection with 1304 of FIG. 13.

The reception component 1704 may be further configured to receive measurement information associated with at least one of the set of TX beams from at least the UE 1750 of the set of UE on the uplink channel, e.g., as described in connection with 1306 of FIG. 13. In some aspects, the set of resources includes a set of beam-specific feedback resources on the uplink channel, with each TX beam of the set of TX beams corresponding to a respective subset of the set of beam-specific feedback resources, and at least one of the set of response signals being received on each subset of the set of beam-specific feedback resources that corresponds to one of the set of TX beams via which at least the UE 1750 of the set of UE received at least one of the set of first signals.

The beam management component 1710 may be further configured to determine a subset of TX beams from the set of TX beams based on a set of response signals received from the set of UE, including the UE 1750, e.g., as described in connection with 1308 of FIG. 13.

The beam management component 1710 may determine the subset of TX beams based on the measurement information. In one configuration, each of the set of first signals includes a reference signal, and each of the set of response signals indicates energy detected from one of the reference signals transmitted via one of the set of TX beams satisfies a threshold. In one configuration, each of the set of first signals includes a control signal on an MCCH carried in the downlink data channel, and each of the set of response signals includes an ACK signal corresponding to a respective control signal transmitted via one of the set of TX beams.

The transmission component 1706 may be further configured to transmit SPS data via the subset of TX beams to the set of UE, including the UE 1750, on the downlink data channel, e.g., as described in connection with 1310 of FIG. 13.

In another configuration, the transmission component 1706 may be configured to transmit, via at least one of a SIB, an MCCH, or unicast RRC signaling, information indicating a number of repetitions (e.g., in at least one ReTX threshold) for retransmission of DCI, e.g., as described in connection with 1402 of FIG. 14.

In the other configuration, the configuration component 1712 may configure each of the set of UE, including the UE 1750, with a respective subset of a set of UE-specific feedback resources on an uplink channel, with the set of UE-specific feedback resources being configured to carry at least one of ACK feedback or NACK feedback associated with the downlink data over at least one of the set of SPS occasions, e.g., as described in connection with 1404 of FIG. 14.

In the other configuration, the configuration component 1712 may further configure a set of beam-specific feedback resources on the uplink channel, with each beam of a set of beams via which the downlink data is transmitted corresponding to a respective subset of the set of beam-specific feedback resources, e.g., as described in connection with 1406 of FIG. 14.

The set of beam-specific feedback resources may be configured to carry NACK feedback associated with the downlink data over at least one of the set of SPS occasions that is not activated by DCI. The SPS signaling component 1708 may determine that at least one of the downlink data or the DCI is to be retransmitted when at least one subset of the set of UE-specific feedback resources carries NACK feedback or at least one subset of the set of beam-specific feedback resources carries NACK feedback.

In the other configuration, the transmission component 1706 may be configured to transmit downlink data to the set of UE, including the UE 1750, on a downlink data channel over a set of SPS occasions, e.g., as described in connection with 1408 of FIG. 14.

In the other configuration, the SPS signaling component 1708 may be configured to determine whether to retransmit at least one of the downlink data or DCI associated with SPS activation or release, e.g., as described in connection with 1410 of FIG. 14.

In the other configuration, the transmission component 1706 may be configured to retransmit the at least one of the downlink data or the DCI when the at least one of the downlink data or the DCI is determined to be retransmitted, e.g., as described in connection with 1412 of FIG. 14.

The apparatus 1702 may include additional components that perform each of the blocks of the algorithm in the aforementioned call flow diagram of FIG. 4B and flowcharts of FIGS. 11 through 14. As such, each block in the aforementioned call flow diagram of FIG. 4B and flowcharts of FIGS. 11 through 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
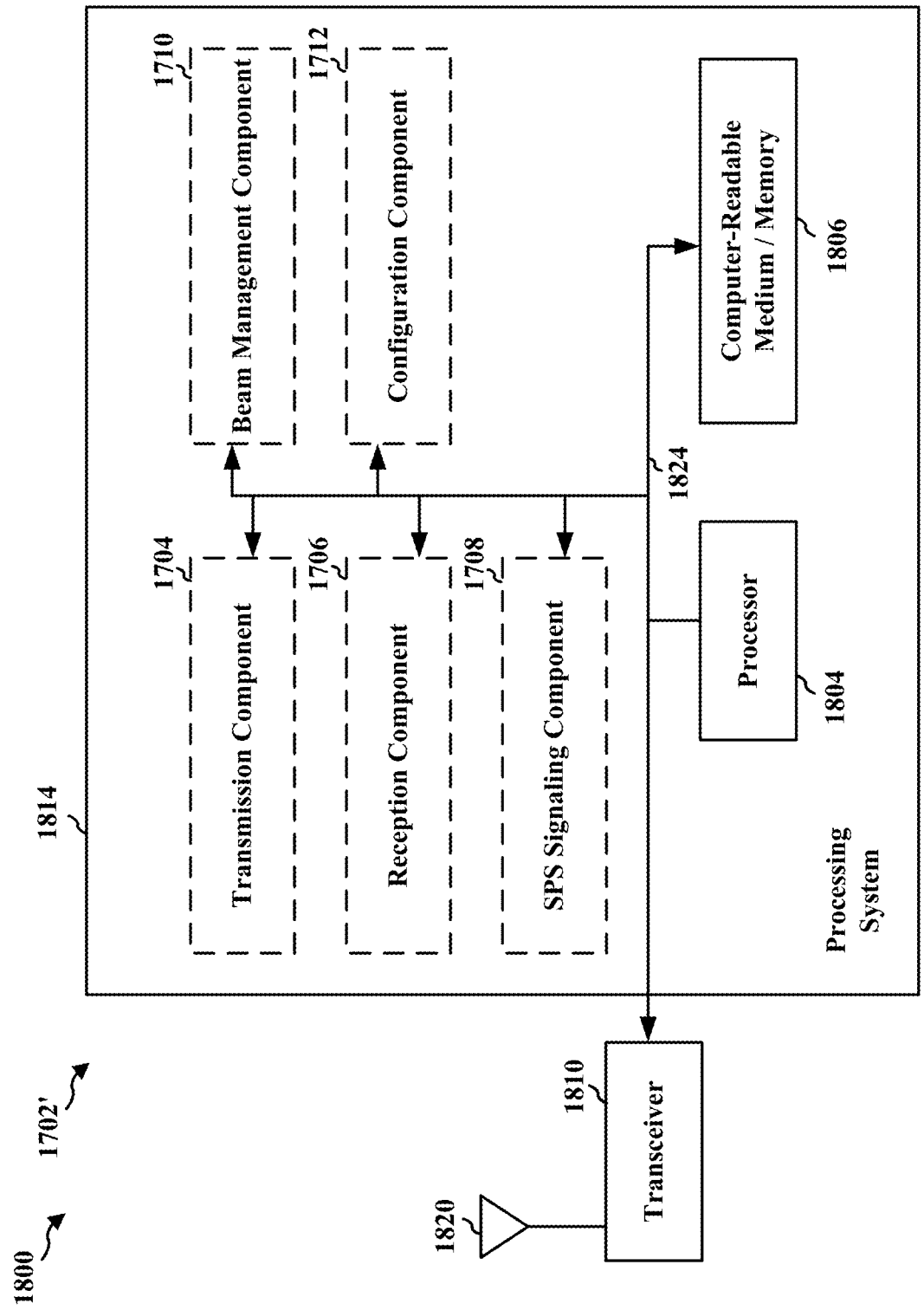
FIG. 18 is a diagram illustrating another example of a hardware implementation for another apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375. Alternatively, the processing system 1814 may be the entire base station (e.g., the base station 310 of FIG. 3).

In one configuration, the apparatus 1702/1702' for wireless communication includes means for configuring a set of resources to carry feedback, with each TX beam of a set of TX beams corresponding to a respective subset of the set of resources. The apparatus 1702/1702' further includes means for transmitting configuration information indicating the set of resources to a set of UE, with the configuration information being associated with SPS. The apparatus 1702/1702' further includes means for transmitting SPS signaling to the set of UE via the set of TX beams over each of a set of SPS occasions. The apparatus 1702/1702' further includes means for receiving feedback from the set of UE on one or more subsets of the set of resources based on the SPS signaling, the feedback indicating one of ACK or NACK associated with the SPS signaling.

In one configuration, each of the feedback is received from a respective UE of the set of UE on the one or more subsets of the set of resources corresponding to one or more of the set of TX beams, with the feedback being associated with the SPS signaling over a subset of the set of SPS occasions.

In one configuration, the subset of the set of SPS occasions of the SPS signaling associated with the feedback includes at least two SPS occasions.

In one configuration, the configuration information further indicates a number of the at least two SPS occasions to the set of UE.

In one configuration, the configuration information further indicates that the feedback is to indicate the ACK when one of: energy associated with the SPS signaling detected over at least one SPS occasion of the at least two SPS occasions satisfies a first threshold, or energy associated with the SPS signaling averaged over the at least two SPS occasions satisfies a second threshold.

In one configuration, the apparatus 1702/1702' for wireless communication includes means for transmitting the SPS signaling to the set of UE is configured to: transmit a set of first signals on a downlink data channel via the set of TX beams to the set of UE; determine a subset of TX beams from the set of TX beams based on a set of response signals received from the set of UE on the one or more subsets of the set of resources on an uplink channel, each of the set of response signals indicating a TX beam of the subset of TX beams; and transmit SPS data via the subset of TX beams to the set of UE on the downlink data channel.

In one configuration, the apparatus 1702/1702' for wireless communication includes means for transmitting information indicating the set of TX beams to the set of UE.

In one configuration, the information indicating the set of TX beams includes information indicating a number of beams of the apparatus 1702/1702' and a bitmap having each bit corresponding to a respective one of the beams. In the bitmap, a first bit value in the bitmap indicates a corresponding one of the beams is included in the set of TX beams and a second bit value indicates a corresponding one of the beams is excluded from the set of TX beams.

In one configuration, the apparatus 1702/1702' for wireless communication includes means for receiving measurement information associated with at least one of the set of TX beams from at least one of the set of UE on the uplink channel, with the determining of the subset of TX beams from the set of TX beams being further based on the measurement information.

In one configuration, the set of resources includes a set of beam-specific feedback resources on the uplink channel, with each TX beam of the set of TX beams corresponding to a respective subset of the set of beam-specific feedback resources, and at least one of the set of response signals being received on each subset of the set of beam-specific feedback resources that corresponds to one of the set of TX beams via which at least one of the set of UE received at least one of the set of first signals.

In one configuration, each of the set of first signals includes a reference signal, and each of the set of response signals indicates energy detected from one of the reference signals transmitted via one of the set of TX beams satisfies a threshold.

In one configuration, each of the set of first signals includes a control signal on a MCCH carried in the downlink data channel, and each of the set of response signals includes an ACK signal corresponding to a respective control signal transmitted via one of the set of TX beams.

In one configuration, the apparatus 1702/1702' for wireless communication includes means for configuring a set of beam-specific ACK resources on an uplink channel, with each TX beam of the set of TX beams corresponding to a respective subset of the set of beam-specific ACK resources; and means for configuring a set of beam-specific NACK resources on the uplink channel, with each TX beam of the set of TX beams corresponding to a respective subset of the set of beam-specific NACK resources, and the set of beam-specific ACK resources being different from the set of beam-specific NACK resources.

In one configuration, the apparatus 1702/1702' for wireless communication includes means for receiving ACK feedback associated with SPS data on each subset of the set of beam-specific ACK resources corresponding to a TX beam of the set of TX beams via which at least one UE of the set of UE successfully received the SPS data; means for receiving NACK feedback associated with the SPS data on each subset of the set of beam-specific NACK resources corresponding to a TX beam of the set of TX beams via which at least one UE of the set of UE failed to successfully receive the SPS data; and means for retransmitting the SPS data via each TX beam of the set of TX beams that corresponds to a subset of the set of beam-specific NACK resources via which the NACK feedback is received.

In one configuration, the apparatus 1702/1702' for wireless communication includes means for receiving, from each of the set of UE, respective capability information indicating at least one of a capability for multicast communication, a capability for multi-beam reception, or a capability of parallel feedback transmission, with downlink data being transmitted to the set of UE based on the respective capability information received from each of the set of UE.

In another configuration, the apparatus 1702/1702' for wireless communication includes means for transmitting downlink data to a set of UE configured with SPS on a downlink data channel over a set of SPS occasions. The apparatus 1702/1702' further includes means for determining whether to retransmit at least one of the downlink data or DCI associated with SPS activation or release. The apparatus 1702/1702' further includes means for retransmitting the at least one of the downlink data or the DCI when the at least one of the downlink data or the DCI is determined to be retransmitted.

In the other configuration, the apparatus 1702/1702' for wireless communication further includes means for configuring each of the set of UE with a respective subset of a set of UE-specific feedback resources on an uplink channel, with the set of UE-specific feedback resources being configured to carry at least one of ACK feedback or NACK feedback associated with the downlink data over at least one of the set of SPS occasions; and means for configuring a set of beam-specific feedback resources on the uplink channel, with each beam of a set of beams via which the downlink data is transmitted corresponding to a respective subset of the set of beam-specific feedback resources, and the set of beam-specific feedback resources being configured to carry NACK feedback associated with the downlink data over at least one of the set of SPS occasions that is not activated by DCI, and the at least one of the downlink data or the DCI being determined to be retransmitted when at least one subset of the set of UE-specific feedback resources carries NACK feedback or at least one subset of the set of beam-specific feedback resources carries NACK feedback.

In the other configuration, the apparatus 1702/1702' for wireless communication further includes means for transmitting information indicating a number of repetitions for the retransmission of the DCI via at least one of a SIB, an MCCH, or unicast RRC signaling, and retransmitting the at least one of the downlink data or the DCI when the at least one of the downlink data or the DCI is determined to be retransmitted includes to retransmit the DCI based on the number of repetitions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
receiving, from a base station, first semi-persistent scheduling (SPS) configuration information for multicast and indicating a set of resources configured for acknowledgement (ACK) and non-acknowledgmnt (NACK) feedback on an uplink channel, and second SPS configuration information indicating a set of NACK resources on the uplink channel, wherein the set of resources for ACK and NACK feedback is different from the set of NACK resources;
receiving SPS signaling from the base station over each of a set of SPS occasions; and
transmitting feedback to the base station on one or more subsets of the set of resources for ACK and NACK feedback or of the set of NACK resources based on the SPS signaling, the feedback indicating one of ACK or NACK.

2. The method of claim 1, wherein the first SPS configuration information for multicast is based on common resources for a group of multicast UEs.

3. The method of claim 1, wherein the feedback is associated with the SPS signaling over a subset of the set of SPS occasions.

4. The method of claim 3, wherein the subset of the set of SPS occasions comprises at least two SPS occasions.

5. The method of claim 4, wherein the first SPS configuration information for multicast further indicates a number of the at least two SPS occasions.

6. The method of claim 4, wherein the first SPS configuration information for multicast further indicates that the feedback is to indicate the ACK when one of:
energy associated with the SPS signaling detected over at least one SPS occasion of the at least two SPS occasions satisfies a first threshold, or energy associated with the SPS signaling averaged over the at least two SPS occasions satisfies a second threshold.

7. The method of claim 1, wherein receiving the SPS signaling from the base station comprises:
receiving a set of first signals from the base station on a downlink data channel via the one or more transmit (TX) beams of the base station;
determining a subset of TX beams from a set of TX beams of the base station based on the set of first signals received via the one or more TX beams;
transmitting a set of response signals indicating the subset of TX beams on n the uplink channel; and
receiving SPS data from the base station on the downlink data channel via the subset of TX beams.

8. The method of claim 7, further comprising:
receiving information indicating the set of TX beams from the base station.

9. The method of claim 8, wherein the information indicating the set of TX beams comprises information indicating a number of beams of the base station and a bitmap having each bit corresponding to a respective one of the beams, and wherein a first bit value in the bitmap indicates a corresponding one of the beams is included in the set of TX beams and a second bit value in the bitmap indicates a corresponding one of the beams is excluded from the set of TX beams.

10. The method of claim 7, further comprising:
transmitting measurement information associated with at least one of the subset of TX beams to the base station on the uplink channel.

11. The method of claim 7, wherein the set of resources for ACK and NACK feedback comprises a set of beam-specific feedback resources on the uplink channel, each TX beam of the set of TX beams corresponding to a respective subset of the set of beam-specific feedback resources, and wherein a respective one of the set of response signals is transmitted on each subset of the set of beam-specific feedback resources that corresponds to one of the subset of TX beams.

12. The method of claim 11, further comprising:
determining a respective energy corresponding to each of the set of first signals,
wherein each of the set of first signals comprises a reference signal, and each of the set of response signals indicates the respective energy corresponding to one of the reference signals received via one of the subset of TX beams satisfies a threshold.

13. The method of claim 11, wherein each of the set of first signals comprises a control signal on a multicast control channel (MCCH) carried in the downlink data channel, and each of the set of response signals comprises an ACK signal corresponding to a respective control signal received via one of the subset of TX beams.

14. The method of claim 1, wherein the first SPS configuration information is associated with a first multicast service and the second SPS configuration information is associated with a second multicast service, the first multicast service being different than the second multicast service.

15. The method of claim 1, further comprising:
transmitting ACK feedback associated with SPS data on each subset of the set of resources for ACK and NACK feedback corresponding to a transmit (TX) beam of a set of TX beams of the base station via which the SPS data is successfully received;
transmitting NACK feedback associated with the SPS data on each subset of the set of NACK resources corresponding to a TX beam of the set of TX beams via which the SPS data is unsuccessfully received; and
receiving a retransmission of the SPS data via each TX beam of the set of TX beams corresponding to a subset of the set of NACK resources on which the NACK feedback is transmitted.

16. The method of claim 1, further comprising:
transmitting, to the base station, capability information indicating at least one of a capability for multicast communication, a capability for multi-beam reception, or a capability of parallel feedback transmission,
wherein downlink data is received based on the capability information transmitted to the base station.

17. A method of wireless communication by a user equipment (UE), comprising:
receiving first configuration information from a base station indicating a set of first feedback resources on an uplink channel, the set of first feedback resources being configured to carry at least one of acknowledgement (ACK) feedback or non-acknowledgement (NACK) feedback associated with downlink data over at least one of a set of semi-persistent scheduling (SPS) occasions;
receiving second configuration information from the base station indicating a set of second feedback resources on the uplink channel that is configured to carry NACK feedback associated with the downlink data over at least one of the set of SPS occasions that is not activated by an SPS activation or release for a multicast group;
determining whether at least one of the downlink data on a downlink data channel over at least one multicast SPS occasion of the set of SPS occasions or multicast downlink control information (DCI) indicating the SPS activation or release for the multicast group is unsuccessfully received from the base station;
transmitting one of ACK feedback or NACK feedback on a first resource of the set of first feedback resources based on whether the downlink data or the SPS activation or release is successfully received from the base station over the at least one multicast SPS occasion of the set of SPS occasions;
transmitting NACK feedback on a second resource of the set of second feedback resources based on whether the downlink data or the SPS activation or release is unsuccessfully received from the base station over the at least one multicast SPS occasion of the set of SPS occasions that is not activated by the SPS activation or release;
and
receiving a retransmission of at least one of the downlink data or the SPS activation or release for the multicast group when the at least one of the downlink data or the multicast DCI is determined to be unsuccessfully received, wherein the retransmission of the at least one of the downlink data or the SPS activation or release is received based on at least one of the NACK feedback on the first resource or the NACK feedback on the second resource.

18. The method of claim 17, wherein the retransmission comprises a unicast DCI that indicates the SPS activation or release for the multicast group if the multicast DCI indicating the SPS activation or release for the multicast group is unsuccessfully received.

19. The method of claim 17, further comprising:
receiving information indicating a number of repetitions for retransmission of the SPS activation or release for the multicast group via at least one of a system information block (SIB), a multicast control channel (MCCH), or unicast radio resource control (RRC) signaling,
wherein the retransmission of the SPS activation or release for the multicast group is received based on the number of repetitions.

20. An apparatus for wireless communication by a user equipment (UE), comprising:
a memory; and
at least one processor coupled to the memory and configured to:
receive, from a base station, first semi-persistent scheduling (SPS) configuration information for multicast and indicating a set of resources configured for acknowledgment (ACK) and non-acknowledgment (NACK) feedback on an uplink channel, and second SPS configuration information indicating a set of NACK resources on the uplink channel, wherein the set of resources for ACK and NACK feedback is different from the set of NACK resources;
receive SPS signaling from the base station over each of a set of SPS occasions; and
transmit feedback to the base station on one or more subsets of the set of resources for ACK and NACK feedback or of the set of NACK resources based on the SPS signaling, the feedback indicating one of ACK or NACK.

21. The apparatus of claim 20, wherein the first SPS configuration information for multicast is based on common resources for a group of multicast UEs.

22. The apparatus of claim 20, wherein the feedback is associated with the SPS signaling over a subset of the set of SPS occasions.

23. The apparatus of claim 22, wherein the subset of the set of SPS occasions comprises at least two SPS occasions.

24. The apparatus of claim 23, wherein the first SPS configuration information for multicast further indicates a number of the at least two SPS occasions.

25. The apparatus of claim 23, wherein the first SPS configuration information for multicast further indicates that the feedback is to indicate the ACK when one of:
energy associated with the SPS signaling detected over at least one SPS occasion of the at least two SPS occasions satisfies a first threshold, or
energy associated with the SPS signaling averaged over the at least two SPS occasions satisfies a second threshold.

26. The apparatus of claim 20, wherein to receive the SPS signaling from the base station, the at least one processor is further configured to:
receive a set of first signals from the base station on a downlink data channel via one or more transmit (TX) beams of the base station;
determine a subset of TX beams from a set of TX beams of the base station based on the set of first signals received via the one or more TX beams;
transmit a set of response signals indicating the subset of TX beams on the uplink channel; and
receive SPS data from the base station on the downlink data channel via the subset of TX beams.

27. The apparatus of claim 26, wherein the at least one processor is further configured to:
receive information indicating the set of TX beams from the base station.

28. The apparatus of claim 27, wherein the information indicating the set of TX beams comprises information indicating a number of beams of the base station and a bitmap having each bit corresponding to a respective one of the beams, and wherein a first bit value in the bitmap indicates a corresponding one of the beams is included in the set of TX beams and a second bit value in the bitmap indicates a corresponding one of the beams is excluded from the set of TX beams.

29. The apparatus of claim 26, wherein the at least one processor is further configured to:
transmit measurement information associated with at least one of the subset of TX beams to the base station on the uplink channel.

30. The apparatus of claim 26, wherein the set of resources for ACK and NACK feedback comprises a set of beam-specific feedback resources on the uplink channel, each TX beam of the set of TX beams corresponding to a respective subset of the set of beam-specific feedback resources, and wherein a respective one of the set of response signals is transmitted on each subset of the set of beam-specific feedback resources that corresponds to one of the subset of TX beams.

31. The apparatus of claim 30, wherein the at least one processor is further configured to:
determine a respective energy corresponding to each of the set of first signals,
wherein each of the set of first signals comprises a reference signal, and each of the set of response signals indicates the respective energy corresponding to one of the reference signals received via one of the subset of TX beams satisfies a threshold.

32. The apparatus of claim 30, wherein each of the set of first signals comprises a control signal on a multicast control channel (MCCH) carried in the downlink data channel, and each of the set of response signals comprises an ACK signal corresponding to a respective control signal received via one of the subset of TX beams.

33. The apparatus of claim 20, wherein the first SPS configuration information is associated with a first multicast service and the second SPS configuration information is associated with a second multicast service, the first multicast service being different than the second multicast service.

34. The apparatus of claim 20, wherein the at least one processor is further configured to:
transmit ACK feedback associated with SPS data on each subset of the set of resources for ACK and NACK feedback corresponding to a transmit (TX) beam of a set of TX beams of the base station via which the SPS data is successfully received;
transmit NACK feedback associated with the SPS data on each subset of the set of NACK resources corresponding to a TX beam of the set of TX beams via which the SPS data is unsuccessfully received; and
receive a retransmission of the SPS data via each TX beam of the set of TX beams corresponding to a subset of the set of NACK resources on which the NACK feedback is transmitted.

35. The apparatus of claim 20, wherein the at least one processor is further configured to:
transmit, to the base station, capability information indicating at least one of a capability for multicast communication, a capability for multi-beam reception, or a capability of parallel feedback transmission,
wherein downlink data is received based on the capability information transmitted to the base station.

36. An apparatus for wireless communication by a user equipment (UE), comprising:
a memory; and at least one processor coupled to the memory and configured to:
receive first configuration information from a base station indicating a set of first feedback resources on an uplink channel, the set of first feedback resources being configured to carry at least one of acknowledgement (ACK) feedback or non-acknowledgement (NACK) feedback associated with downlink data over at least one of a set of semi-persistent scheduling (SPS) occasions;
receive second configuration information from the base station indicating a set of second feedback resources on the uplink channel that is configured to carry NACK feedback associated with the downlink data over at least one of the set of SPS occasions that is not activated by an SPS activation or release for a multicast group;
determine whether at least one of the downlink data on a downlink data channel over at least one multicast SPS occasion of the set of SPS occasions or multicast downlink control information (DCI) indicating the SPS activation or release for the multicast group is unsuccessfully received from the base station;
transmit one of ACK feedback or NACK feedback on a first resource of the set of first feedback resources based on whether the downlink data or the SPS activation or release is successfully received from the base station over the at least one multicast SPS occasion of the set of SPS occasions;
transmit NACK feedback on a second resource of the set of second feedback resources based on whether the downlink data or the SPS activation or release is unsuccessfully received from the base station over the at least one multicast SPS occasion of the set of SPS occasions that is not activated by the SPS activation or release;
and
receive a retransmission of at least one of the downlink data or the SPS activation or release for the multicast group when the at least one of the downlink data or the multicast DCI is determined to be unsuccessfully received, wherein the retransmission of the at least one of the downlink data or the SPS activation or release is received based on at least one of the NACK feedback on the first resource or the NACK feedback on the second resource.

37. The apparatus of claim 36, wherein the retransmission comprises a unicast DCI that indicates the SPS activation or release for the multicast group if the multicast DCI indicating the SPS activation or release for the multicast group is unsuccessfully received.

38. The apparatus of claim 36, wherein the at least one processor is further configured to:
receive information indicating a number of repetitions for retransmission of the SPS activation or release for the multicast group via at least one of a system information block (SIB), a multicast control channel (MCCH), or unicast radio resource control (RRC) signaling,
wherein the retransmission of the SPS activation or release for the multicast group is received based on the number of repetitions.

39. An apparatus for wireless communication by a user equipment (UE), comprising:
means for receiving, from a base station, first semi-persistent scheduling (SPS) configuration information for multicast and indicating a set of resources configured for acknowledgment (ACK) and non-acknowledgment (NACK) feedback on an uplink channel, and second SPS configuration information indicating a set of NACK resources on the uplink channel, wherein the set of resources for ACK and NACK feedback is different from the set of NACK resources;
means for receiving SPS signaling from the base station over each of a set of SPS occasions; and
means for transmitting feedback to the base station on one or more subsets of the set of resources for ACK and NACK feedback or of the set of NACK resources based on the SPS signaling, the feedback indicating one of ACK or NACK.

40. The apparatus of claim 39, wherein the first SPS configuration information for multicast is based on common resources for a group of multicast UEs.

41. The apparatus of claim 39, wherein the means for receiving the SPS signaling from the base station is configured to:
receive a set of first signals from the base station on a downlink data channel via one or more transmit (TX) beams of the base station;
determine a subset of TX beams from a set of TX beams of the base station based on the set of first signals received via the one or more TX beams;
transmit a set of response signals indicating the subset of TX beams on the uplink channel; and
receive SPS data from the base station on the downlink data channel via the subset of TX beams.

42. The apparatus of claim 41, further comprising:
means for receiving information indicating the set of TX beams from the base station.

43. The apparatus of claim 41, further comprising:
means for transmitting measurement information associated with at least one of the subset of TX beams to the base station on the uplink channel.

44. The apparatus of claim 41, wherein the set of resources for ACK and NACK feedback comprises a set of beam-specific feedback resources on the uplink channel, each TX beam of the set of TX beams corresponding to a respective subset of the set of beam-specific feedback resources, and wherein a respective one of the set of response signals is transmitted on each subset of the set of beam-specific feedback resources that corresponds to one of the subset of TX beams.

45. The apparatus of claim 44, further comprising:
means for determining a respective energy corresponding to each of the set of first signals,
wherein each of the set of first signals comprises a reference signal, and each of the set of response signals indicates the respective energy corresponding to one of the reference signals received via one of the subset of TX beams satisfies a threshold.

46. The apparatus of claim 39, wherein the first SPS configuration information is associated with a first multicast service and the second SPS configuration information is associated with a second multicast service, the first multicast service being different than the second multicast service.

47. The apparatus of claim 39, further comprising:
means for transmitting ACK feedback associated with SPS data on each subset of the set of resources for ACK and NACK feedback corresponding to a transmit (TX) beam of a set of TX beams of the base station via which the SPS data is successfully received;
means for transmitting NACK feedback associated with the SPS data on each subset of the set of NACK resources corresponding to a TX beam of the set of TX beams via which the SPS data is unsuccessfully received; and means for receiving a retransmission of the SPS data via each TX beam of the set of TX beams corresponding to a subset of the set of NACK resources on which the NACK feedback is transmitted.

48. An apparatus for wireless communication by a base station, comprising:
a memory; and
at least one processor coupled to the memory and configured to:
configure a set of acknowledgment (ACK) resources to carry feedback on an uplink channel and a set of non-acknowledgment (NACK) resources on the uplink channel, wherein the set of ACK resources is different from the set of NACK resources;
transmit configuration information indicating the set of ACK resources and the set of NACK resources to a set of user equipment (UE), the configuration information being associated with semi-persistent scheduling (SPS) for multicast;
transmit SPS signaling to the set of UE over each of a set of SPS occasions; and
receive feedback from the set of UE on one or more subsets of the set of ACK resources or of the set of NACK resources based on the SPS signaling, the feedback indicating one of ACK or NACK.

49. The apparatus of claim 48, wherein the configuration information associated with SPS for multicast is based on common resources for a group of multicast UEs.

50. The apparatus of claim 48, wherein each of the feedback is received from a respective UE of the set of UE on the one or more subsets of the set of ACK resources corresponding to one or more of a set of transmit (TX) beams of the base station, the feedback being associated with the SPS signaling over a subset of the set of SPS occasions.

51. The apparatus of claim 50, wherein the subset of the set of SPS occasions of the SPS signaling associated with the feedback comprises at least two SPS occasions.

52. The apparatus of claim 51, wherein the configuration information further indicates a number of the at least two SPS occasions to the set of UE.

53. The apparatus of claim 50, wherein the configuration information further indicates that the feedback is to indicate the ACK when one of:
energy associated with the SPS signaling detected over at least one SPS occasion of the at least two SPS occasions satisfies a first threshold, or
energy associated with the SPS signaling averaged over the at least two SPS occasions satisfies a second threshold.

54. The apparatus of claim 48, wherein to transmit the SPS signaling to the set of UE, the at least one processor is further configured to:
transmit a set of first signals on a downlink data channel via a set of transmit (TX) beams of the base station to the set of UE;
determine a subset of TX beams from a set of TX beams of the base station based on a set of response signals received from the set of UE on the one or more subsets of the set of ACK resources or of the set of NACK resources on the uplink channel, each of the set of response signals indicating a TX beam of the subset of TX beams; and
transmit SPS data via the subset of TX beams to the set of UE on the downlink data channel.

55. The apparatus of claim 54, wherein the at least one processor is further configured to:
transmit information indicating the set of TX beams to the set of UE.

56. The apparatus of claim 55, wherein the information indicating the set of TX beams comprises information indicating a number of beams of the base station and a bitmap having each bit corresponding to a respective one of the beams, and wherein a first bit value in the bitmap indicates a corresponding one of the beams is included in the set of TX beams and a second bit value in the bitmap indicates a corresponding one of the beams is excluded from the set of TX beams.

57. The apparatus of claim 54, wherein the at least one processor is further configured to:
receive measurement information associated with at least one of the set of TX beams from at least one of the set of UE on the uplink channel, wherein
the determination of the subset of TX beams from the set of TX beams is further based on the measurement information.

58. The apparatus of claim 54, wherein the set of ACK resources comprises a set of beam-specific feedback resources on the uplink channel, each TX beam of the set of TX beams corresponding to a respective subset of the set of beam-specific feedback resources, and wherein at least one of the set of response signals is received on each subset of the set of beam-specific feedback resources that corresponds to one of the set of TX beams via which at least one of the set of UE received at least one of the set of first signals.

59. The apparatus of claim 54, wherein each of the set of first signals comprises a reference signal, and each of the set of response signals indicates energy detected from one of the reference signals transmitted via one of the set of TX beams satisfies a threshold.

60. The apparatus of claim 54, wherein each of the set of first signals comprises a control signal on a multicast control channel (MCCH) carried in the downlink data channel, and each of the set of response signals comprises an ACK signal corresponding to a respective control signal transmitted via one of the set of TX beams.

61. The apparatus of claim 48, wherein the configuration information is associated with a first multicast service and a second multicast service, the first multicast service being different than the second multicast service.

62. The apparatus of claim 48, wherein the at least one processor is further configured to:
receive ACK feedback associated with SPS data on each subset of the set of ACK resources corresponding to a transmit (TX) beam of a set of TX beams of the base station via which at least one UE of the set of UE successfully received the SPS data;
receive NACK feedback associated with the SPS data on each subset of the set of NACK resources corresponding to a TX beam of the set of TX beams via which at least one UE of the set of UE failed to successfully receive the SPS data; and
retransmit the SPS data via each TX beam of the set of TX beams that corresponds to a subset of the set of NACK resources via which the NACK feedback is received.

63. The apparatus of claim 48, wherein the at least one processor is further configured to:
receive, from each of the set of UE, respective capability information indicating at least one of a capability for multicast communication, a capability for multi-beam reception, or a capability of parallel feedback transmission, wherein downlink data is transmitted to the set of UE based on the respective capability information received from each of the set of UE.

64. An apparatus for wireless communication by a base station, comprising:
a memory; and
at least one processor coupled to the memory and configured to:
configure each of a set of user equipment (UE) with a set of first feedback resources on an uplink channel, the set of first feedback resources being configured to carry at least one of acknowledgement (ACK) feedback or non-acknowledgement (NACK) feedback associated with downlink data over at least one of a set of semi-persistent scheduling (SPS) occasions;
configure a set of second feedback resources on the uplink channel that is configured to carry NACK feedback associated with the downlink data over at least one of the set of SPS occasions that is not activated by an SPS activation or release;
transmit downlink data to the set of UE configured with SPS on a downlink data channel over a set of multicast SPS occasions of the set of SPS occasions, or multicast downlink control information (DCI) indicating the SPS activation or release;
determine whether to retransmit at least one of the downlink data or the SPS activation or release indicated by the multicast DCI based on whether at least one subset of the set of first feedback resources carries NACK feedback or at least one subset of the set of second feedback resources carries NACK feedback; and
retransmit the at least one of the downlink data or the SPS activation or release in response to the at least one of the downlink data or the SPS activation or release being determined to be retransmitted.

65. The apparatus of claim 64, wherein the SPS activation or release is retransmitted in a unicast DCI if the SPS activation or release indicated by the multicast DCI is determined to be retransmitted.

66. The apparatus of claim 64, wherein the at least one processor is further configured to:
transmit information indicating a number of repetitions for retransmission of the SPS activation or release indicated by the multicast DCI via at least one of a system information block (SIB), a multicast control channel (MCCH), or unicast radio resource control (RRC) signaling,
wherein to retransmit the at least one of the downlink data or the SPS activation or release indicated by the multicast DCI, the at least one processor is configured to retransmit the SPS activation or release indicated by the multicast DCI based on the number of repetitions.

* * * * *